United States Patent
Tee et al.

(10) Patent No.: US 12,091,538 B2
(45) Date of Patent: Sep. 17, 2024

(54) DIELECTRIC MATERIAL

(71) Applicant: NATIONAL UNIVERSITY OF SINGAPORE, Singapore (SG)

(72) Inventors: Chee Keong Tee, Singapore (SG); Yu Jun Tan, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 979 days.

(21) Appl. No.: 17/055,360

(22) PCT Filed: May 31, 2019

(86) PCT No.: PCT/SG2019/050283
§ 371 (c)(1),
(2) Date: Nov. 13, 2020

(87) PCT Pub. No.: WO2019/231404
PCT Pub. Date: Dec. 5, 2019

(65) Prior Publication Data
US 2022/0325089 A1    Oct. 13, 2022

(30) Foreign Application Priority Data
Jun. 1, 2018  (SG) .......................... 10201804680W

(51) Int. Cl.
*C08L 27/16* (2006.01)
*C08F 14/00* (2006.01)
(Continued)

(52) U.S. Cl.
CPC .............. *C08L 27/16* (2013.01); *C09K 11/06* (2013.01); *H05B 33/20* (2013.01); *C08L 2203/20* (2013.01); *C09K 2211/1022* (2013.01)

(58) Field of Classification Search
CPC . C08F 14/00; C08F 14/22; C08F 14/28; C08J 3/20; C08L 27/16
See application file for complete search history.

(56) References Cited

U.S. PATENT DOCUMENTS 10,318,051 B2 *  6/2019  Choi .................... H10N 30/852

FOREIGN PATENT DOCUMENTS

| CN | 106291912 A | 1/2017 |
| CN | 107602740 A | 1/2018 |

(Continued)

OTHER PUBLICATIONS

B. C. K. Tee, A. Chortos, A. Berndt, A. K. Nguyen, A. Tom, A. McGuire, Z. C. Lin, K. Tien, W. G. Bae, H. Wang, P. Mei, H. H. Chou, B. Cui, K. Deisseroth, T. N. Ng, Z. Bao, Science. 2015, 350, 313.

(Continued)

*Primary Examiner* — Caixia Lu
(74) *Attorney, Agent, or Firm* — Volpe Koenig

(57) ABSTRACT

A dielectric material, to a device comprising the dielectric material and to use of the dielectric material in the fabrication of a device. One dielectric material may comprise a halogen-based elastomer mixed with a halogen based surfactant and exhibiting electro-mechanical self-healing properties and/or an increased dielectric constant compared to the halogen-based elastomer. Another dielectric material may comprise a halogen-based polymer mixed with a halogen based surfactant and exhibiting an increased dielectric constant compared to the halogen-based polymer.

20 Claims, 37 Drawing Sheets

(51) Int. Cl.
- *C08F 14/22* (2006.01)
- *C08F 14/28* (2006.01)
- *C08J 3/20* (2006.01)
- *C09K 11/06* (2006.01)
- *H05B 33/20* (2006.01)

(56) References Cited

FOREIGN PATENT DOCUMENTS

| | | |
|---|---|---|
| JP | H07-292199 A | 11/1995 |
| KR | 20180018129 A | 2/2018 |

OTHER PUBLICATIONS

H.-H. Chou, A. Nguyen, A. Chortos, J. W. F. To, C. Lu, J. Mei, T. Kurosawa, W.-G. Bae, J. B.-H. Tok, Z. Bao, Nat. Commun. 2015, 6, 8011.
C. Larson, B. Peele, S. Li, S. Robinson, M. Totaro, L. Beccai, B. Mazzolai, R. Shepherd, Science 2016, 351, 1071-4 (2016).
T. Sekitani, H. Nakajima, H. Maeda, T. Fukushima, T. Aida, K. Hata, T. Someya, Nat. Mater. 2009, 8, 494.
R.-H. Kim, D.-H. Kim, J. Xiao, B. H. Kim, S.-I. Park, B. Panilaitis, R. Ghaffari, J. Yao, M. Li, Z. Liu, V. Malyarchuk, D. G. Kim, A.-P. Le, R. G. Nuzzo, D. L. Kaplan, F. G. Omenetto, Y. Huang, Z. Kang, J. A. Rogers, Nat. Mater. 2010, 9, 929.
J. Wang, C. Yan, G. Cai, M. Cui, A. Lee-Sie Eh, P. See Lee, Adv. Mater. 2016, 28, 4490-4496 (2016).
J. Wang, C. Yan, K. J. Chee, P. S. Lee, Adv. Mater. 2015, 27, 2876-2882 (2015).
C. H. Yang, B. Chen, J. Zhou, Y. M. Chen, Z. Suo, Adv. Mater. 2016, 28, 4480-4484 (2016).
S. Li, B. N. Peele, C. M. Larson, H. Zhao, R. F. Shepherd, Adv. Mater. 2016, 28, 9770.
B. You, Y. Kim, B.-K. Ju, J.-W. Kim, ACS Appl. Mater. Interfaces 2017, 9, 5486-5494 (2017).
Z. Wang, Y. Chen, P. Li, X. Hao, J. Liu, R. Huang, Y. Li, ACS Nano 2011, 5, 7149.
S. M. Jeong, S. Song, H. Kim, S.-H. Baek, J. S. Kwak, RSC Adv. 2017, 7, 8816-8822.
Z. Zhang, X. Shi, H. Lou, Y. Xu, J. Zhang, Y. Li, X. Cheng, H. Peng, J. Mater. Chem. C 2017, 5, 4139-4144 (2017).
P. D. Rack, A. Naman, P. H. Holloway, S.-S. Sun, R. T. Tuenge, MRS Bull. 1996, 21, 49.
H. L. Filiatrault, G. C. Porteous, R. S. Carmichael, G. J. E. Davidson, T. B. Carmichael, Adv. Mater. 2012, 24, 2673.
Z. Yu, X. Niu, Z. Liu, Q. Pei, Adv. Mater. 2011, 23, 3989.
E. H. Kim, S. H. Cho, J. H. Lee, B. Jeong, R. H. Kim, S. Yu, T. W. Lee, W. Shim, C. Park, Nat. Commun. 2017, 8, 1.
T. Sekitani, Y. Noguchi, K. Hata, T. Fukushima, T. Aida, T. Someya, Science. 2008, 321, 1468.
P. Etienne, R. Stephen, D. S. C., S. M. E., D. M. D., Adv. Mater. 2013, 25, 1589.
D. Yin, J. Feng, R. Ma, Y.-F. Liu, Y.-L. Zhang, X.-L. Zhang, Y.-G. Bi, Q.-D. Chen, H.-B. Sun, Nat. Commun. 2016, 7, 11573.
F. Chen, A. H. Kitai, in Handb. Vis. Disp. Technol., Springer Berlin Heidelberg, Berlin, Heidelberg, 2012, pp. 1193-1205.
P. D. Rack, P. H. Holloway, Mater. Sci. Eng. R Reports 1998, 21, 171.
C. J. Alder, A. F. Cattell, K. F. Dexter, M. Dixon, J. Kirton, M. S. Skolnick, IEEE Trans. Electron Devices 1981, 28, 680.
N. Matsuhisa, M. Kaltenbrunner, T. Yokota, H. Jinno, K. Kuribara, T. Sekitani, T. Someya, Nat. Commun. 2015, 6, 7461.
Y. Cao, T. G. Morrissey, E. Acome, S. I. Allec, B. M. Wong, C. Keplinger, C. Wang, Adv. Mater. 2017, 29, 1.
Y. J. Tan, J. Wu, H. Li, B. C. K. Tee, ACS Appl. Mater. Interfaces 2018, DOI 10.1021/acsami.7b19511.
M. Bredol, H. Schulze Dieckhoff, Materials (Basel). 2010, 3, 1353-1374 (2010).
F. Stauffer, K. Tybrandt, Adv. Mater. 2016, 28.
X. Chen, M. A. Dam, K. Ono, A. Mal, H. Shen, S. R. Nutt, K. Sheran, F. Wudl, 12 Science 2002, 295, 1698.
B. C. K. Tee, C. Wang, R. Allen, Z. Bao, Nat Nano 2012, 7, 825-832 (2012).
Tee, B. C. K. et al. A skin-inspired organic digital mechanoreceptor. Science (80-. ). 350, 313-316 (2015).
Yokota, T. et al. Ultraflexible organic photonic skin. Sci. Adv. 2, e1501856-e1501856 (2016).
Hammock, M. L., Chortos, A., Tee, B. C.-K., Tok, J. B.-H. & Bao, Z. 25th Anniversary Article: The Evolution of Electronic Skin (E-Skin): A Brief History, Design Considerations, and Recent Progress. Adv. Mater. 25, 5997-6038 (2013).
Sekitani, T. & Someya, T. Stretchable, Large-area Organic Electronics. Adv. Mater. 22, 2228-2246 (2010).
Chou, H.-H. et al. A chameleon-inspired stretchable electronic skin with interactive colour changing controlled by tactile sensing. Nat. Commun. 6, 8011 (2015).
Lu, N. & Kim, D.-H. Flexible and Stretchable Electronics Paving the Way for Soft Robotics. Soft Robot. 1, 53-62 (2014).
Kim, R.-H. et al. Waterproof AlInGaP optoelectronics on stretchable substrates with applications in biomedicine and robotics. Nat. Mater. 9, 929-937 (2010).
Shepherd, R. F. et al. Multigait soft robot. Proc. Natl. Acad. Sci. U. S. A. 108, 20400-3 (2011).
Sekitani, T. et al. Stretchable active-matrix organic light-emitting diode display using printable elastic conductors. Nat. Mater. 8, 494-499 (2009).
Kim, E. H. et al. Organic light emitting board for dynamic interactive display. Nat. Commun. 8, 1-8 (2017).
Cao, Y. et al. Self-healing electronic skins for aquatic environments. Nat. Electron. 2, 75-82 (2019).
Sekitani, T. et al. A Rubberlike Stretchable Active Matrix Using Elastic Conductors. Science (80-. ). 321, 1468-1472 (2008).
Palleau, E., Reece, S., Desai, S. C., Smith, M. E. & Dickey, M. D. Self-Healing Stretchable Wires for Reconfigurable Circuit Wiring and 3D Microfluidics. Adv. Mater. 25, 1589-1592 (2013).
Kam, P. C. A., Kam, A. C. & Thompson, J. F. Noise pollution in the anaesthetic and intensive care environment. Anaesthesia 49, 982-986 (1994).
Tan, Y. J., Wu, J., Li, H. & Tee, B. C. K. Self-Healing Electronic Materials for a Smart and Sustainable Future. ACS Appl. Mater. Interfaces 10, 15331-15345 (2018).
Wallin, T. J., Pikul, J. & Shepherd, R. F. 3D printing of soft robotic systems. Nat. Rev. Mater. 3, 84-100 (2018).
Ribeiro, C. et al. Electroactive poly(vinylidene fluoride)-based structures for advanced applications. Nat. Protoc. 13, 681-704 (2018).
Cao, Y. et al. A Transparent, Self-Healing, Highly Stretchable Ionic Conductor. Adv. Mater. 29, 1605099 (2017).
Daly, S., Kunkel, T., Sun, X., Farrell, S. & Crum, P. 41.1: Distinguished Paper: Viewer Preferences for Shadow, Diffuse, Specular, and Emissive Luminance Limits of High Dynamic Range Displays. SID Symp. Dig. Tech. Pap. 44, 563-566 (2013).
Zhou, Y. et al. Bright Stretchable Electroluminescent Devices based on Silver Nanowire Electrodes and High-k Thermoplastic Elastomers. ACS Appl. Mater. Interfaces 10, 44760-44767 (2018).
Chinese Office Action issued on Mar. 30, 2022 for Chinese Patent Application No. 201980036623.5.
Tsangaris, G. M., Psarras, G. C. & Kouloumbi, N. Electric modulus and interfacial polarization in composite polymeric systems. J. Mater. Sci. 33, 2027-2037 (1998).
Davis, J., Hsieh, Y.-H. & Lee, H.-C. Humans perceive flicker artifacts at 500 Hz. Sci. Rep. 5, 7861 (2015).
Stauffer, F. & Tybrandt, K. Bright Stretchable Alternating Current Electroluminescent Displays Based on High Permittivity Composites. Adv. Mater. 28, 7200-7203 (2016).
Cordier, P., Tournilhac, F., Soulié-Ziakovic, C. & Leibler, L. Self-healing and thermoreversible rubber from supramolecular assembly. Nature 451, 977-980 (2008).
Li, S., Peele, B. N., Larson, C. M., Zhao, H. & Shepherd, R. F. A Stretchable Multicolor Display and Touch Interface Using Photopatterning and Transfer Printing. Adv. Mater. 28, 9770-9775 (2016).

(56) References Cited

OTHER PUBLICATIONS

Oh, J. Y., Kim, S., Baik, H.-K. & Jeong, U. Conducting Polymer Dough for Deformable Electronics. Adv. Mater. 28, 4455-4461 (2016).

Van Gemert, G. M. L., Peeters, J. W., Sontjens, S. H. M., Janssen, H. M. & Bosman, A. W. Self-Healing Supramolecular Polymers In Action. Macromol. Chem. Phys. 213, 234-242 (2012).

M. Shanthi, P., J. Hanumantha, P., Albuquerque, T., Gattu, B. & Kumta, P. N. Novel Composite Polymer Electrolytes of PVdF-HFP Derived by Electrospinning with Enhanced Li-Ion Conductivities for Rechargeable Lithium-Sulfur Batteries. ACS Appl. Energy Mater. 1, 483-494 (2018).

Shepherd, R. F., Stokes, A. A., Nunes, R. M. D. & Whitesides, G. M. Soft Machines That are Resistant to Puncture and That Self Seal. Adv. Mater. 25, 6709-6713 (2013).

Ameduri, B., Boutevin, B. & Kostov, G. K. Fluoroelastomers: synthesis, properties and applications. Prog. Polym. Sci. 26, 105-187 (2001).

Markvicka, E. J., Bartlett, M. D., Huang, X. & Majidi, C. An autonomously electrically self-healing liquid metal-elastomer composite for robust soft-matter robotics and electronics. Nat. Mater. 17, 618-624 (2018).

Kresse, G. & Furthermuller, J. Efficient iterative schemes for ab initio total-energy calculations using a plane-wave basis set. Phys. Rev. B 54, 11169 (1996).

Goswami, A. & Goswami, A. P. Dielectric and optical properties of ZnS films. Thin Solid Films 16, 175-185 (1973).

Vij, D. R. & Institute of Physics (Great Britain). Handbook of electroluminescent materials. (Institute of Physics Pub, 2004).

Zhang, Q. et al. Exploring a naturally tailored small molecule for stretchable, self-healing, and adhesive supramolecular polymers. Sci. Adv. 4, eaat8192 (2018).

Li, C.-H. et al. A highly stretchable autonomous self-healing elastomer. Nat. Chem. 8, 618-624 (2016).

Shi, X. et al. A self-healing and stretchable light-emitting device. J. Mater. Chem. C (2018). doi:10.1039/C8TC02828A.

Rao, Y. L., et al. Stretchable Self-Healing Polymeric Dielectrics Cross-Lined Through Metal-Ligand Coordination. Journal of the American Chemical Society, Apr. 21, 2016, vol. 138, No. 19, pp. 6020-6027 [Retreived on Jul. 22, 2019]<DOI: 10.1021/JACS. 6B02428>g.

Lu, C., et al. Stretchable Polymer Dielectrics for Low-Voltgage-Driven Field Effect Transistors, ACS Applied Materials & Interfaces, Jun. 30, 2017, vol. 9, No. 30, pp. 25522-25532.

Cao, Y., et al. A Highly Stretchy, Transparent Elastomer with the Capability to Automatically Self-Heal Underwater. Advanced Materials, Oct. 9, 2018, vol. 30, No. 49, pp. 1804602:1-7 [Retrieved on Jul. 22, 2019]<DOI: 10.1002/ADMA 201804602>(see Abstract and Supporting Info).

* cited by examiner

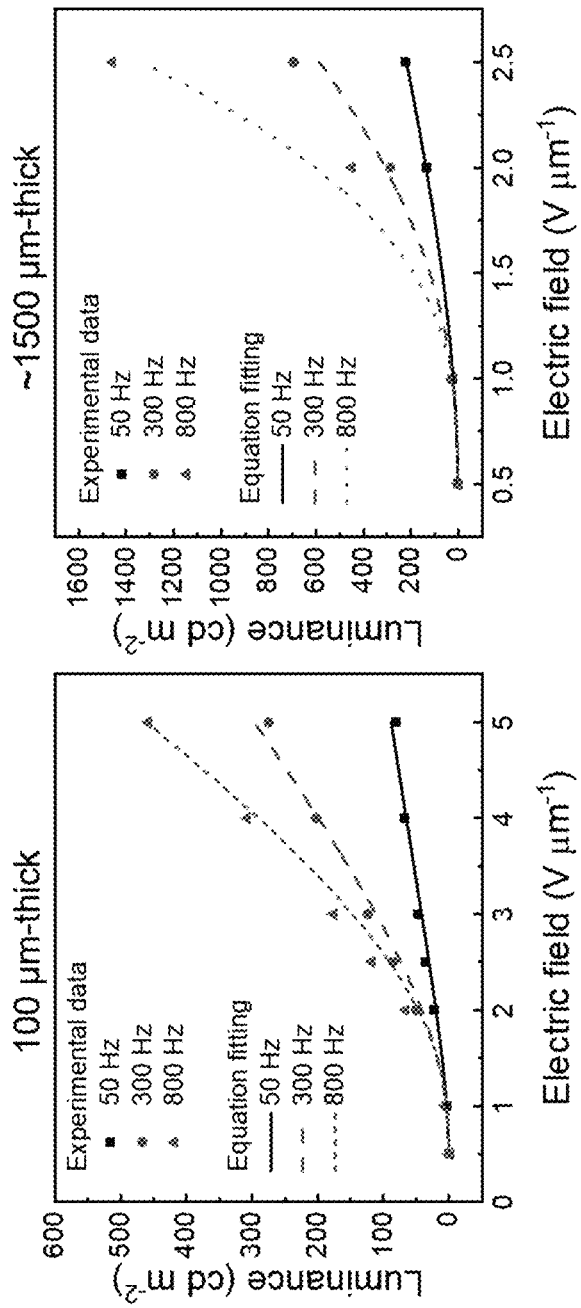
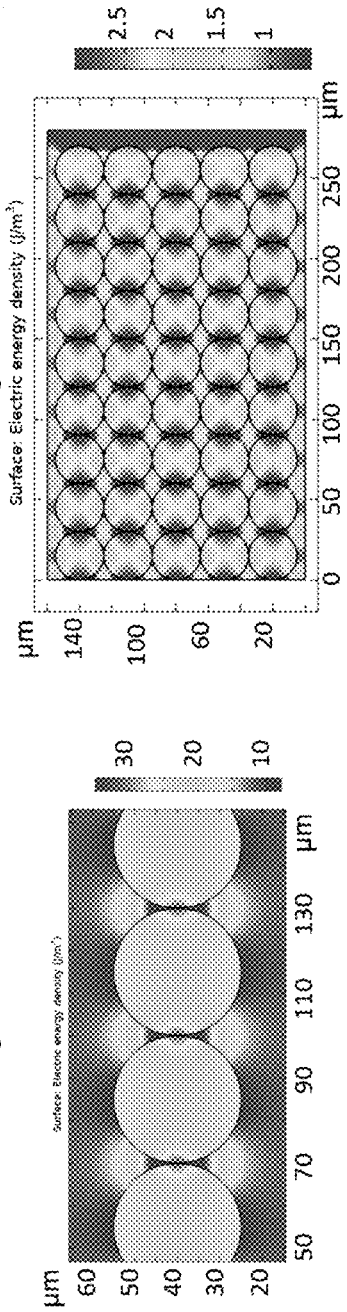
Figure 24a
Figure 24b
Figure 24c
Figure 24d

DIELECTRIC MATERIAL

FIELD OF INVENTION

The present invention relates broadly to a dielectric material, to a device comprising the dielectric material and to use of the dielectric material in the fabrication of a device.

BACKGROUND

Any mention and/or discussion of prior art throughout the specification should not be considered, in any way, as an admission that this prior art is well known or forms part of common general knowledge in the field.

The rapid development of electronic-skins [1], wearable electronics [2], and soft robots [3] has spurred widespread research interest in the development of stretchable, flexible, and conformable dielectric materials for use in such devices, for example for devices capable of displaying optical information [4,5,7]. However, there are a number of challenges for implementation of such devices, for example intrinsically stretchable displays usually require high operating voltages in the range of 100 V-1 kV, and often used high frequencies in the kilohertz (kHz) range to reach sufficiently high illuminance [3,6-13]. At high frequencies, an unpleasant high-pitched whining sound by the power supply is unavoidable. These electronic operating conditions pose challenges to portability, as well as in applying these devices safely and quietly for human-machine interactions. Moreover, permanent mechanical and electrical damage limit their operating lifetimes [14].

Hence, fully self-healable stretchable dielectric materials, for example for optoelectronic displays, that can enable operation at reasonably low voltages is of great interest in these emerging applications. In order to develop stretchable displays as one example, two key components are required: i) a light emitting source, ii) stretchable substrates. For light emitting sources, several emission mechanisms and devices have been explored to achieve electrically luminescent displays: light-emitting diodes (LEDs) [4], light-emitting electrochemical cells (LEECs) [15,16], and alternating current electroluminescence (ACEL) [3,7,17]. In LEDs, both organic and inorganic based devices have reached excellent performance at low operating voltages for use in displays, but careful interfacial engineering of semiconducting electron-hole junctions is required for optimal performance [4]. To achieve a stretchable display, one facile approach is to connect conventional light emitting devices and pattern them on substrates with intrinsically stretchable electrodes [4, 18, 19] or electrodes that are buckled or in serpentine geometries [20]. These light emitting devices, however, are not intrinsically stretchable, unlike organic counterparts using elastomeric composites [3].

Another approach to develop light emitting displays is to use electroluminescence (EL) materials, in which charges that are injected into the EL materials under high applied electric field in light emitting capacitor (LEC) structures, impact and excite luminescent centres, subsequently resulting in the emission of photons via the radiative relaxation of luminescent centres [21]. Since the first EL device was reported, several electroluminescent layered structures have been explored including thin films (TFEL) [22], DC (direct current) powder EL (DCPEL) [23], and AC (alternating current) Powder EL (ACPEL) [3,7]. Compared to other emission mechanisms, the dispersion of EL powders in the dielectric matrix of ACPEL devices potentially allows for greater flexibility in the combination of emissive and dielectric materials. The dielectric material can serve as the stretchable matrix [3, 7] which enables fabrication of devices such as stretchable displays and soft robotics [3]. However, to-date, none of the stretchable ACPEL devices demonstrated have been shown to be capable of self-healing from mechanical damage.

Barium titanate ($BaTiO_3$) ceramic particles can be used to improve the permittivity of the resultant composite, for example halogen based composites, for device applications such as light guiding device, electro-luminance device, a solar energy harvesting device, electronic device modulated by an electric field such as a field-effect transistor. In LEC devices, for example in halogen based composites with EL particles such as phosphor powder, the increased permittivity can lower the emission threshold voltage and enhance the brightness of the device at a given applied electric field. However, when dispersed together with the phosphor powder in a single layer, the luminance will be inevitably affected by the reduction in the volume fraction of phosphor particles dispersed. When the $BaTiO_3$ particles are used in a separate dielectric layer, the emissive of the light will only be from one side of the device as the opaque $BaTiO_3$ particles block the emissivity.

Embodiments of the present invention seek to address at least one of the above problems.

SUMMARY

In accordance with a first aspect of the present invention there is provided a dielectric material comprising a halogen-based elastomer mixed with a halogen based surfactant and exhibiting electro-mechanical self-healing properties and/or an increased dielectric constant compared to the halogen-based elastomer.

In accordance with a second aspect of the present invention there is provided a dielectric material comprising a halogen-based polymer mixed with a halogen based surfactant and exhibiting an increased dielectric constant compared to the halogen-based polymer.

In accordance with a third aspect of the present invention there is provided a device comprising the dielectric material of the first or second aspects.

In accordance with a fourth aspect of the present invention there is provided the use of the dielectric material of the first or second aspect in the fabrication of a device.

In accordance with a fifth aspect of the present invention there is provided a method of imparting electro-mechanical self-healing properties and/or an increased dielectric constant to a halogen-based elastomer, the method comprising mixing the halogen-based elastomer with a halogen based surfactant.

In accordance with a sixth aspect of the present invention there is provided a method of imparting an increased dielectric constant to a halogen-based polymer, the method comprising mixing the halogen-based polymer with a halogen based surfactant.

BRIEF DESCRIPTION OF THE DRAWINGS

Embodiments of the invention will be better understood and readily apparent to one of ordinary skill in the art from the following written description, by way of example only, and in conjunction with the drawings, in which:

FIGS. 24a and b show graphs illustrating that the brightness of devices according to example embodiments increases with the increase in thickness in the dielectric matrix (70 EL; 100 µm (FIG. 24a) vs 1500 µm (FIG. 24b)) when comparing with same E and frequencies applied.

FIGS. 24c and d show COMSOL simulation results comparing the single and multi-layer(s) of phosphor particles, respectively.

FIG. 35b shows a schematic cross-sectional side view of the device of FIG. 35a.

DETAILED DESCRIPTION

Embodiments of the present invention can provide an intrinsically self-healable dielectric material, for example for use in electroluminescent (EL) devices. The self-healing dielectric material according to example embodiments can be used as the polymer matrix for EL particles for use in EL devices. It is noted that the dielectric material according to embodiments of the present invention is not limited to use in EL devices according to example embodiments described herein, but can have many other applications including, but not limited to, in capacitors, solar devices, detectors etc.

The self-healing dielectric material according to example embodiments described herein can be stretched up to 800%, and can exhibit high relative dielectric permittivity of 20. Electroluminescence can be achieved in EL device applications according to example embodiments described herein at low alternating voltages of 30 V at a low frequency of 10 Hz. Such soft, repeatably self-healing EL devices according to example embodiments can allow new potential uses in artificial electronic skins and stretchable display interfaces that are reconfigurable, and robust to mechanical damage.

In example embodiments described herein a self-healing EL opto-electronic device is provided, employing an ACPEL device architecture advantageously having longer lifetimes and stable threshold voltage compared with DC powered EL devices [21].

In example embodiments, a transparent, halogen based elastomer mixed with a halogen based surfactant can exhibit an enhanced dielectric constant. These halogen based elastomer mixed with a halogen based surfactant according to example embodiments allow the phosphor powder to be packed at high volume percentage and hence the luminance can be tuned to be very high. Moreover, by using the high dielectric constant, transparent, halogen based elastomer mixed with a halogen based surfactant, the electroluminescence can be achieved at all angle of views according to example embodiments.

Figure 1A:
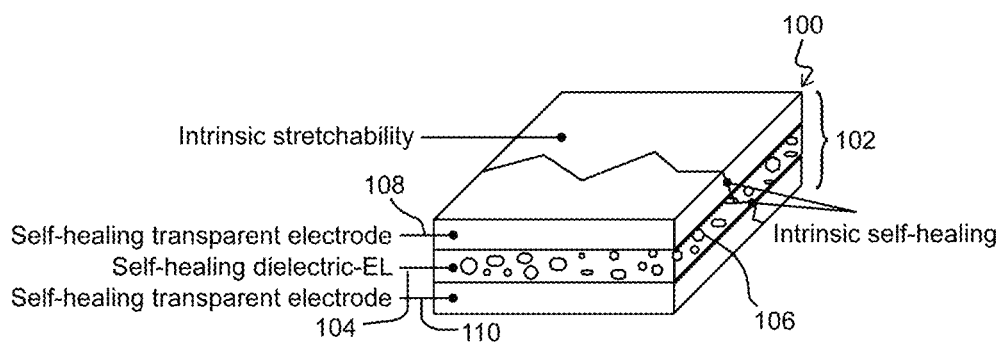
FIG. 1*a* shows a schematic diagram illustrating a self-healing electro luminescence device according to an example embodiment.

FIG. 1a shows the design of a device 100 according to an example embodiment. The basic design for a working ACPEL device includes the formation of a capacitor 102 by sandwiching an EL dielectric layer, here in the form of a dielectric layer 104 according to an example embodiment with EL particles e.g. 106 dispersed therein, between two conductive electrodes 108, 110. In the AC-driven device 100, the dielectric layer 104 according to example embodiments is advantageously capable of self-healing. It is noted that in different embodiments, the dielectric layer 104 may be used without EL particles, and/or mixed with EL polymers, i.e. light-emitting fluorescent polymers such as spiro-copolymers & poly(phenylenevinylene) (PPV)—based polymers. Embodiments of the present invention can be applied to various devices, including optoelectronic devices such as EL devices or solar cells, the latter e.g. by adding in solar cell polymers such as PPV derivatives, poly(thiophene) derivatives, and polyfluorene derivatives into the dielectric layer 104 in different embodiments.

In the device 100, the self-healing dielectric layer 104 is fabricated by mixing a fluorosurfactant into a fluoroelastomer. The self-healing capability according to example embodiments could be attributed to the synergistic intermolecular interactions, i.e. the hydrophobic interactions between the halogenrich, here fluorinerich surfactant and the halogen-elastomer, here fluoroelastomer. These reversible non-covalent bonds can be repeatedly broken and reformed in contrast to an additive that does not give rise to self-healable properties. In addition, the presence of the low molecular weight halogen-surfactant, here fluorosurfactant acts as a plasticizer [24] imparting greater mobility to the polymer chains and helping to restore the bonds quickly, which further facilitates self-healing.

Figure 2:
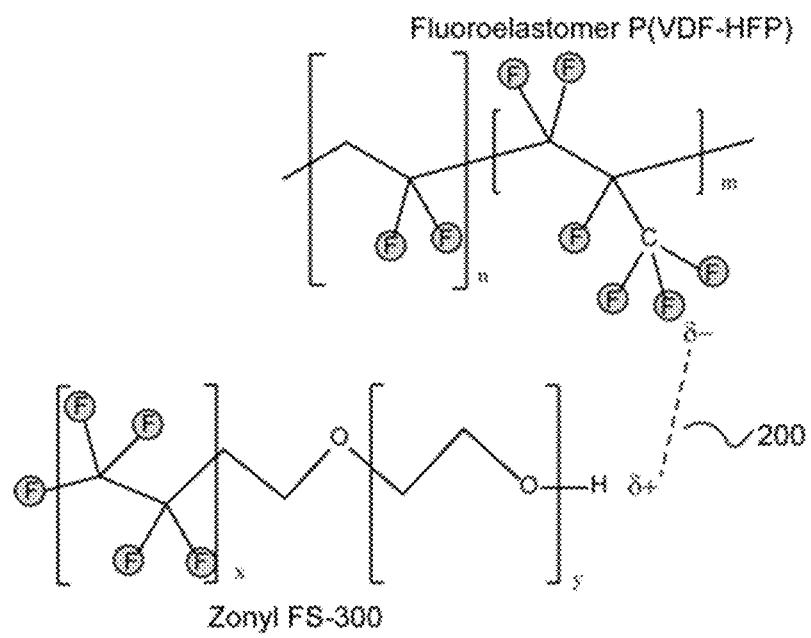
FIG. 2 shows a schematic of the reversible bonds in the self-healing dielectric (fluorine-rich surfactant Zonyl FS-300 and fluoroelastomer P(VDF-HFP)) according to an example embodiment. It is postulated that there exist hydrophobic interactions between the fluorine-rich molecules, and there are electrostatic interactions between the molecules. These bonds can be broken and reformed in ambient conditions.

With reference to FIG. 2, regarding the reversible bonds in the self-healing dielectric fluorine-rich surfactant and fluoroelastomer P(VDF-HFP) according to an example embodiment, it is thus postulated that there exist hydrophobic interactions between the fluorine-rich molecules, and there are electrostatic interactions 200 between the molecules. These bonds can be broken and reformed in ambient conditions. Importantly, this phenomenon is believed to be also applicably for other combinations of halogen elastomer and halogen surfactants in different embodiments, as halogens are known to be highly electronegative and reactive.

In contrast, a non self-healable material resulted from of P(VDF-HFP)-($C_{14}H_{22}O(C_2H_4O)_n$). ($C_{14}H_{22}O(C_2H_4O)_n$) is also a surfactant but does not have halogen, specifically fluorine groups for the reversible bonds formation. FIG. 2c shows a photograph illustrating self-healing of a dielectric material without EL particles, according to an example embodiment.

Returning to FIG. 1a, in the device 100 the self-healing transparent electrodes 108, 110 consists of the fluoroelastomer and an ionic liquid 1-ethyl-3-methylimidazolium trifluoromethanesulfonate (EMIM Otf) [25]. The electrodes 108, 110 in this example embodiment also self-heal as there is a highly reversible ion-dipole interaction between the ionic liquid and the host polymer [25]. However, it is noted that the dielectric material according to example embodiments may be used with non-self-healing electrodes, for example, but not limited to, patterned electrodes with larger stretchability than the dielectric material, or electrodes that are buckled or in serpentine or in discontinuous geometries.

It was observed in the device 100 according to an example embodiment that the electrode and dielectric-EL materials are advantageously capable of self-adhesion, without utilizing any extra materials or surface treatment. Therefore, the device fabrication is facile and straightforward without the need for significant interfacial engineering. The self-healing properties of the device 102 according to an example embodiment potentially increases its robustness against mechanical damage events and prolongs its useful operating lifetime [26]. This was achieved in the device 102 by sandwiching the EL powder-dielectric 104/106 between ionically conducting electrodes 108, 110, all of which are intrinsically stretchable and exhibit self-healing capabilities in an example embodiment as, mentioned above.

Figure 1B:
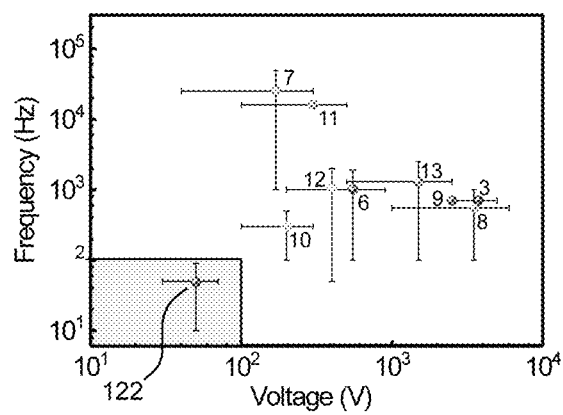
FIG. 1b shows a comparison of operating voltages and frequency ranges reported for stretchable EL devices and for a device according to an example embodiment.

A device according to an example embodiment can also be fabricated by 3D printing processes, enabling the patterning of e.g. different display designs. Accordingly, by using dielectric materials according to example embodiments with high dielectric constant, one is able to minimize its threshold voltage. The activation voltages and operational frequencies for state-of-the-art reported intrinsically stretchable EL devices are plotted in FIG. 1b [3,6-13]. In comparison, with a dielectric thickness of ~1 mm, a device according to an example embodiment was able to be illuminated at less than 100 V and 100 Hz, see data point 122 with error bars.

The use of lower electronic voltages and frequencies can advantageously enable the device to be used more readily in applications. Moreover, when operated at low frequencies, the lifetime of the device can be prolonged [27]. Extended lifetimes are further anticipated because EL powders encapsulated in a dielectric matrix according to example embodiments degrades at a lower rate due to reduced moisture infiltration rates [14]. As the materials are soft, the electrodes and dielectric-EL according to example embodiments can be reconfigured readily by punching or cutting into desirable shapes and illuminated.

Figure 3:
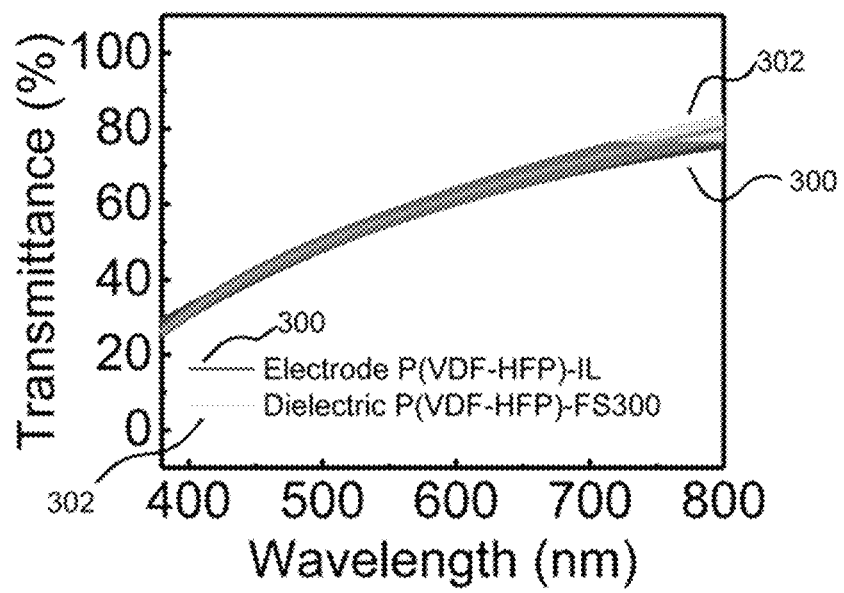
FIG. 3 shows transmittance spectra of the electrode and dielectric of a device according to an example embodiment.

Transmittance spectra of the electrode (spectrum 300) and the dielectric (spectrum 302) according to an example embodiment were measured by a Shimadzu spectrophotometer (UV-2700) and are shown in FIG. 3. The electrode and dielectric materials are both transparent in the visible light spectrum, with higher transparency of ~80% at 800 nm visible wavelength. The transparency of these layers can further advantageously enable all-angle illumination. Infrared (IR) Transmittance spectra of the dielectric according to an example embodiment were also measured, confirming transparency in the IR. In addition, it was found that the dielectric according to an example embodiment is also transparent in UV.

Figure 4A:
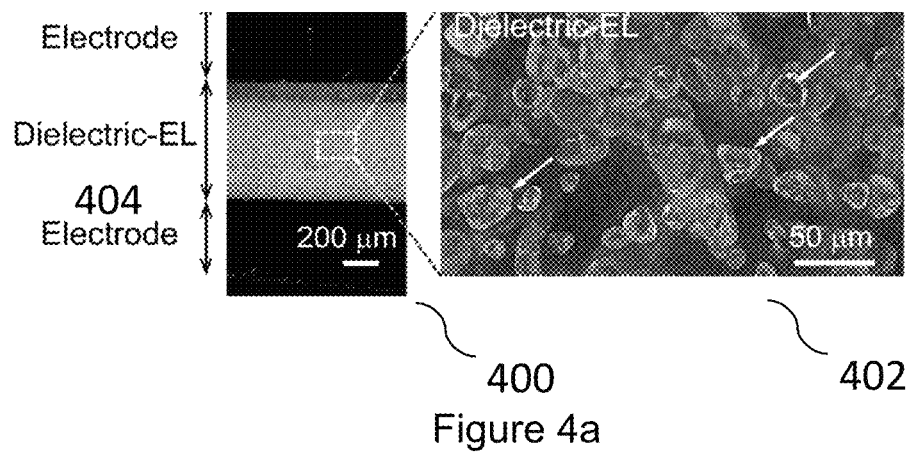
FIG. 4a shows an optical micrograph showing the three-layered structure according to an example embodiment.
Figure 5:
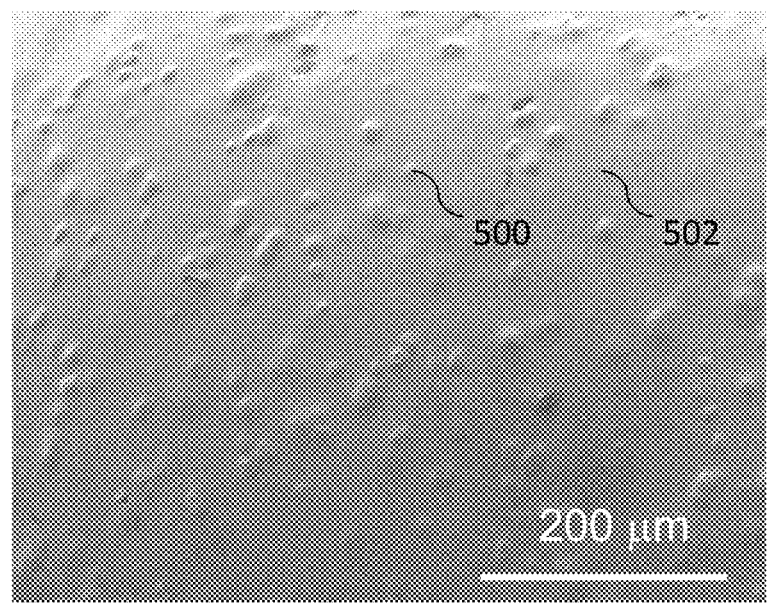
FIG. 5 shows a scanning electron microscopy (SEM) image of the surface of dielectric-EL material of a device according to an example embodiment with microparticles uniformly dispersed in the dielectric matrix.

Owing to the transparency in the device 400 according to an example embodiment, the EL particles e.g. 402 dispersed inside the dielectric layer 404 can be visualized under an optical microscope as shown in FIG. 4a. These particles e.g. 402 are 10-50 μm in diameter in this example embodiment, and are well dispersed inside the dielectric matrix 402. An SEM image of the surface of the dielectric-EL material according to an example embodiment is shown in FIG. 5. The image shows that the EL microparticles e.g. 500 are uniformly dispersed in the dielectric matrix 502.

Figure 4B:
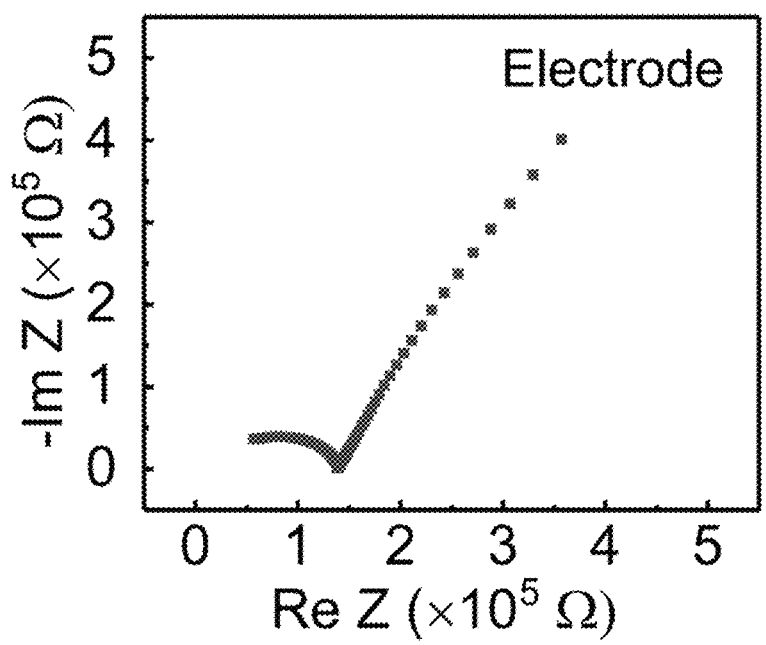
FIG. 4b shows a cole-cole plot depicting the ionic conductivity of the electrode of a device according to an example embodiment.
Figure 4C:
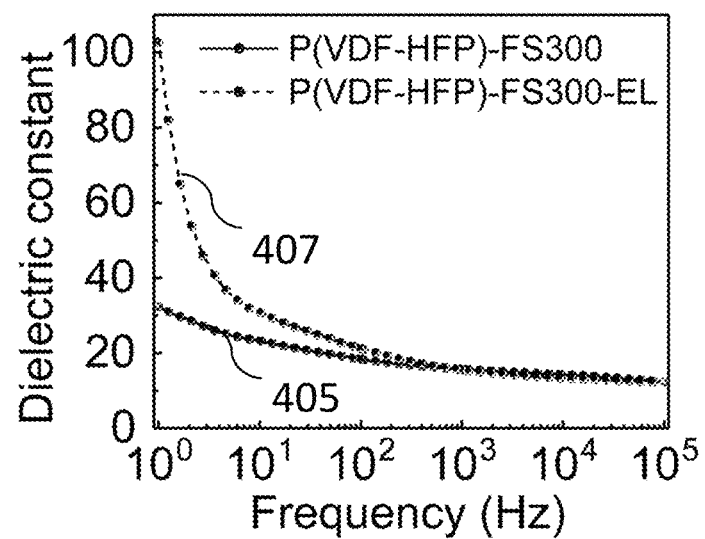
FIG. 4c shows a graph of the dielectric constants of the dielectric and dielectric-EL of a device according to an example embodiment.

The electrical properties of devices according to example embodiments were also investigated and characterized. The ionic conductor, i.e. the electrodes, has a high ionic conductivity of $1.2 \times 10^{-4}$ S cm$^{-1}$ as shown in FIG. 4b; while the dielectric material according to example embodiments has high dielectric constants of 12 to 32 (curve 405) over a broad frequency range as demonstrated in FIG. 4c. It was observed that the polymer composite with EL particles (curve 407) shows much higher permittivity at frequencies under 100 Hz when compared to the polymer itself, while the permittivity overlaps with that of the polymer itself at higher frequencies. The permittivity of the composite EL layer according to an example embodiment was found to be higher than those values previously reported for existing layers [28]. As a result, a higher effective electric field on the EL particles can advantageously be achieved at low voltages, resulting in improved luminance at low voltages.

Figure 4D:
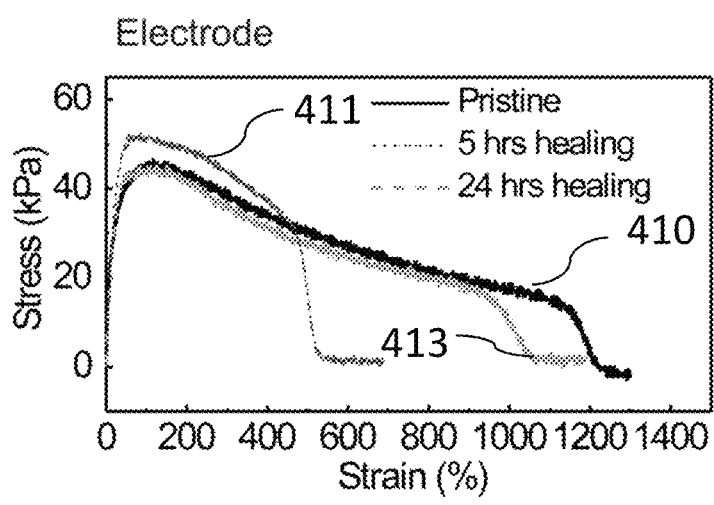
FIG. 4d shows stress-strain curves of the pristine and healed samples of electrode of a device according to an example embodiment.
Figure 4E:
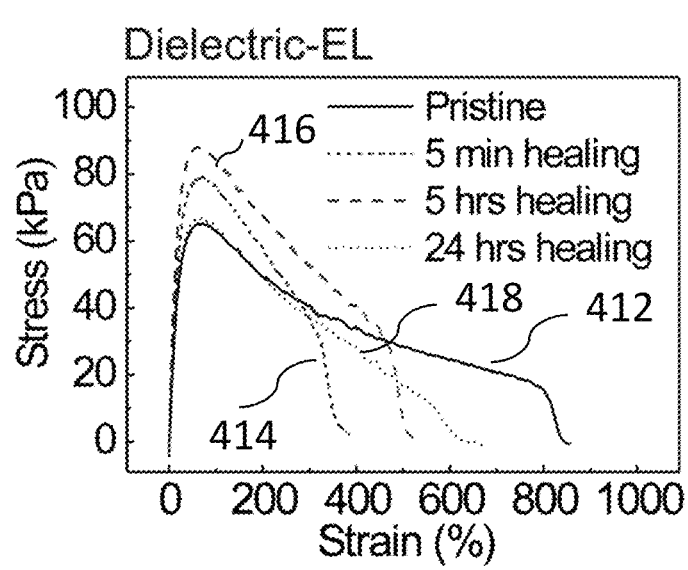
FIG. 4e shows uniaxial tensile behavior of the pristine and healed samples of the dielectric-EL material of a device according to an example embodiment.
Figure 4F:
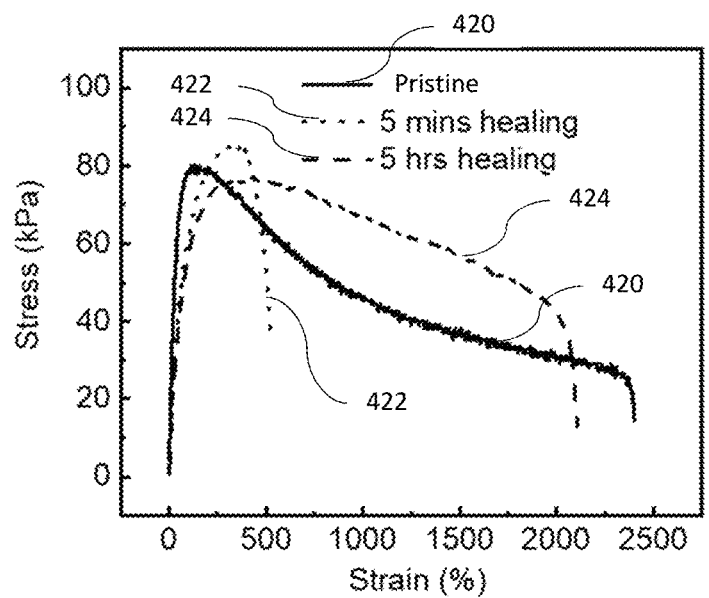
FIG. 4f shows uniaxial tensile behavior of the pristine and healed samples of the dielectric material without EL particles according to an example embodiment.
Figure 6:
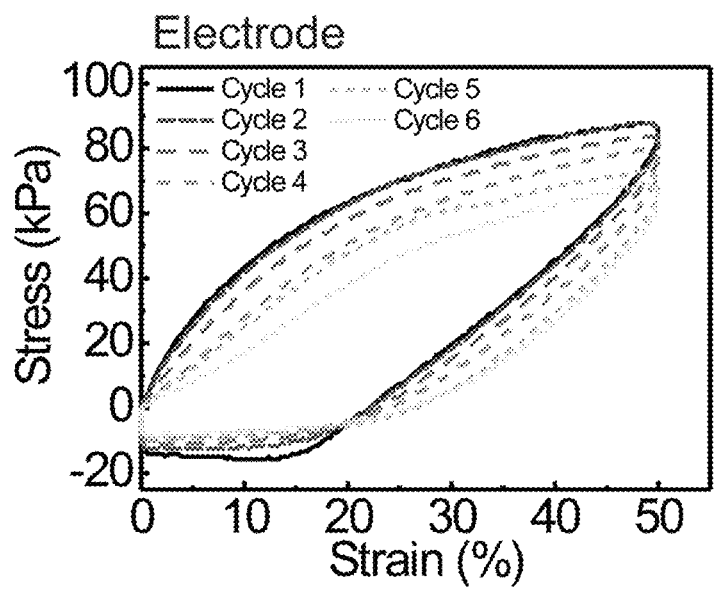
FIG. 6 shows stress-strain data for the electrode material of a device according to an example embodiment subjected to six loading-unloading cycles.
Figure 7:
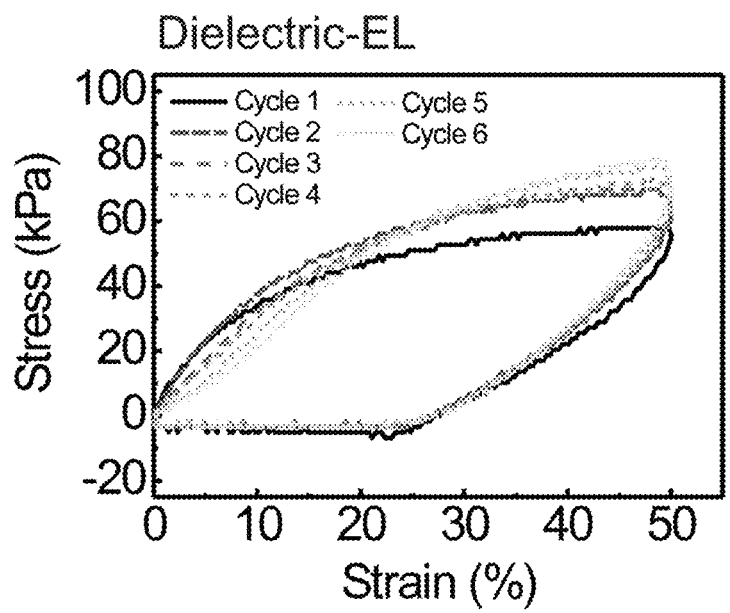
FIG. 7 shows stress-strain data for the dielectric-EL material of a device according to an example embodiment subjected to six loading-unloading cycles.

The electro-mechanical performance of devices according to example embodiments was also characterized. The electrode and the dielectric layer mixed with EL particles in devices according to example embodiments showed excellent stretchability under tensile tests. The pristine electrode (curve 410) could easily be stretched to over 1200% before observing any failure (see FIG. 4d) while the pristine dielectric-EL layer (curve 412) according to an example embodiment could be stretched to over 800% strain (see FIG. 4e). FIG. 4d also shows the stretching data after a cut, specifically after 5 hours and 24 hours in curves 411 and 413, respectively. FIG. 4e also shows the stretching data after a cut, specifically after 5 minutes, 5 hours and 24 hours in curves 414, 416 and 418, respectively. FIG. 4f shows a pristine dielectric layer without EL particles (curve 420) according to an example embodiment could be stretched to over 2000% strain. FIG. 4f also shows the stretching data after a cut, specifically after 5 minutes and 5 hours in curves 422 and 424, respectively. The electrodes and dielectric with EL particles exhibit comparable shear moduli of 4.1±0.7 kPa and 4.1±0.2 kPa respectively, which advantageously acts to minimize interfacial discontinuities that can cause slipping or delamination when they are assembled together to make the EL device according to an example embodiment. The electrode and dielectric-EL according to example embodiments show good recovery even after multiple cycles of stretching to 50% as shown in FIG. 6 for the electrode and FIG. 7 for the dielectric-EL according to an example embodiment.

Figure 8:
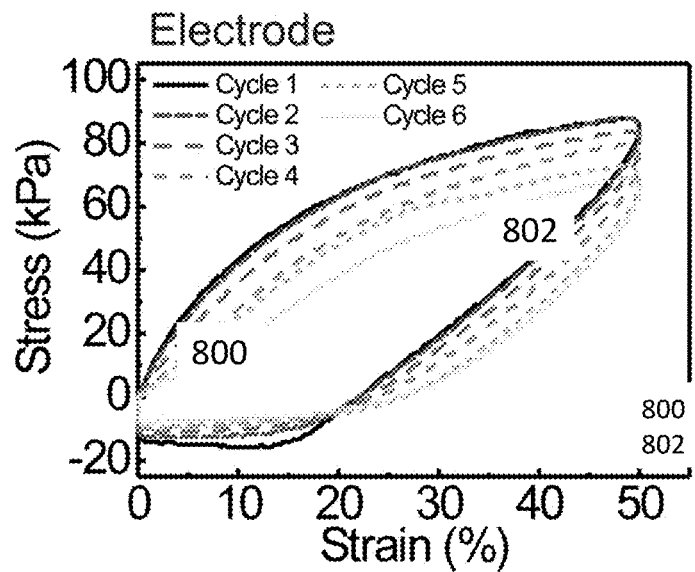
FIG. 8 shows differential scanning calorimetry (DSC) micrographs for obtaining the glass transition temperatures ($T_g$) of the electrode and dielectric of a device according to an example embodiment.

The low modulus and high stretchability of these materials can be attributed to their low glass transition temperature ($T_g$) of −55° C. and −25° C. for electrode and dielectric respectively, which are much lower than the room temperature, as revealed by the differential scanning calorimetry (DSC) results shown in FIG. 8. Specifically, $T_g$ of the electrode and dielectric obtained from the DSC micrographs 800, 802, respectively. Their $T_g$ being very much lower than the room temperature shows that the polymer chains are mobile at ambient environments.

In addition, and returning to FIGS. 4d to 4e, the electrode and dielectric layers according to example embodiments also showed good mechanical properties after self-healing. The healing process begins almost immediately when freshly cut interfaces were pressed together as adhesion was observed with gentle compressive strains (<5%). After 5 hours, the electrode layer (curve 411) the dielectric layer (curve 424) and dielectric-EL layer (curve 416) exhibited good stretchability to half or more of the ultimate strain of the pristine samples, as shown in FIGS. 4d to 4e. In addition, the dielectric layers showed rapid self-healing in mechanical properties after just 5 minutes (curves 414 and 422) of healing, noting that the dielectric layer already approached that of the pristine layers (curve 422). After 24 hours the mechanical properties of the electrode layer (curve 418) and the dielectric-EL layer (curve 415) also approached those of the pristine layers. Indeed, it was observed that the ultimate tensile strength of the healed dielectric-EL sample can sometimes be higher than that of the pristine sample. This may be attributed to the difficulty involved in aligning the cut samples accurately resulting in thicker interfaces between the cut samples and hence, a higher tensile strength. Similar observations have been reported in literature [29, 30].

A device according to an example embodiment was also characterized for lighting up under different tensile strains at 50 V and 100 Hz. The brightness of the device initially increases with stretch before finally decreasing. The initial increase in brightness can be explained by uniaxial tensile strain causing the device to contract in the lateral direction due to Poisson's effect. As a result, the area density of the EL particles within the device increases. The electric field acting across the dielectric layer also increases due to the decrease in its thickness. These two factors result in an increased brightness of the device with the initial increase in stretch. However, beyond a particular strain ratio, the dielectric layer thickness in the device 800 decreases considerably, possibly resulting in a lower number of electron-hole recombination events and an overall decrease in luminance.

The capacitance of the device under uniaxial stretch was also measured. As expected in uniaxial elongation, the capacitance at 100 Hz increased almost linearly with initial stretch [3]. However, at large strains, the capacitance becomes difficult to measure and unstable, resulting in a large deviation from the mean. This may be due to the formation of conductive paths between the electrodes due to thinning of the dielectric layer. The added robustness rendered by the device's self-healing capabilities potentially further prolongs the usage lifetime.

Figure 9:
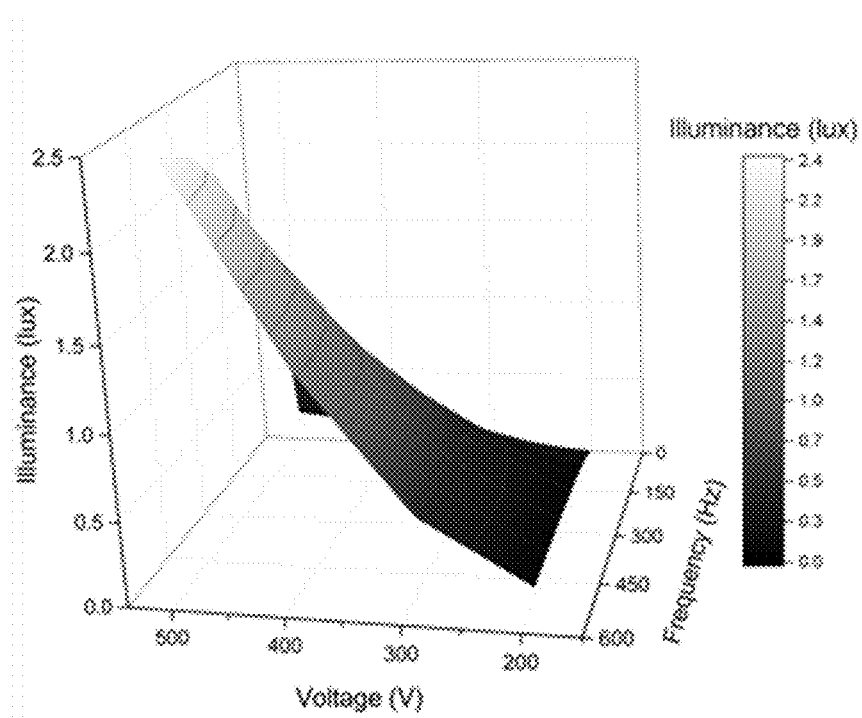
FIG. 9 shows the luminance of a device according to an example embodiment operating under various voltages and frequencies.

In addition to healing mechanically, devices according to example embodiments advantageously heal in performance (luminance) almost instantaneously upon pressing the fresh cut interfaces together. The original illuminance of a device according to an example embodiment is compiled and shown in FIG. 9. Specifically, the device according to an example embodiment can be operated at very low voltages and frequencies. The luminance increases with the voltage and frequency, but saturates at a certain frequency for an applied alternating voltage.

To investigate the self-healable dielectric material according to example embodiments, a device according to an example embodiment was cut through all three layers, and subsequently the two damaged surfaces were pressed together. After 5 minutes, it was observed that the damaged surfaces at the interface had begun to adhere to one another. Although a scar is visible, when the device is subjected to alternating voltage of 400 V and 50 Hz, the device retains its original performance (illuminance) and even the damaged interface region emits light. Similarly, when the device is subjected to alternating voltage of 800 V and 50 Hz, the device retains its original performance (illuminance) and even the damaged interface region emits light.

Figure 10:
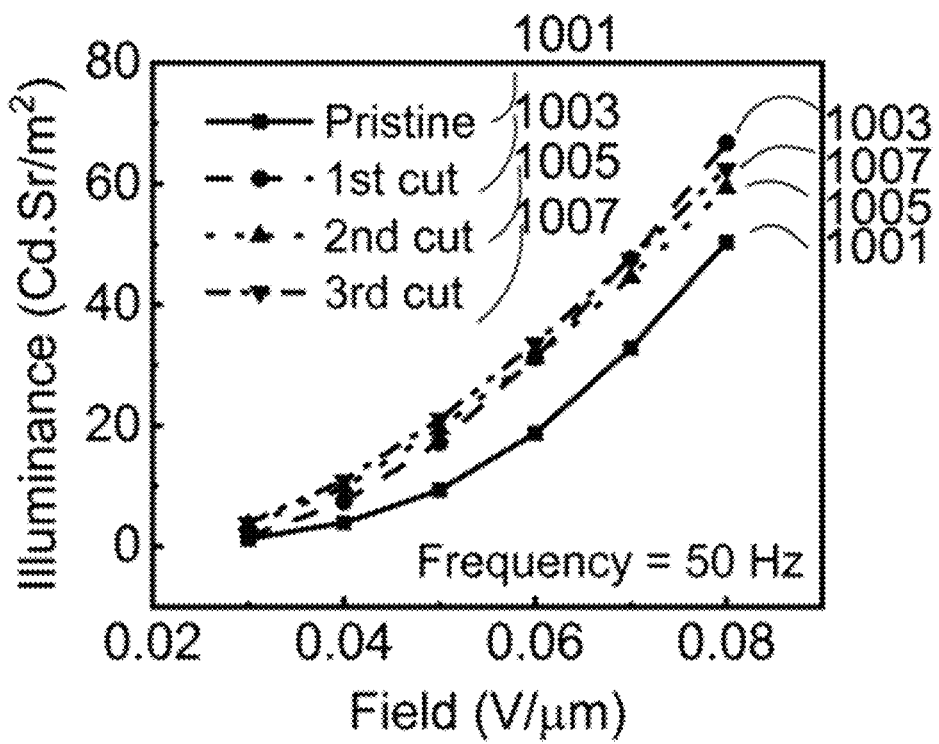
FIG. 10 shows the luminance vs. voltage data of a device according to an example embodiment illustrating opto-healing with 3 subsequent cuts and healing.

FIG. 10 depicts the illuminance of the device at 50 Hz as a function of voltage, before (curve 1001) and after healing (curves 1003, 1005, 1007 after 1st, 2nd and third cut, respectively). Here, the self-healing efficiency of the luminance is defined, $\eta_{optical}$ (opto-healing efficiency) as the proportion of luminance restored relative to the original luminance. Surprisingly, brightness after the healing was enhanced, with a mean $\eta_{optical}$ of 111±6%. This result is in agreement with the mechano-healing of the dielectric-EL layer in the device.

Figure 11A:
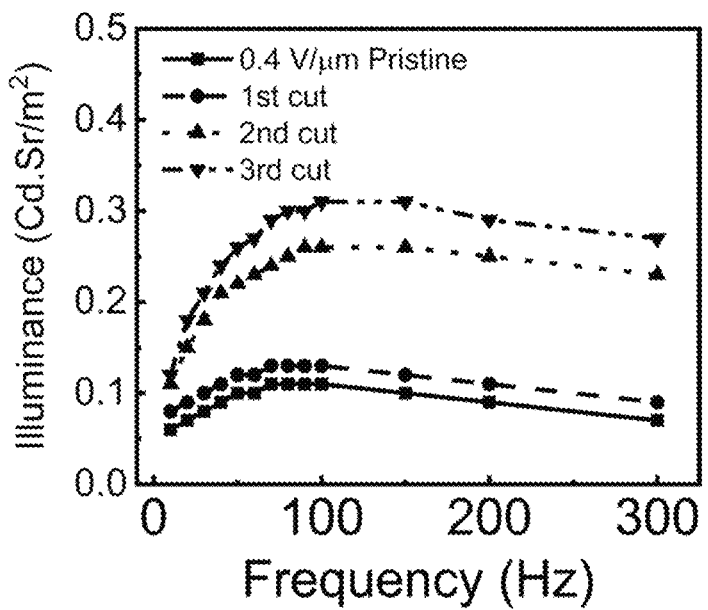
FIG. 11a depicts the luminance of the device according to an example embodiment at 400 V as a function of frequency, before and after healing.
Figure 11B:
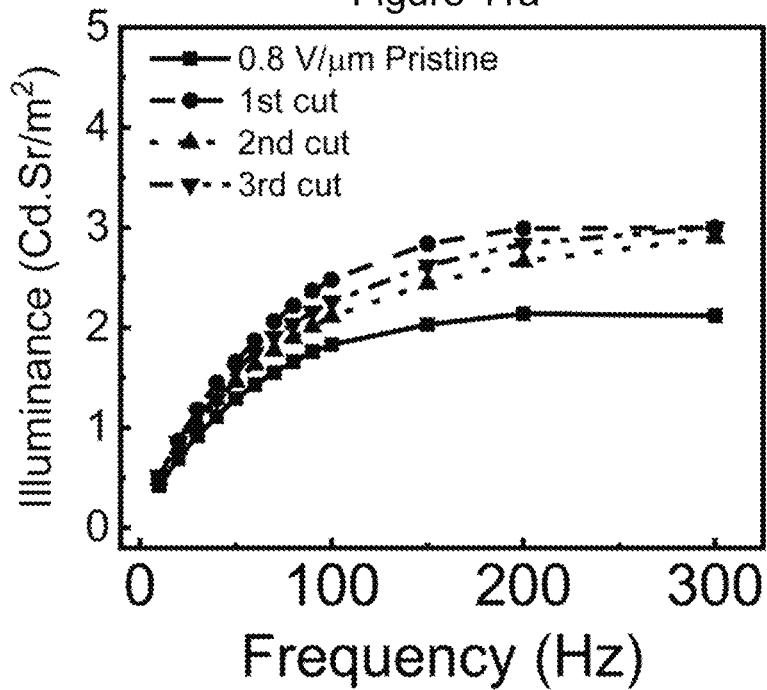
FIG. 11b depicts the luminance of the device according to an example embodiment at 800 V as a function of frequency, before and after healing.

FIG. 11a depicts the illuminance of the device at 400 V (0.4 V/m) as a function of frequency, before (pristine) and after healing (after 1st, 2nd and third cut). FIG. 11b depicts the illuminance of the device at 800 V (0.8 V/μm) as a function of frequency, before (pristine) and after healing (after 1st, 2nd and third cutIlluminance generally increased after the healing, as there is unrestrained pressure applied when putting the cut interfaces back. It was found that the luminance of the healed region is depending on how much the cut interfaces are pressed together. The more the interface is compressed, the brighter the luminance.

The self-healing and reconfigurable capability of devices according to example embodiments was further demonstrated by cutting a blue and an orange device, each into half, subsequently putting two halves of different colors together. The cut interfaces heal to form one single device with a different color emitting from each half of the device. This 'reconfigured' device can be subsequently stretched, and it displays higher luminance when compared to the unstretched state. In sharp contrast, for a typical non-self-healing EL device as a control comparison, electro-mechano-optical self-healing was not observed. After damaging and pressing the fractured surfaces together, the control EL device broke down catastrophically when operated at its normal operating conditions. Specifically, the electrode material of the control EL device was made up of a silver nanowire solution coated on a poly(vinyl alcohol), and the dielectric material was Ecoflex mixed with EL [3, 6]. After damaging and pressing the fractured surface together, the control EL device broke down with electrical discharge given out when operating under its high required electrical voltage operating conditions (250 V, 1000 Hz).

Design and Fabrication of Devices According to Various Example Embodiments

Figure 12:
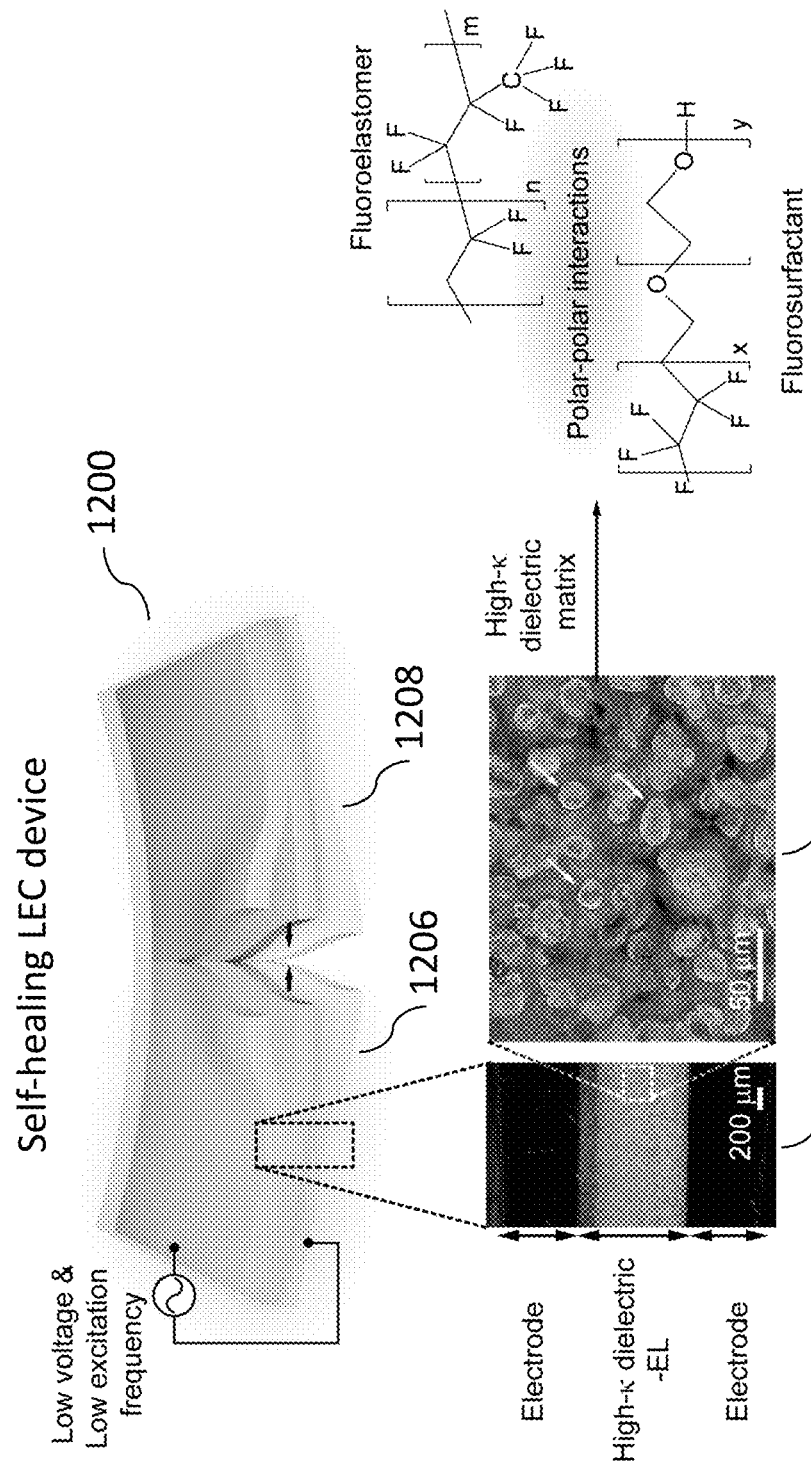
FIG. 12 shows a schematic illustrating the device architecture according to an example embodiment is provided.

The above description with reference to FIGS. 1 to 11 focused on the stretchability and self-healing properties of example embodiments. Also, existing LEC systems focused on use of stretchable electrode materials[17], but did not address the intrinsic high absolute voltages needed to achieve electro-luminance. To significantly lower the voltages (and hence E) required, further example embodiments will now be described based on the strategy that incorporates a highly transparent high-κ dielectric-EL composite layer sandwiched between a pair of transparent electrodes[13]. With reference to FIG. 12, a schematic illustrating the device 1200 architecture according to an example embodiment is provided. The entire device 1200 is intrinsically self-healable and highly stretchable, similar to the embodiments described above with reference to FIGS. 1 to 11. Optical micrographs 1202, 1204 show a cross-sectional view of the three-layered device 1200 and a zoom into the cross-sectional view of the high-κ dielectric matrix, respectively. Phosphor particles are pointed with white arrows. The high-κ dielectric matrix consists of a fluoroelastomer with non-ionic fluorinated surfactants believed to be bonded by polar-polar interactions. The reversible bonds between the molecules can be broken and reformed in ambient conditions. In this embodiment, the device 1200 comprises an orange-light emitting portion 1206 and a blue-light emitting portion 1208 reconfigured and healed into the one device 1200 at ambient environmental conditions. The device 1200 was demonstrated to function when strained after self-healing.

Figure 13A:
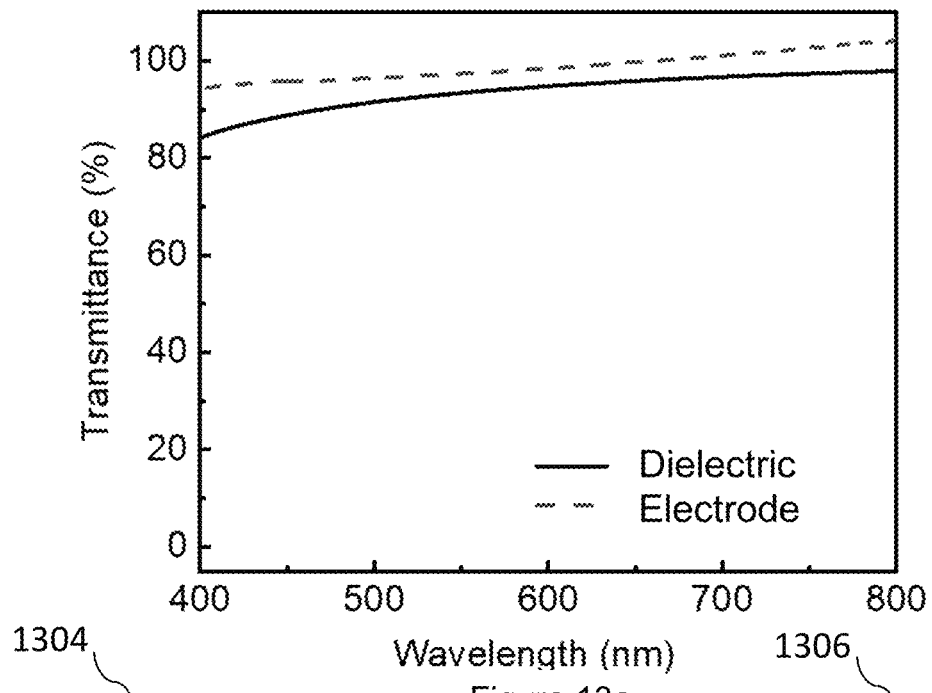
FIG. 13a shows transmittance spectra measured by a spectrophotometer (Shimadzu 1800). The dielectric material (n=3; thickness ~67 μm) and electrode material (n=3; thickness ~100 μm) are highly transparent in the visible light spectrum.
Figure 13B:
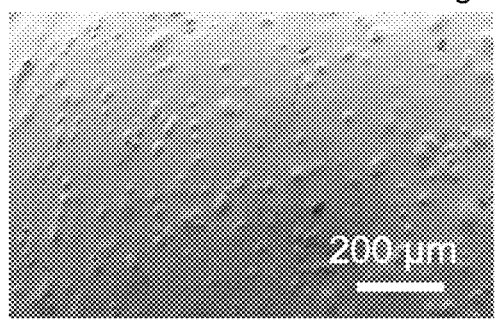
FIGS. 13b and c show a scanning electron microscope (SEM) image 1304 and an optical microscope (OM) image 1306, respectively, of a device's dielectric-EL matrix according to an example embodiment, illustrating that EL particles are well dispersed inside the dielectric.
Figure 13C:
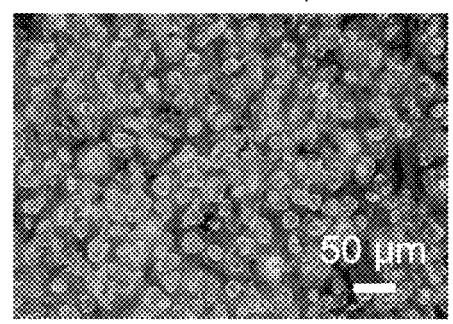

In various embodiments, the optical transparency of the electrodes and the high-κ dielectric ranges from 94%-100% and 80%-97% in the visible light wavelengths, respectively. It was also observed that EL phosphor particles dispersed well within the dielectric matrix, compare micrograph 1202. FIG. 13a shows transmittance spectra measured by a spectrophotometer (Shimadzu 1800). The dielectric material (n=3; thickness ~67 μm) and electrode material (n=3; thickness ~100 μm) are highly transparent in the visible light spectrum. FIGS. 13b and c show a scanning electron microscope (SEM) image 1304 and an optical microscope (OM) image 1306, respectively, of a device's dielectric-EL matrix, illustrating that EL particles are well dispersed inside the dielectric.

A poly(vinylidene fluoride) (PVDF)-based elastomer as the dielectric matrix material was chosen according to example embodiments due to their high dielectric permittivity values[21]. In order to enhance the maximum strain that can be applied to the typically brittle PVDF-based polymer, a small amount of non-ionic fluorinated surfactant to the high-κ fluoroelastomer, as will be described in more detail below. In contrast, previous works had incorporated ionic liquids to make conductive self-healing ionogels[13, 22]. Although these ionic based additives enhance the permittivity of the materials, they cannot be used as the insulating dielectric layer in LECs, because the ionic conductivity removes the capacitive effects needed for light emission. Moreover, there is no reported combination of a non-ionic fluorinated surfactant additive in a fluoroelastomer for dielectrics in LECs. Serendipitously, the resulting dielectric according to example embodiments demonstrated intrinsic self-healing properties and enhanced dielectric permittivity.

Figure 14:
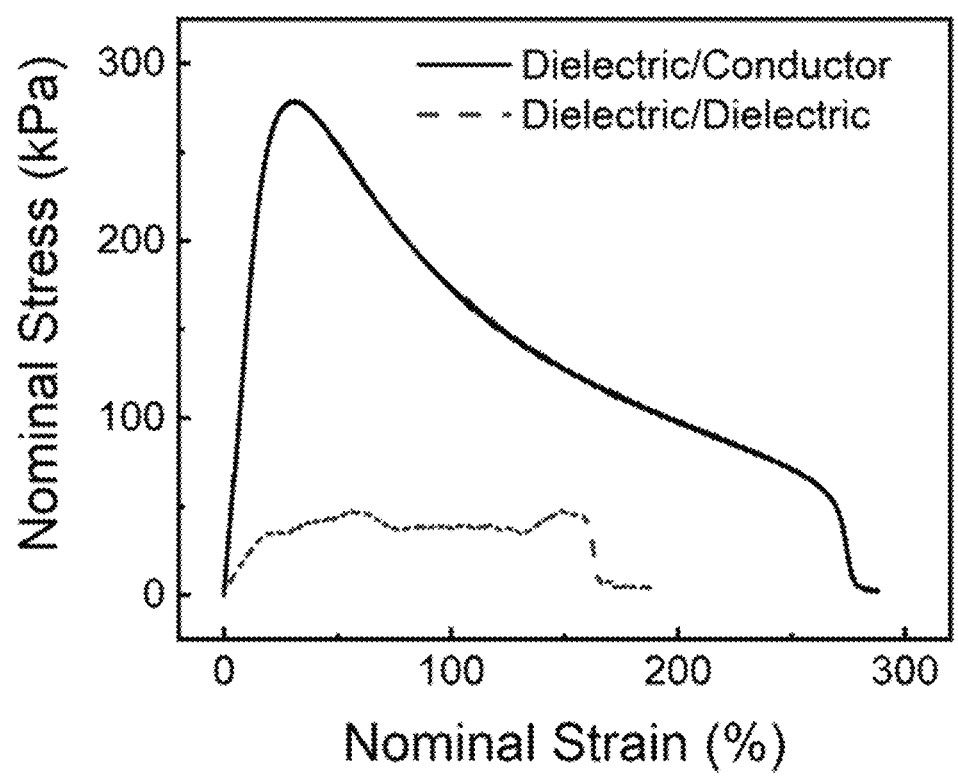
FIG. 14 shows a graph illustrating peel test results for dielectric/conductor and dielectric/dielectric.

One advantage of the self-healing capability in devices according to example embodiments is that it enables rapid reconfigurability: separate halves of the blue-(phosphor powder ZnS:Cu) and orange-light (phosphor powder ZnS: Cu,Mn) devices can be conveniently merged into one device (compare FIG. 12). Interestingly, the dielectric according to example embodiments is highly surface compatible with the electrodes, and the high-κ dielectric-EL composite materials adhered to each other without utilizing any adhesives or surface treatment. Therefore, device fabrication is facile and does not require significant interfacial engineering. FIG. 14a shows a graph illustrating peel test results for dielectric/ conductor and dielectric/dielectric. The ultimate peel strength of the dielectric/conductor arises from the adherence of the two layers. The weaker conductor was deformed during the test until rupture, but the interface of the two-layered dielectric/conductor remained intact. It was found that dielectric/dielectric has much weaker interfacial strength as they do not stick to each other. The two layers of dielectric detached completely from each other after the peel test.

Furthermore, devices according to example embodiments can be 3D printed, enabling the patterning of different display designs.

The soft nature of the electrodes and high-κ dielectric-EL also allows devices according to example embodiments to be readily configured by mechanical die punching or cutting into desirable shapes. The high transparency of the dielectric and electrode materials not only enables all-angle illumination, but also allow for lower operating electric field, E, AC voltage. $V_{ac}$, and frequency, $f_{ac}$. It was shows that a device according to an example embodiment can illuminate even when flexed to a 0.5 mm radius of curvature at the edge of a glass slide.

Figure 15B:
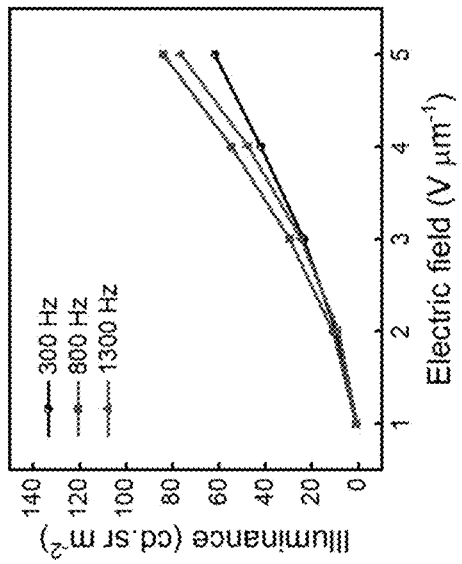
FIG. 15b shows a graph illustrating illuminance with increasing fields of a device according to an example embodiment with a dielectric-EL layer thickness of ~65 μm operated under $f_{ac}$ of 300 Hz, 800 Hz, and 1300 Hz.
Figure 15A:
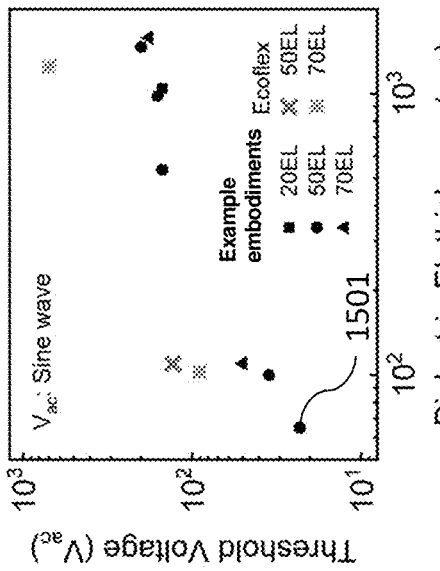
FIG. 15a shows threshold voltage, $V_{ac}$, of device according to example embodiments as a function of the dielectric-EL thickness.
Figure 15C:
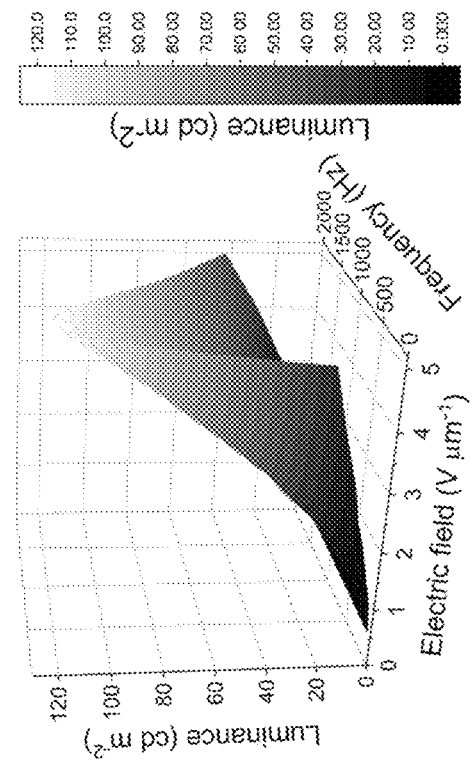
FIG. 15c shows a graph illustrating the luminance of a according to an example embodiment (dielectric-EL layer thickness of 65 μm; 50 EL) operating under various fields and frequencies. The device can be operated at very low fields and frequencies. The luminance increases with the voltage and frequency but saturates at a certain frequency for an applied alternating voltage.

At a dielectric-EL thickness of ~65 μm, the high-κ dielectric allows the devices according to example embodiments to activate at low $V_{ac}$ of 23 V (E=0.4 V μm$^{-1}$) and achieves high luminance at $V_{ac}$ of 40-100 V. Here, the turn-on threshold luminance is defined as 0.1 cd m$^{-2}$, because values under this luminance value will be perceived as black by human eyes[23]. An electroluminescent brightness of 5 cd m$^{-2}$ at $V_{ac}$ of 100 V (E=1.6 V μm$^{-1}$) using $f_{ac}$ of 50 Hz. This brightness value falls within the low brightness range of a typical smartphone display luminance (2-10 cd m$^{-2}$). FIG. 15a shows threshold voltage, $V_{ac}$, of device according to example embodiments as a function of the dielectric-EL thickness. With a dielectric-EL thickness of 65 μm a threshold $V_{ac}$ of 23 V with a threshold $f_{ac}$ of 50 Hz was measured (point 1501). Silicone-EL show much higher threshold voltage, and the threshold $f_{ac}$ were more than 1000 Hz. Generally, threshold voltages of the devices increase with the increase in dielectric-EL thickness. FIG. 15b shows a graph illustrating illuminance with increasing fields of a device according to an example embodiment with a dielectric-EL layer thickness of ~65 μm operated under $f_{ac}$ of 300 Hz, 800 Hz, and 1300 Hz. FIG. 15c shows a graph illustrating the luminance of a according to an example embodiment (dielectric-EL layer thickness of 65 μm; 50 EL) operating under various fields and frequencies. The device can be operated at very low fields and frequencies. The luminance increases with the voltage and frequency but saturates at a certain frequency for an applied alternating voltage.

Figure 16:
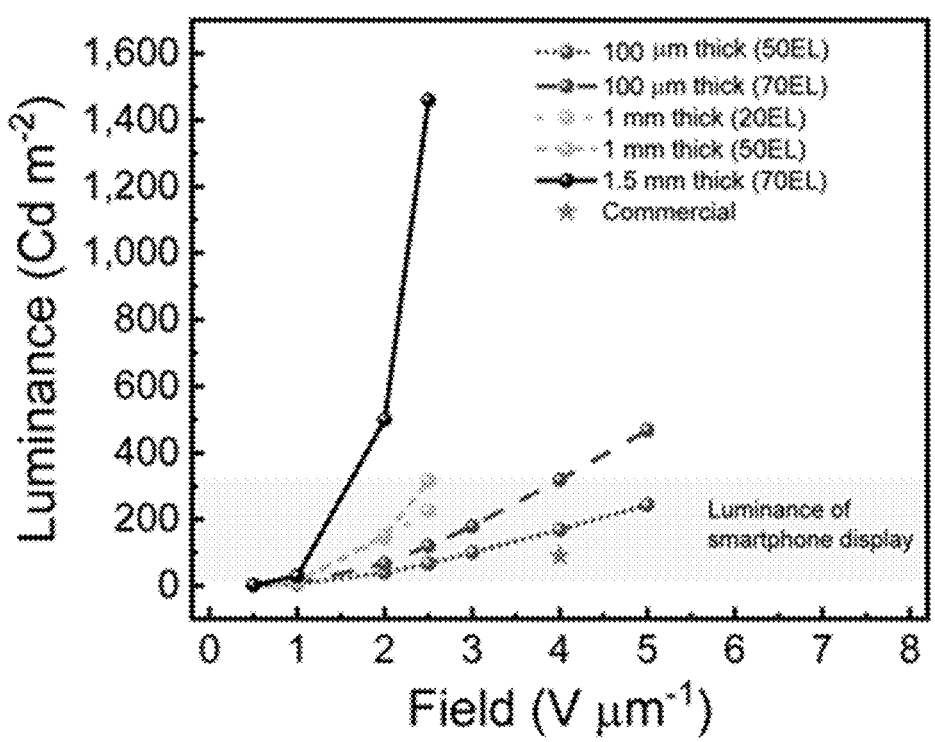
FIG. 16 shows a graph illustrating the luminance of a devices according to an example embodiments at different thicknesses and electro-luminance particle concentrations.

The luminance values at different electric fields were compared for devices according to example embodiments and the state-of-the-art intrinsically stretchable LECs that use dielectric materials from silicones, e.g. polydimethylsiloxane (PDMS)[11] and Ecoflex[6,17], VHB[24], or PVDF-based elastomer[25] as the dielectric layer. As shown in FIG. 16, at a dielectric-EL thickness of 100 μm and 70 wt % phosphor (70 EL), the luminance of a device according to an example embodiment is the highest among the LECs across a wide range of E, with a 3.1 times higher brightness than that of the best reported[24] at 1 V μm$^{-1}$, and is 2.5 times brighter than the previously brightest[25] described at 5 V μm$^{-1}$. Table S1 shows a comparison of devices according to some example embodiments to reported stretchable LEC devices in terms of applied electric fields and their corresponding luminance.

TABLE S1

| Field (V μm$^{-1}$) | 1 | 2 | 2.5 | 3 | 4 | 5 | EL phosphor (wt %) | Dielectric-EL thickness (μm) | $f_{ac}$ (HZ) |
|---|---|---|---|---|---|---|---|---|---|
| HELIOS | 6.2 | 66.6 | 119.5 | 178.1 | 320.2 | 468.4 | 70% | ~100 | <1 kHz |
| HELIOS | 10.0 | 121.8 | 221 | 369.4 | 779.3 | 823.7 | 50% | ~500 | <1 kHz |
| HELIOS | 29.0 | 500.4 | 1459.7 | NA | NA | NA | 70% | ~1500 | <1 kHz |
| Ref. 8 | 1.3 | 14.5 | 24.9 | 39.5 | 74.7 | NA | 50% | 200.0 | 2 kHz |
| Ref. 9 | 0.5 | 2.5 | 76.5 | 15 | 34.2 | 76.5 | 66.67% | 41.0 | 50 kHz |
| Ref. 10 | 2.0 | 4.7 | 5.7 | 6.6 | 8.3 | 9.7 | NA | >2000 | 1 kHz |
| Ref. 11 | NA | 16.7 | 21.6 | 25.8 | 41.0 | 56.8 | 50% | 45.0 | 500 Hz |
| Ref. 12 | 0.05 | 0.22 | 0.63 | 1.56 | 2.90 | 6.9 | 30% | 160~200 | 2 kHz |
| Ref. 13 | 0.5 | 5.7 | 13.8 | 27.1 | 49.3 | 71.5 | 50% | NA | 2 kHz |
| Ref. 14 | NA | 0.4 | NA | 2.3 | 11.5 | 21 | 37.00% | 30~35 | 400 Hz |
| Ref. 15 | 0.4 | 0.7 | NA | 3.6 | 8.2 | 14.2 | 33.33% | ~100 | ~2 kHz |
| Ref. 16 | NA | NA | 18.0 | 32.5 | 88.5 | 196.0 | 66.67% | ~25 | 10 kHz |

Notably, it was shown that the brightness of the device according to an example embodiment is comparable to the maximum brightness setting of a smartphone display (270 cd m$^{-2}$) under daylight environment at $V_{ac}$ of 200 V ($f_{ac}$=50 Hz, E=3 V μm$^{-1}$). This voltage is readily achievable using current microelectronic circuits. In contrast, conventional silicone based stretchable LECs had luminance that is imperceptible to human eyes at the same E and $f_{ac}$.

Figure 17A:
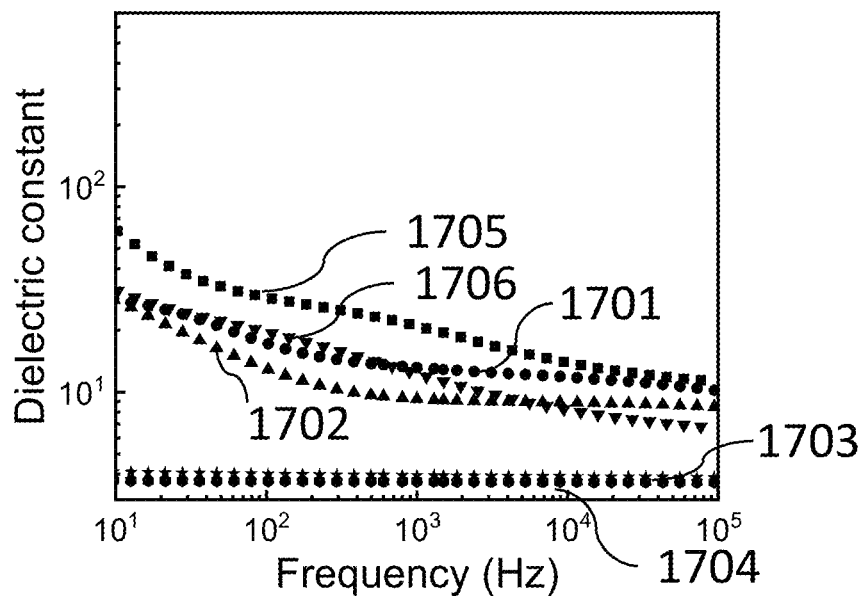
FIG. 17a shows a graph illustrating that the dielectric material according to example embodiments has a high dielectric permittivity compared to silicones across the same frequency range.

Electrical Properties and Performance of Dielectric, Dielectric-EL and Device According to Example Embodiments As shown in FIG. 17a, the dielectric constant of a dielectric material comprising P(VDF-HFP) elastomer with fluorosurfactant according to an example embodiment (curve 1701) has a high dielectric permittivity between about 10 to 27, which is increased compared to the P(VDF-HFP) elastomer control (curve 1702) across the same frequency range, and 2.5 to 6.8-fold higher than silicones (Ecoflex, curve 1703, PDMS, curve 1704) across the same frequency range. As also shown in FIG. 17a, the dielectric constant of a dielectric material comprising P(VDF-HFP) non-elastomer with fluorosurfactant according to an example embodiment (curve 1705) has a high dielectric permittivity between about 10 to 61, which is increased compared to the P(VDF-HFP) non-elastomer control (curve 1706) across the same frequency range.

The calculated dipole moments of the fluoroelastomer and the fluorosurfactant (FS300) using density functional theory (DFT) was found to be 3.22 and 2.83 Debye, respectively. Within the fluoroelastomer matrix, FS300 molecules could trigger the charge screening through realignment of these dipole centers upon exposure to an electric field, which improves the permittivity in the dielectric material according to example embodiments. The dielectric permittivity decreases with increasing frequency, which can be expected from frequency-dependent interfacial polarization effects[26]. The high-κ effectively raises the E across the EL particles, which obviates the need for high applied voltages. Thus, one can significantly lower the threshold $V_{ac}$ and $f_{ac}$ of devices according to example embodiments.

Figure 18A:
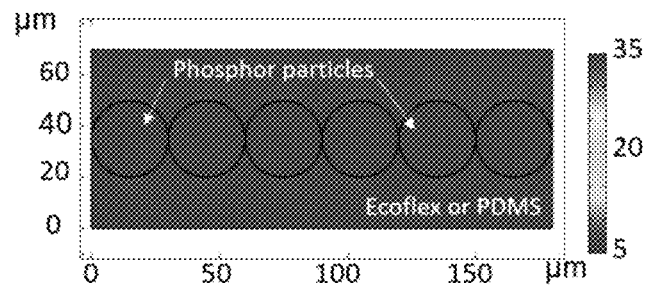
FIG. 18a shows COMSOL simulation results illustrating that the higher the permittivity of the embedding dielectric, the more electric field will be focused onto the phosphor particles, which results in a brighter illuminance in devices according to example embodiments.
Figure 18A:
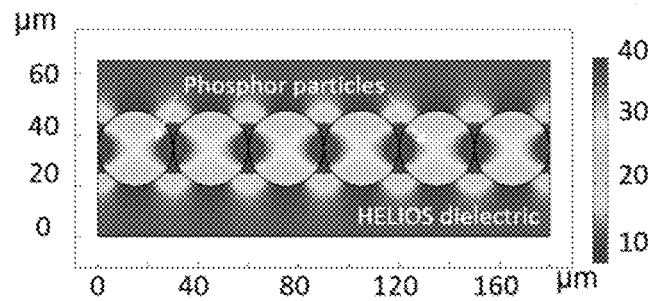
Figure 18B:
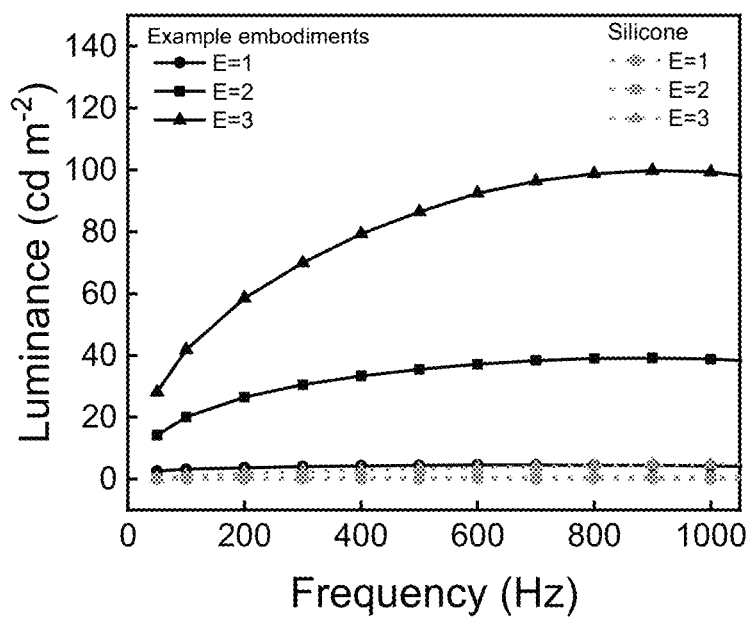
FIG. 18b shows a graph illustrating that the devices according to example embodiments have much higher luminance when compared to the controls.

The calculated dipole moments of the fluoroelastomer and FS300 are 3.22 and 2.83 Debye. FIG. 18a shows COMSOL simulation results for surface electric energy density (J/m³) illustrating that the higher the permittivity of the embedding dielectric, the more electric field will be focused onto the phosphor particles, which results in a brighter illuminance in devices according to example embodiments. FIG. 18b shows a graph illustrating the luminance of devices according to example embodiments and silicone-EL devices, with dielectric-EL of 100 μm thick). As can be seen from FIG. 18b, the devices according to example embodiments have much higher luminance when compared to the controls.

Figure 17B:
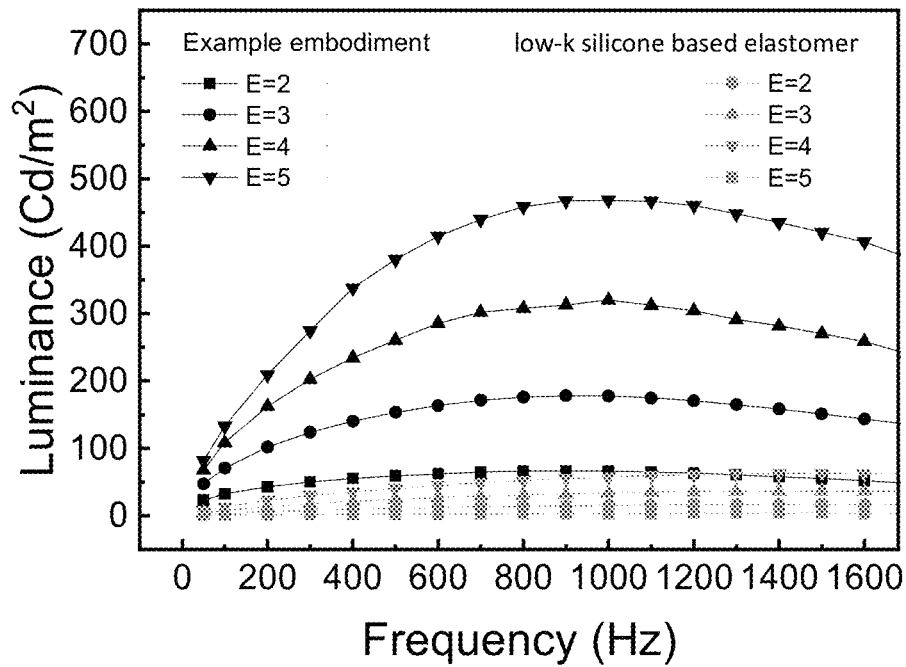
FIG. 17b shows a graph illustrating that using silicone-based devices as controls, it was demonstrated that devices according to example embodiments are significantly brighter under the same operating conditions.

With reference to FIG. 17b, using silicone-based devices as controls, it was demonstrated that devices according to example embodiments are significantly brighter under the same operating conditions. Moreover, a device according to an example embodiment has the highest luminous efficacy of 380 milli-lumen per watt (mlm W⁻¹) (lowest power consumption of ~10.6 milliwatt) when comparing to other stretchable LEC devices[6, 25].

Figures 19A, 19B:
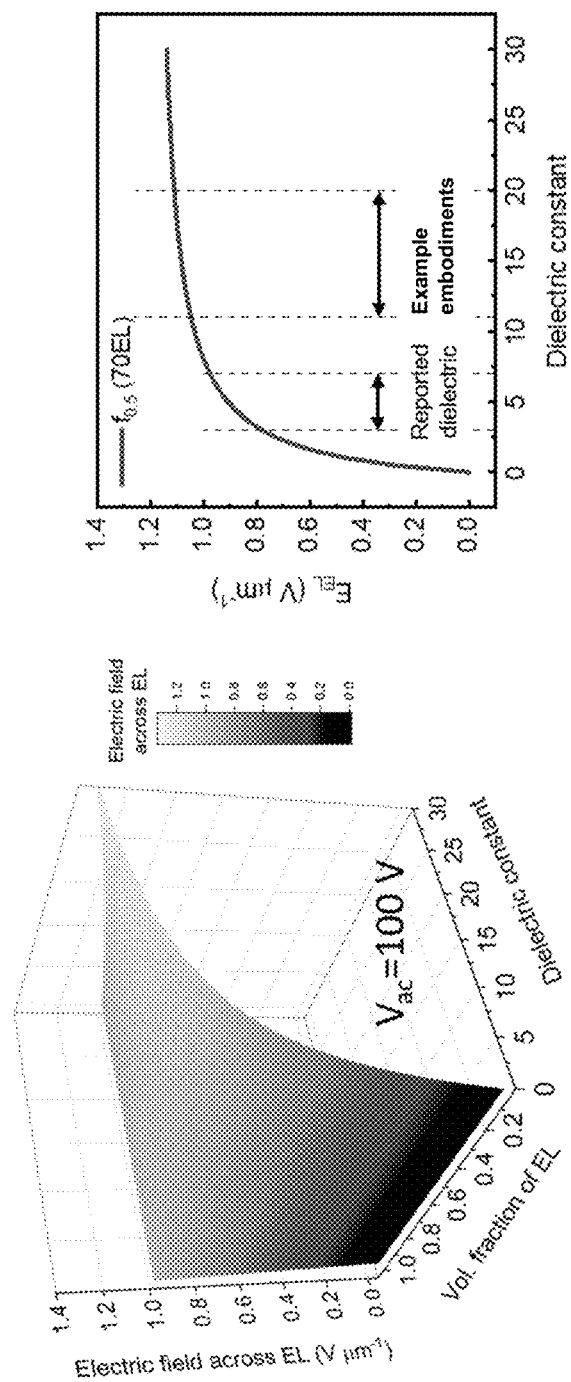
FIG. 19a shows a graph illustrating the electric field across EL particles ($E_{EL}$) change with varying dielectric constant of embedding dielectric materials and volume fraction of EL in embedding dielectric materials when a voltage of 100 V is applied across the EL-dielectric of 100 μm-thick.
FIG. 19b shows a graph illustrating the $E_{EL}$-dielectric constant characteristics of reported LEC devices when 100 V of potential is applied across the EL-dielectric with 0.5 volume fraction of EL and of equivalent 70 EL devices according to example embodiments.

FIG. 19a shows a graph illustrating the electric field across EL particles ($E_{EL}$) change with varying dielectric constant of embedding dielectric materials and volume fraction of EL in embedding dielectric materials when a voltage of 100 V is applied across the EL-dielectric of 100 μm-thick. The data 1900 is plotted using the relation of $$E_{EL} = E_m \left[ \frac{3\varepsilon_{r2}}{2\varepsilon_{r2} + \varepsilon_{r1} - f(\varepsilon_{r1} - \varepsilon_{r2})} \right],$$

where $E_m$=voltage applied/thickness of EL-dielectric, $\varepsilon_{r1}$ is the dielectric constant of ZnS:Cu (here approximated to be 8.3 {2}), and $\varepsilon_{r2}$ is the dielectric constant of embedding dielectric materials {3}. FIG. 19b shows a graph illustrating the $E_{EL}$-dielectric constant characteristics of reported LEC devices when 100 V of potential is applied across the EL-dielectric with 0.5 volume fraction of EL and equivalent 70 EL devices according to example embodiments). When the dielectric constant of the dielectric material is high, the $E_{EL}$ is high which then reduces the threshold (and activating) voltage of the device. With high permittivity, the efficiency of the device can be improved.

Lowered Operation Voltage and Excitation Frequency of Devices According to Example Embodiments An approach to reduce the peak value of the voltage at which the EL devices turn on visibly, i.e. activation voltage, is to use thinner dielectric-EL layers to increase the E applied. In fact, most of the existing LECs use a thin dielectric-EL layer (t=10 to 100 μm). Despite this, such existing LEC devices using low dielectric permittivity materials still required a high turn-on $V_{ac}$ (>100 V)[11, 17]. Instead, it was shown that a device according to example embodiment has the lowest turn-on $V_{ac}$ of 23 V among the existing LECs at t=65 μm[11, 17].

Figure 17C:
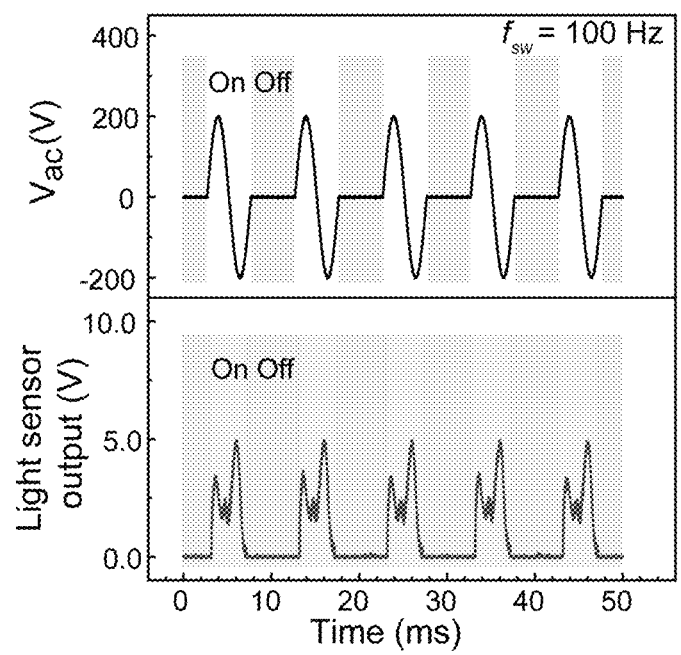
FIG. 17c shows a graph illustrating that the device according to an example embodiment can switch on and off at the same $f_{sw}$, regardless of the $f_{ac}$ provided to the device.

In addition, devices according to example embodiments required much lower $f_{ac}$ amongst the reported stretchable LECs. At a turn-on $V_{ac}$ of 23 V, a device according to an example embodiment flickered at $f_{ac}$ lower than 50 Hz, and remained steadily illuminated beyond 50 Hz. Above the $f_{ac}$ of 50 Hz, the light is emitted at a rate beyond the flicker fusion rate of human[27]. The low $f_{ac}$ does not imply a slow switching frequency ($f_{sw}$) or a turn-on delay. The $f_{sw}$ and turn-on delay of a device, according to an example embodiment was characterised and it was found that the device according to an example embodiment can switch on and off at the same $f_{sw}$, regardless of the fa, provided to the device, as shown in FIG. 17c.

Figure 20A:
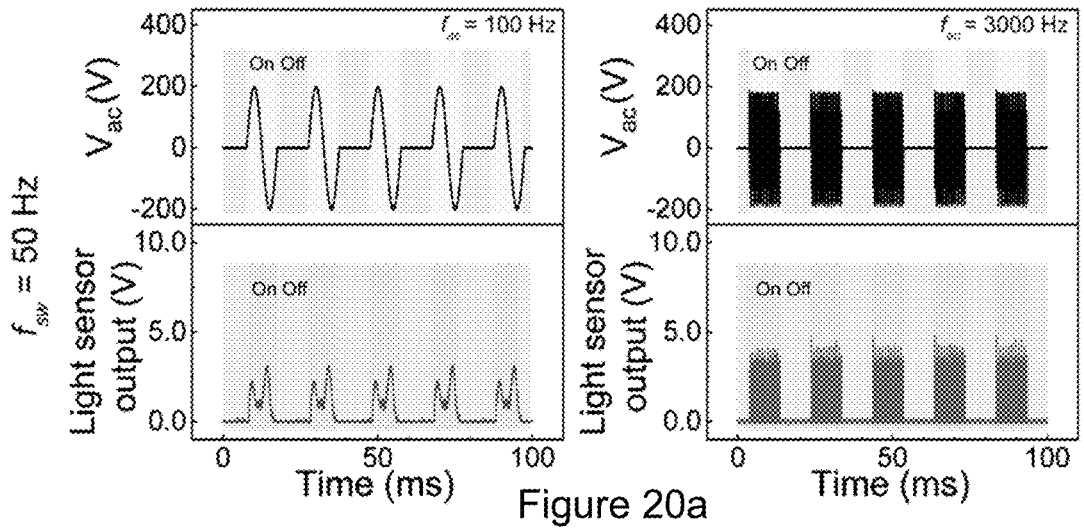
FIG. 20a shows graphs illustrating the light signals following the turn-on and turn-off frequencies where the $f_{sw}$=50 Hz, when the $f_{ac}$ of the device was set at 100 Hz or 3 kHz, respectively.
Figure 20B:
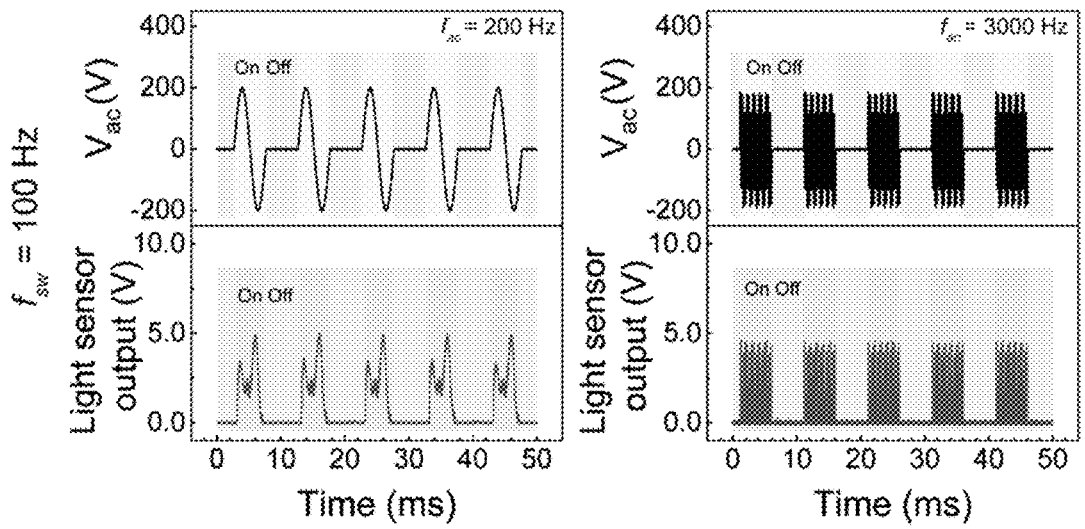
FIG. 20b shows graphs illustrating the light signals (curves 2004, 2005) following the turn-on and turn-off frequencies (curves 2006, 2007) where the $f_{sw}$=100 Hz, whether at $f_{ac}$=200 Hz or 3 kHz, respectively.

FIG. 20a shows graphs illustrating the light signals (light sensor output) following the turn-on and turn-off frequencies ($V_{ac}$) where the $f_{sw}$=50 Hz, when the $f_{ac}$ of the device was set at 100 Hz or 3 kHz, respectively. FIG. 20b shows graphs illustrating the light signals (light sensor output) following the turn-on and turn-off frequencies ($V_{ac}$) where the f=100 Hz, whether at $f_{ac}$=200 Hz or 3 kHz, respectively.

As shown in table S2, the turn-on delay for a device according to an example embodiment is in the range of hundreds of ns. When measuring the turn-on delay of a commercial LED, a delay of 0.03 ms was obtained, for comparison. For sine-wave operated devices according to example embodiment, the turn-on delays are slightly higher when $f_{ac}$ is lower. This can be improved by using other waveforms such as square wave, where the turn-on delay falls consistently in the 0.2 ms range. Nevertheless, the waveforms with a sharper rise and fall will cause shorter lifetime of the device[4], Similarly, high $f_{ac}$ will also lead to faster degradation of the LEC device.

TABLE S2

| $f_{sw}$ (Hz) | Sine $f_{ac}$ ($V_{ac}$ = 100 V; $V_{rms}$ = 70.7 V) (Hz) | Turn-on delay (ms) | Square $f_{ac}$ ($V_{ac}$ = 70.7 V; $V_{rms}$ = 70.7 V) (Hz) | Turn-on delay (ms) |
|---|---|---|---|---|
| 50 | 100 | 0.73 | 100 | 0.19 |
|  | 3000 | 0.12 | 3000 | 0.23 |
| 60 | 120 | 0.75 | 120 | 0.20 |
|  | 3000 | 0.13 | 3000 | 0.20 |
| 100 | 200 | 0.50 | 200 | 0.21 |
|  | 3000 | 0.13 | 3000 | 0.23 |

A low excitation frequency $f_{ac}$ enables convenient operation of devices according to example embodiments as the frequency of most domestic power supplies is either 50 or 60 Hz (and at 110 or 220 V). For most of the commercially available LEC devices, the $f_{ac}$ required are in the range of kHz. Thus, they cannot be illuminated at 50 or 60 Hz unless a high $V_{ac}$ is also applied. Transformers and inverters that produce voltages with $f_{ac}$ in the kHz range causes an audible whining noise. As devices according to example embodiments do not require kHz excitation frequency for illumination, the circuit is simpler and quieter. Moreover, operation at high $f_{ac}$ decreases the devices' lifetime[28].

The Luminance of Devices According to Example Embodiments

Figure 21B:
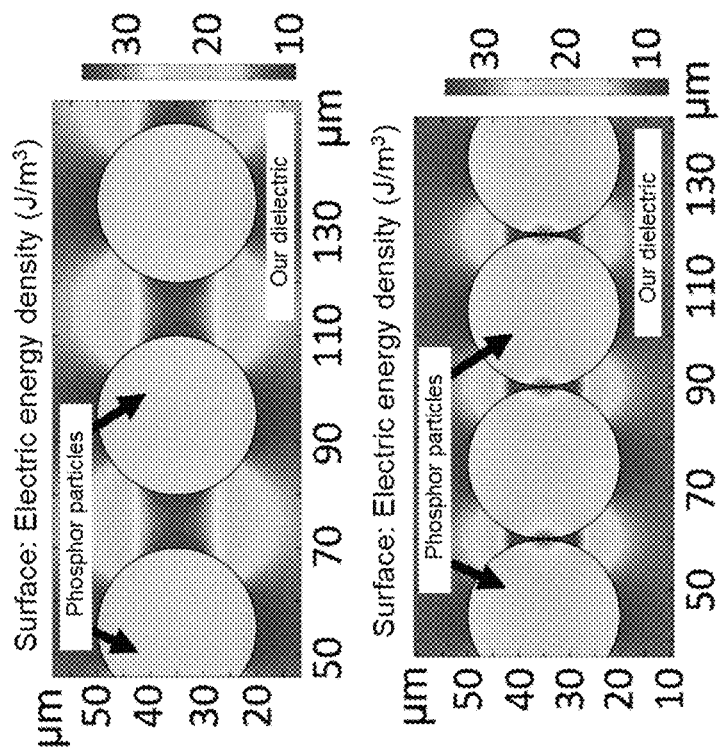
FIG. 21b shows COMSOL simulation results illustrating that the higher the density of EL phosphor particles results in a higher concentration of the electric field energy focused on the phosphor particle.
Figure 21A:
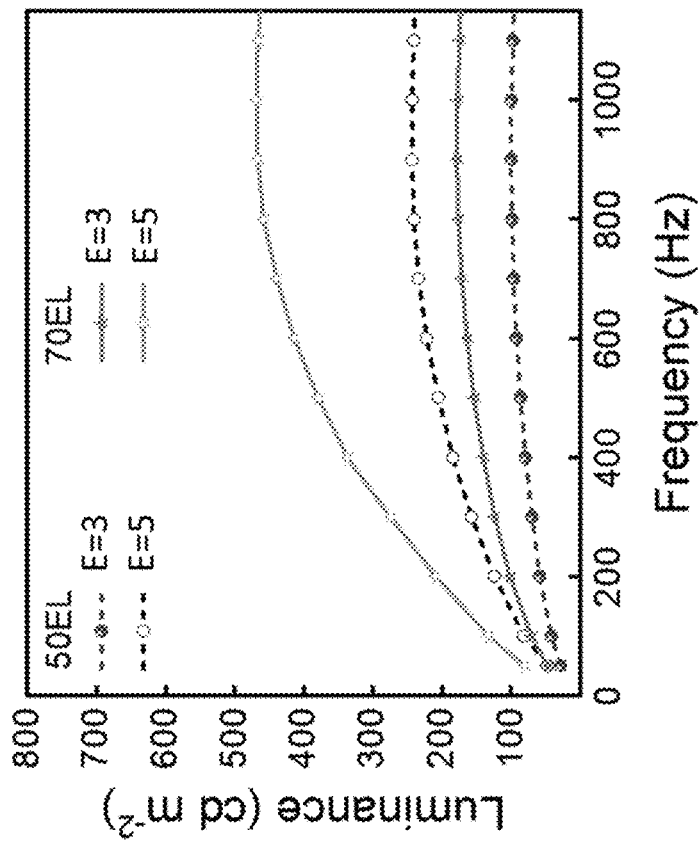
FIG. 21a shows a graph illustrating the brightness of devices according to example embodiments increases with the increase in EL phosphor particles in the dielectric matrix (100 μm-thick).

In general, the brightness of HELIOS devices according to example embodiments increases with a higher applied E and $f_{ac}$, but peaks at a certain frequency for a constant $V_{ac}$ (compare FIG. 15c). The brightness of devices according to example embodiments can be enhanced by using a higher concentration of phosphor particles in the dielectric layer. For example, the luminance of 70 EL (70 wt % or equivalent to 48.4 v/v % of phosphor particles in dielectric) is almost double the luminance of 50 EL (50 wt % or equivalent to 28.7 v/v % of phosphor particles in dielectric) at various operating conditions. The luminance of 70 EL devices according to example embodiments increased because of a dual effect of more phosphor particles emitting light per unit area, and a significant concentration of E energy on each particle. Specifically, FIG. 21a shows a graph illustrating the brightness of devices according to example embodiments increases with the increase in EL phosphor particles in the dielectric matrix (100 μm-thick) at E=3 V/μm and E=5 V/μm. FIG. 21b shows COMSOL simulation results illustrating that the higher the density of EL phosphor particles results in a higher concentration of the electric field energy focused on the phosphor particle.

Figure 22:
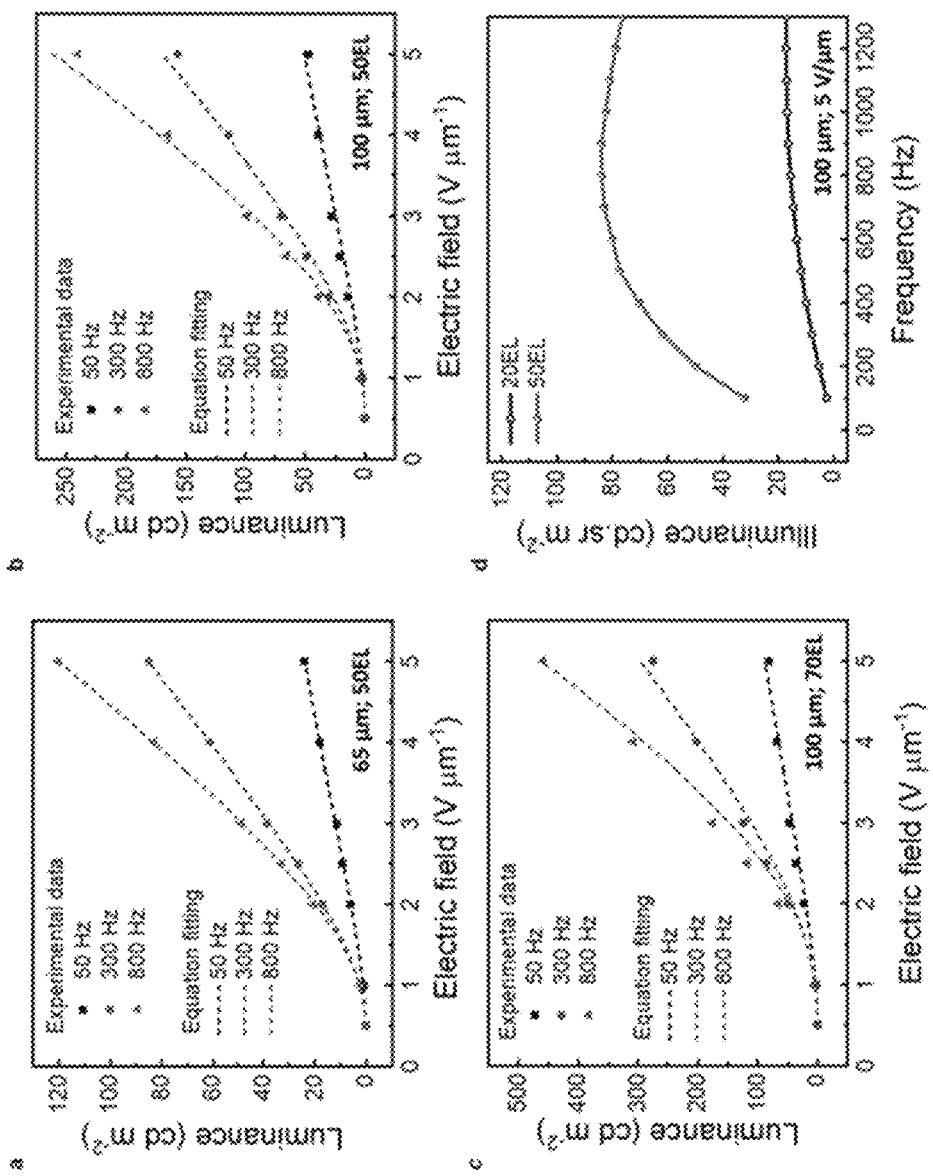
FIG. 22a shows a graph illustrating luminance with increasing fields of devices according to example embodiments for dielectric-EL layer thickness of 65 µm and different frequencies (50 Hz, 300 Hz, and 800 Hz), with 50 EL.
FIG. 22b shows a graph illustrating luminance with increasing fields of devices according to example embodiments for dielectric-EL layer thickness of 100 µm and different frequencies (50 Hz, 300 Hz, and 800 Hz), with 50 EL.
FIG. 22c shows a graph illustrating luminance with increasing fields of devices according to example embodiments for dielectric-EL layer thickness of 100 µm and different frequencies (50 Hz, 300 Hz, and 800 Hz), with 70 EL.
FIG. 22d shows a graph illustrating the illuminance of the devices according to example embodiments increases with the increase in the concentration of EL particles in the dielectric matrix (100 µm-thick)—20 EL is especially dim compared to e.g. 50 EL when the dielectric-EL is ≤100 µm due to the sparse distribution of EL phosphor particles per unit area.

To further increase the brightness of devices according to example embodiments, one can use a thicker dielectric-EL layer to achieve a higher phosphor concentration per unit area. Specifically, FIG. 22a shows a graph illustrating luminance with increasing fields of devices according to example embodiments for dielectric-EL layer thickness of 65 μm and different frequencies (50 Hz, 300 Hz, and 800 Hz), with 50 EL. FIG. 22b shows a graph illustrating luminance with increasing fields of devices according to example embodiments for dielectric-EL layer thickness of 100 μm and different frequencies (50 Hz, 300 Hz, and 800 Hz), with 50 EL. FIG. 22c shows a graph illustrating luminance with increasing fields of devices according to example embodiments for dielectric-EL layer thickness of 100 μm and different frequencies (50 Hz, 300 Hz, and 800 Hz), with 70 EL. The luminance and the operated fields on the devices according to example embodiments are expressed using the equation of $L_v=L_{v,0} \exp(-b/E^{0,5})$, where $L_v$ is the luminance, E is the applied field, and $L_{v,0}$ and b are the constants depending on the EL phosphor particle size, the concentration of the phosphor particles in the dielectric, the dielectric constant of the embedding medium and the device thickness. The empirical luminance data points fit well with the exponential relationship expressed in the curves. FIG. 22d shows a graph illustrating the illuminance of the devices according to example embodiments increases with the increase in the concentration of EL particles in the dielectric matrix (100 μm-thick)—20 EL is especially dim compared to e.g. 50 EL when the dielectric-EL is ≤100 μm due to the sparse distribution of EL phosphor particles per unit area.

Figure 23:
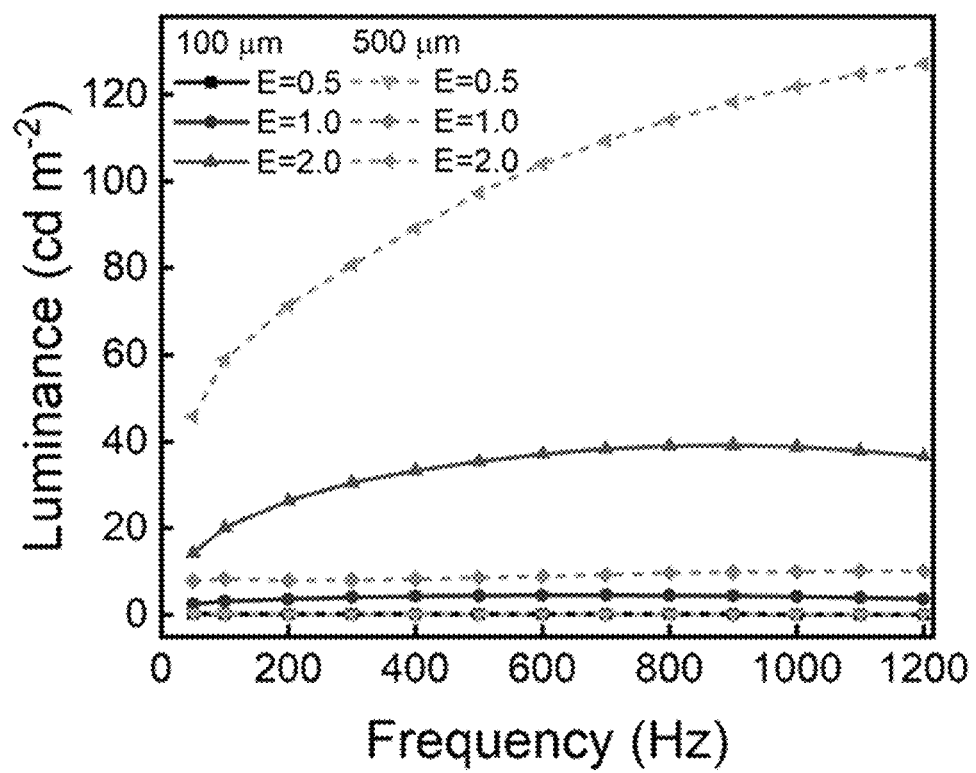
FIG. 23 shows a graph illustrating that at low E=0.5, the brightness of the thick (500 µm, curve 2301) and thin (100 µm, curve 2302) devices according to example embodiments is similar. At high E=2.0, the brightness of the thick devices is significantly higher than the thin devices.

FIG. 23 shows a graph illustrating that at low E=0.5 V/μm, the brightness of the thick (500 μm) and thin (100 μm) devices according to example embodiments is similar. However, at higher E=1.0, 2.0 V/μm, the brightness of the thick samples (thickness of 500 μm) are significantly brighter than the thin samples (thickness of 100 μm).

At the same applied E and frequency, the luminance of the device according to an example embodiment (50 EL) improved by 3.5 times as the thickness increased from 100 μm to 500 μm. Combining the effects of the high concentration of phosphor particles (70 EL), and the greater volume of the dielectric layer (1.5 mm), an unprecedented electroluminescent brightness of 1460 cd m$^{-2}$ (E=2.5 V μm$^{-1}$; $f_{ac}$=800 Hz) was for a device according to an example embodiment. This is 12.4 times the brightness of the 70 EL device according to an example embodiment with a lower thickness of 100 μm; and 22 times the brightness of the 50 EL device according to an example embodiment with a thickness of 100 μm at the same operating E, $V_{ac}$ and $f_{ac}$.

Specifically, FIGS. 24a and b show graphs illustrating that the brightness of devices according to example embodiments increases with the increase in thickness in the dielectric matrix (70 EL; 100 μm (FIG. 24a) vs 1500 μm (FIG. 24b)) when comparing with same E and frequencies applied. The luminance and the operated fields on the devices according to example embodiments are expressed using the equation of $L=L_o \exp(-b/E^{0,5})$. FIGS. 24c and d show COMSOL simulation results comparing the single and multi-layer(s) of phosphor particles, respectively. More phosphor particles per unit surface area will lead to more light emission per unit surface area.

Comparing a ~1.5 mm thick device according to example embodiments and a control sample of silicone (ecoflex) clearly showed that the device according to an example embodiment was much brighter than the control.

Figure 17D:
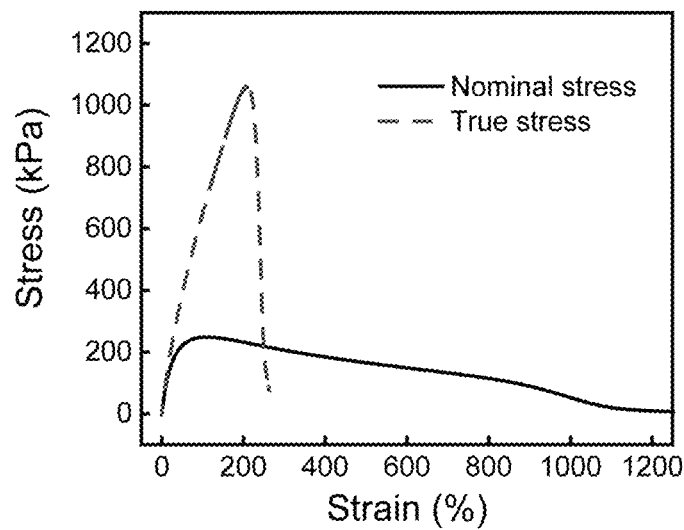
FIG. 17d shows a graph illustrating that the dielectric according to an example embodiment can be stretched elastically up to 20% with Young's modulus of 1.06±0.08 MPa, and deforms plastically to 906±58%.

Mechanical Performance of Dielectric, Dielectric-EL and Devices According to Example Embodiments The dielectric according to example embodiments was characterized using the American Society for Testing and Materials (ASTM) standard D638 for mechanical properties. The dielectric according to an example embodiment can be described as a supramolecular polymer[30,31] that can be stretched elastically up to 20% with Young's modulus of 1.06±0.08 MPa, and deforms plastically to 906±58%, as shown in FIG. 17d. Its ultimate tensile strength is 0.21±0.10 MPa (computed true strength: 1.03±0.02 MPa). Both the dielectric-EL composite according to an example embodiment and the three-layered device according to an example embodiment (electrode/dielectric-EL/electrode) recovered to their original lengths even after multiple cycles of stretching to 50% strain.

Figure 25A:
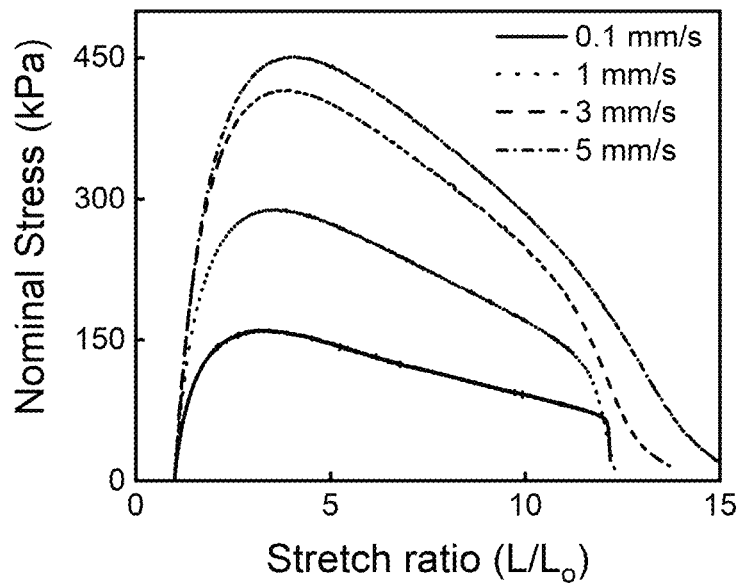
FIG. 25a shows a graph illustrating the stress—strain curves of a dielectric according to an example embodiment stretched at different speeds of 0.1, 1, 3, and 5 mm/s, respectively.
Figure 25B:
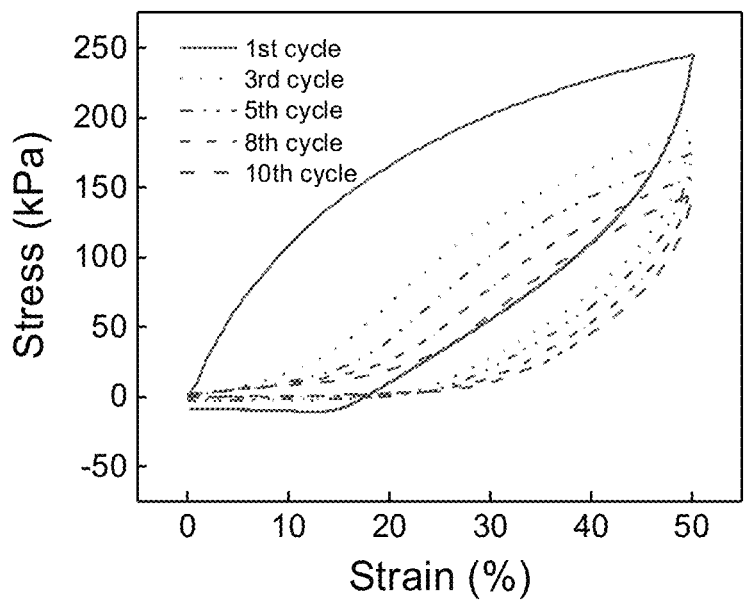
FIG. 25b shows a graph illustrating the strain in the dielectric-EL according to an example embodiment subjected to ten loading-unloading cycles (loading at 1 mm s$^{-1}$ and unloading at 1 mm min$^{-1}$, for $1^{st}$, $3^{rd}$, $5^{th}$, $8^{th}$ and $10^{th}$ and cycle, respectively).
Figure 25C:
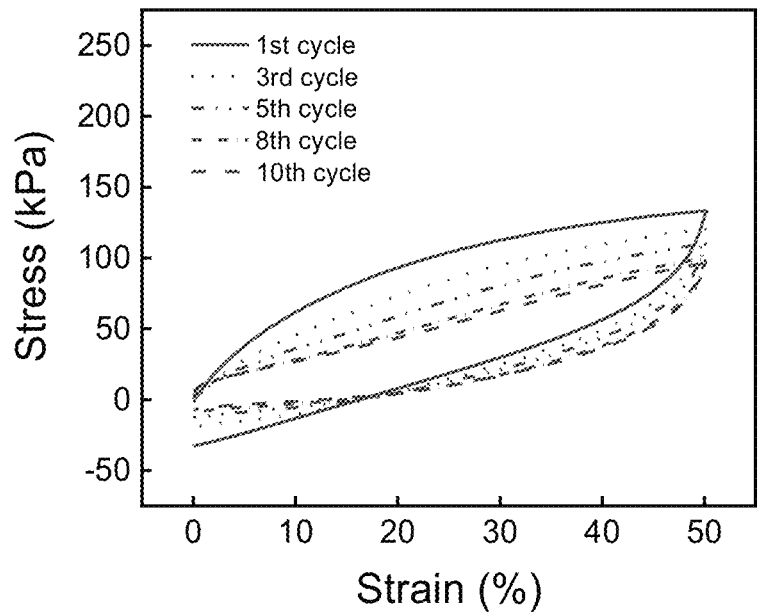
FIG. 25c shows a graph illustrating the strain in a three-layered device according to an example embodiment subjected to ten loading-unloading cycles (loading at 1 mm s$^{-1}$ and unloading at 1 mm min$^{-1}$, curves 2521-2525 for $1^{st}$, $3^{rd}$, $5^{th}$, $8^{th}$ and $10^{th}$ cycle, respectively).

Specifically, FIG. 25a shows a graph illustrating the stress—strain curves of a dielectric according to an example embodiment stretched at different speeds of 0.1, 1, 3, and 5 mm/s, respectively. The modulus increases when stretching at higher speed, which is typical behavior of supramolecular polymer {5-7}. FIG. 25b shows a graph illustrating the strain in the Dielectric-EL according to an example embodiment subjected to ten loading-unloading cycles (loading at 1 mm s$^{-1}$ and unloading at 1 mm min$^{-1}$, for $1^{st}$, $3^{rd}$, $5^{th}$, $8^{th}$ and $10^{th}$ cycle, respectively). FIG. 25c shows a graph illustrating the strain in a three-layered device according to an example embodiment subjected to ten loading-unloading cycles (loading at 1 mm s$^{-1}$ and unloading at 1 mm min$^{-1}$, for $1^{st}$, $3^{rd}$, $5^{th}$, $8^{th}$ and $10^{th}$ cycle, respectively). It was found that the dielectric-EL according to an example embodiment and the three-layered device according to an example embodiment slowly recover to its original length when subjected to a strain of 50%.

Compatible mechanical properties help to minimize interfacial discontinuities and eliminate slipping or delamination in multi-layered devices such as the devices according to example embodiments. The electrodes and dielectric-EL composite according to an example embodiment have highly compatible interfaces and mechanical properties. The peel tests showed that the interfacial bonding between electrode/

HELIOS dielectric-EL according to an example embodiment was significantly stronger than compared to controls of electrode according to an example embodiment/silicone dielectric and indium tin oxide/polyethylene terephthalate (ITO/PET) electrode/HELIOS dielectric-EL according to an example embodiment.

While a low activation voltage can be achieved when using thin dielectric-EL layers, the maximum strain of the device according to example embodiments will be modest because the two electrodes eventually contact each other as the strained dielectric layer becomes too thin. Conversely, a thicker dielectric-EL layer can enable operation at larger mechanical strains, but activation voltage increases. Existing LECs with a thick dielectric-EL layer (~1 mm) are highly stretchable (>480% strain), but they require a significantly higher Vac of 2.5 kV (E=2.5 V μm$^{-1}$, f$_{ac}$=700 Hz) for light emission[6,32].

Instead, using the high-κ dielectric according to example embodiments, devices according to an example embodiment (20 EL) achieved visible emission at V$_{ac}$ of 200 V (E=0.2 V μm$^{-1}$, f$_{ac}$=50 Hz), and an adequate human-perceivable brightness of 3.7 cd m$^{-2}$ at 800 V (E=0.8 V μm$^{-1}$, f$_{ac}$=50 Hz) at a similar thickness of ~1 mm. When operating at 800 V and 50 Hz, the device according to an example embodiment with ~1 mm-thick dielectric-EL can be stretched to ~800% strain with stable light emission. The brightness of the device according to an example embodiment initially increases with strain (up to ~400% strain) due to the increase in the E-field as the dielectric sandwiched between electrodes decreases in thickness under uniaxial tension. However, when stretched beyond 5 times its original length, the formation of conductive paths between the electrodes reduced the effective capacitance[6].

HELIOS with a thin dielectric-EL thickness of ~67 μm can only be safely stretched to ~1.6 times its original length. with a thick dielectric-EL thickness of ~1 mm can be activated at f$_{ac}$ of 200 V and 50 Hz (vaguely visible), and the device is bright when operated at 800 V (and 1000 V) and f$_{ac}$ of 50 Hz when operated under daylight condition. The thick device is very stretchable with an increase in light emission when stretching to 5 times its original length, and subsequently stable illumination up to 9 times its original length.

Self-healing Properties Dielectric, Dielectric-EL and Devices According to Example Embodiments It was observed that when one mechanically pressed the two freshly damaged interfaces of the dielectric-EO material according to example embodiments together, the interfaces merged and self-healed. The self-healing property was suggested in the DSC results, which showed that the amorphous material has an extremely low T$_g$ (−25° C.). Therefore, the polymer chains are fairly mobile at ambient conditions. The self-healing is also likely aided by the reversible intermolecular interactions between the fluorinated surfactants and the dynamic polymer chains.

Figure 26A:
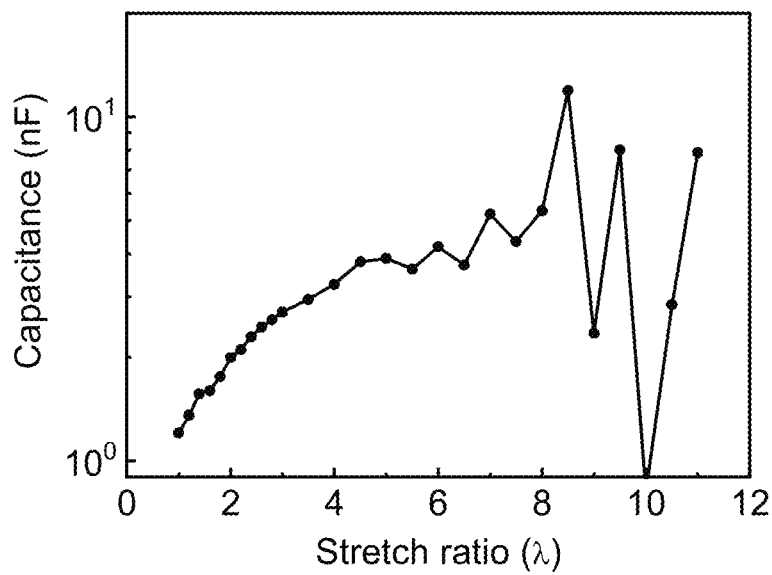
FIG. 26a shows a graph illustrating the capacitance of the device as a function of its stretch showing increasing capacitance with strain.
Figure 26B:
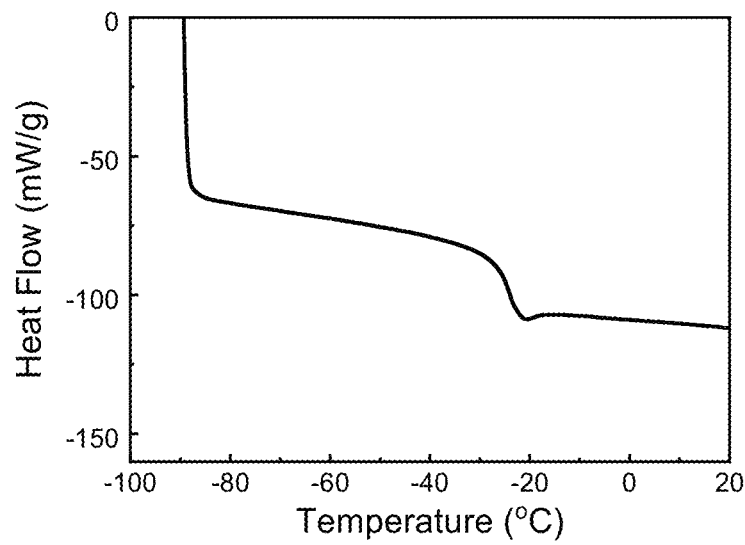
FIG. 26b shows a graph illustrating the glass transition temperatures ($T_g$) of the dielectric obtained from the DSC micrograph.

Specifically, FIG. 26a shows a graph illustrating the capacitance of the device as a function of its stretch showing increasing capacitance with strain, at a frequency of 100 Hz. FIG. 26b shows a graph illustrating the glass transition temperatures (T$_g$) of the dielectric obtained from the DSC micrograph. T$_g$ of the dielectric is −25° C., which is very much lower than the room temperature, depicting that the polymer chains are mobile in the ambient environments. No melting temperature, T$_m$, observed from DSC curves when tested up to the decomposing temperature of the materials.

Figure 26C:
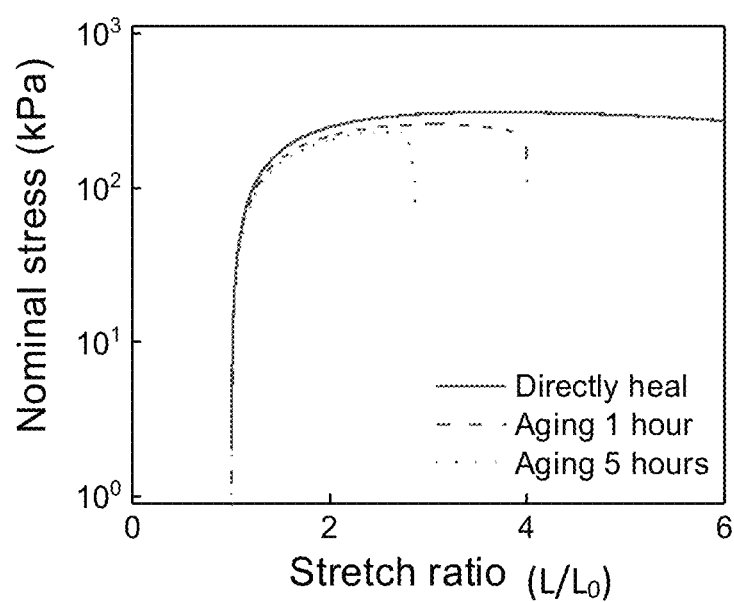
FIG. 26c shows a graph illustrating the stress-strain curves showing the samples healed immediately (for 24 hours at ambient conditions) after cut, and samples healed after aging of the cut surface for 1 hour and 5 hours before healing for 24 hours.

FIG. 26c shows a graph illustrating the stress-strain curves showing the samples healed immediately (for 24 hours at ambient conditions) after cut, and samples healed after aging of the cut surface for 1 hour and 5 hours before healing for 24 hours.

Notably, the self-healing dielectric material is not tacky on its surface (not self-sticking), which is different compared to an autonomous self-healing material that exhibited viscoplastic dough-like behaviour[33,34]. This phenomenon was studied by cutting the material into half and leaving them apart for at the aging time of 1 hour and 5 hours before mechanically contacting the cut interfaces. The longer the aging time, the less efficient the self-healing. This self-healing behaviour was also previously observed in supramolecular polymers, which was presumed to be due to the chain rearrangements at the polymer/air interface and surface tension-related relaxations[35].

Figure 27A:
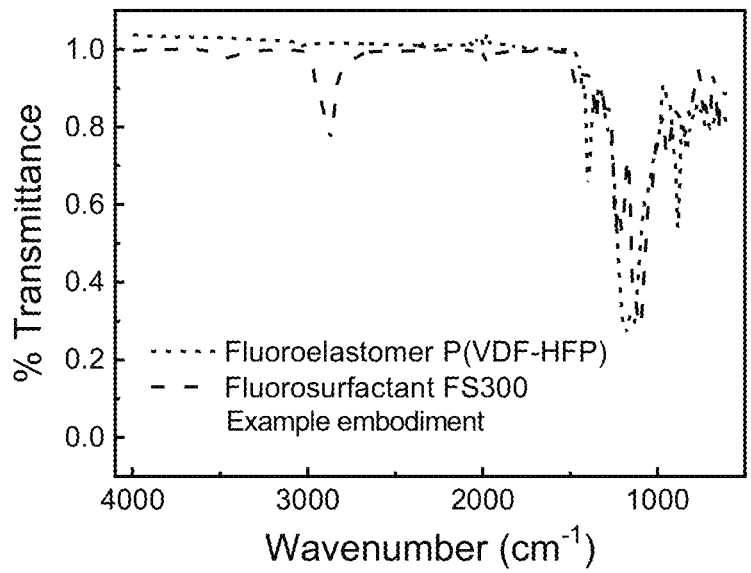
FIG. 27a, upon addition of the fluorosurfactant FS300 to the fluoroelastomer P(VDF-HFP) (poly(vinylidene fluoride-co-hexafluoropropylene)), the presence of a peak 2702 at 1639 cm$^{-1}$ that was previously absent in both the elastomer and the surfactant can be ascribed to the synergistic intermolecular interactions between the polymer chain and the surfactant$^{\mp}$. Peak shift in 2868 cm$^{-1}$ indicating that the $OCH_2$ become less symmetry with the incorporation of fluorosurfactant FS300. Peaks in the range of 1050-1350 cm$^{-1}$ attributed to $CF_2$ and $CF_3$ bonds. Significant peaks shifting with more fluorosurfactant FS300 added.

Self-healing Mechanism Dielectric, Dielectric-EL and Devices According to Example Embodiments The intermolecular interactions between the chemically compatible non-ionic fluorinated surfactants and fluoroelastomer were further assessed using Attenuated Total Reflectance-Fourier Transform Infrared (FTIR-ATR). As shown in the graph in FIG. 27a, upon addition of the fluorosurfactant FS300 to the fluoroelastomer P(VDF-HFP) (poly(vinylidene fluoride-co-hexafluoropropylene)), the presence of a peak 2702 at 1639 cm$^{-1}$ that was previously absent in both the elastomer and the surfactant can be ascribed to the synergistic intermolecular interactions between the polymer chain and the surfactant[36]. A peak 2708 shift at 2768 cm$^{-1}$ indicated that the OCH$_2$ in the surfactant became less symmetric with its higher loading in the polymer. Peaks in the range 2710 of 1050 to 1350 cm$^{-1}$ belong to the CF$_2$ and CF$_3$ bonds in both the components, where peaks are significantly shifted with the incorporation of FS300. Specifically, peaks appeared or shifted after adding in 5% FS300 (HELIOS dielectric), 10% FS300, 20% FS300 and 40% FS300 into fluoroelastomer. Significant peaks shifting with more FS300 added was observed. A peak 2712 of 1396 cm$^{-1}$ was observed, indicating wagging of CH$_2$ in fluoroelastomer. A peak shift of 1396 cm$^{-1}$ indicating a weakened interaction between the H atom and the F atom between the polymer chains was observed with more FS300 added. By adding 5% of the FS300 into fluoroelastomer, the dielectric material was not plasticized as there is no significant peak shift. After adding in more FS300, there is a significant peak shift indicating the host polymer is plasticized.

A higher FS300 content imparted greater mobility to the polymer chains, which facilitated the self-healing, and further enhanced the dielectric permittivity. However, overplasticization using high FS300 concentrations will result in overly mechanically soft material. Therefore, FS300 at a low 5 wt % concentration is used in a currently preferred embodiment to achieve an optimal balance between the self-healing, optical and the mechanical properties of the material. The dynamic mechanical analysis (DMA) results showed that the dielectric materials according to example embodiments have storage moduli above the loss moduli, thus showing that the elastic component of the moduli dominates the viscous behaviour.

Figure 28A:
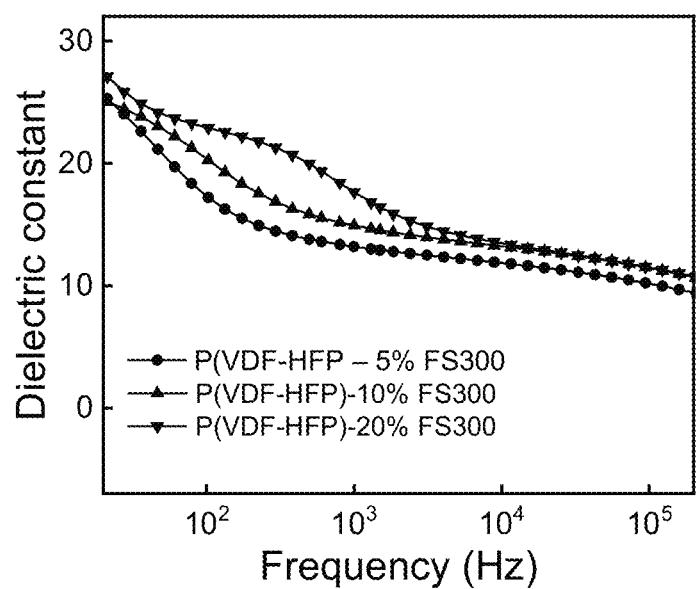
FIG. 28a shows a graph illustrating that after adding more FS300, the dielectric material according to example embodiments becomes higher in dielectric permittivity.
Figure 28B:
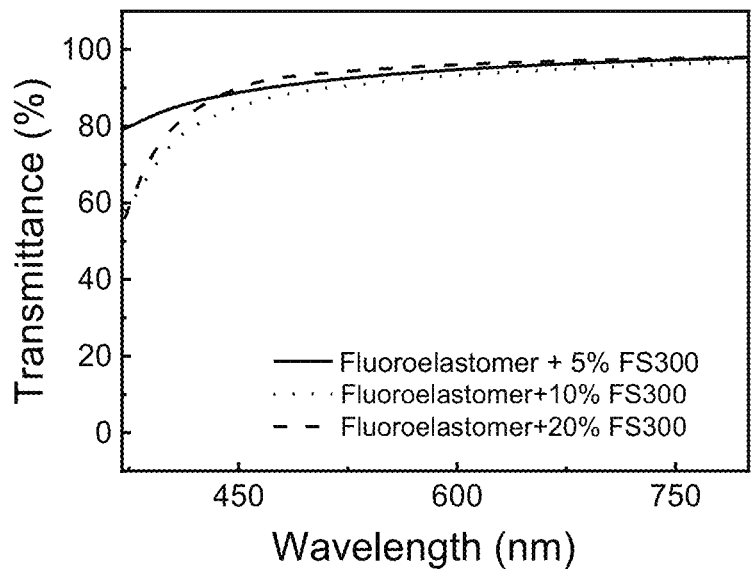
FIG. 28b shows a graph illustrating that the fluoroelastomer-FS300 is highly transparent even after 20 wt % addition of the fluorosurfactant FS300, according to example embodiments. However, they turn yellowish (follow the yellow color of FS300) after adding in 20% of FS300.
Figure 28C:
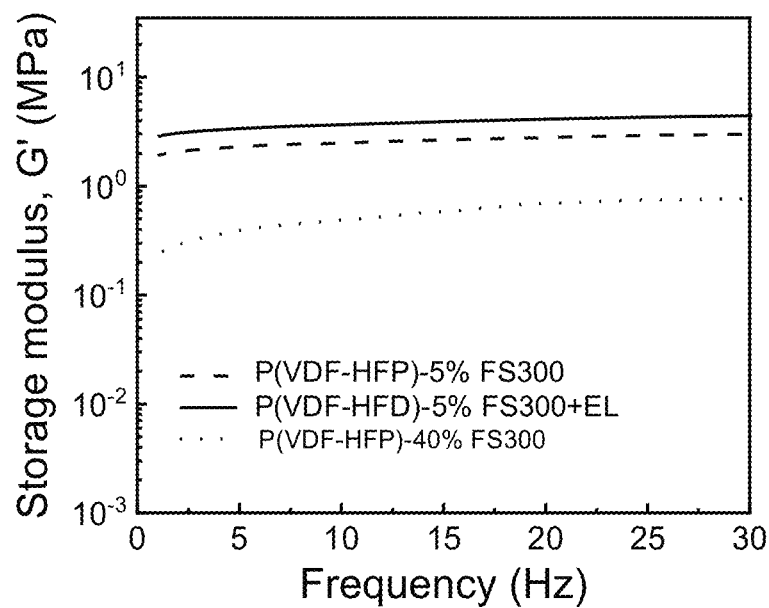
FIG. 28c shows a graph illustrating DMA results showing that with more FS300 (40 wt %) added, the materials according to example embodiments become softer.
Figure 28D:
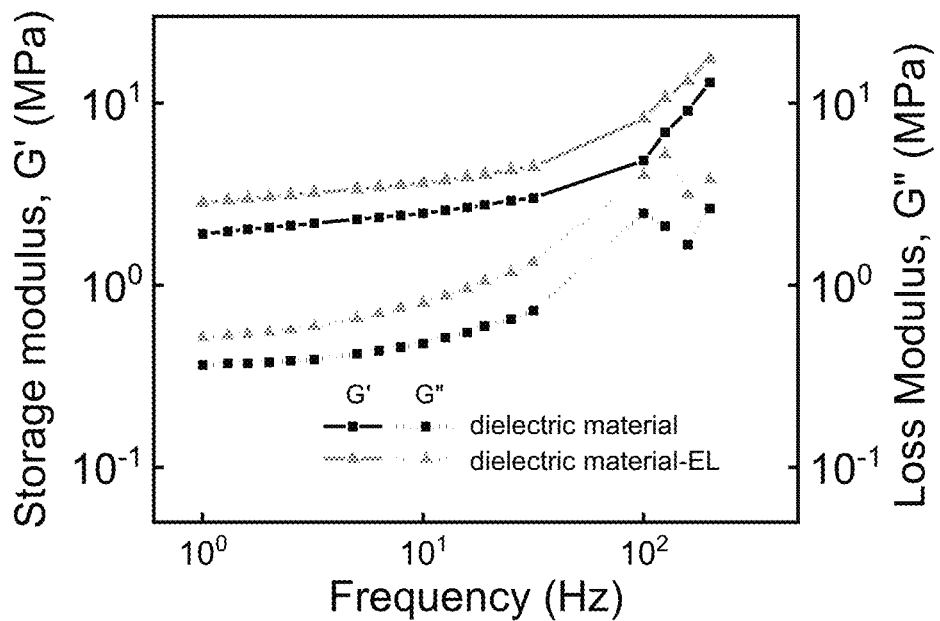
FIG. 28d shows a graph illustrating DMA curves of fluoroelastomer, dielectric (5% FS300) according to an example embodiment, and dielectric-EL (5% FS300 and EL) according to an example embodiment.

Specifically, FIG. 28a shows a graph illustrating that after adding more FS300, the polymer becomes higher in dielectric permittivity, compare curve for 5% FS300, curve for 10% FS300 and curve for 20% FS300. FIG. 28b shows a graph illustrating that the fluoroelastomer-FS300 is highly transparent even after 20 wt % addition of the fluorosurfactant FS300, compare curve for 5% FS300, curve for 10% FS300 and curve for 20% FS300. However, they turn yellowish (follow the yellow color of FS300) after adding in 20% of FS300. FIG. 28c shows a graph illustrating DMA results showing that with more FS300 (40 wt %) added, the materials will become softer (compare curve for 5% FS300, curve for 5% FS300 and EL). FIG. 28d shows a graph illustrating DMA curves of a dielectric (5% FS300) according to an example embodiment, and a dielectric-EL (5% FS300 and EL) according to an example embodiment.

It is noted that when substituting the fluoroelastomer (P(VDF-HFP)) used according to example embodiments with a non-elastomer P(VDF-HFP), adding the fluorosurfactant FS300 imparted neither stretchability nor self-healing properties due to the inherent rigidity of the polymer chains. Thus, the synergistic interactions of the FS300 and an appropriate fluoroelastomer proved critical to achieving the self-healing properties.

Figure 29:
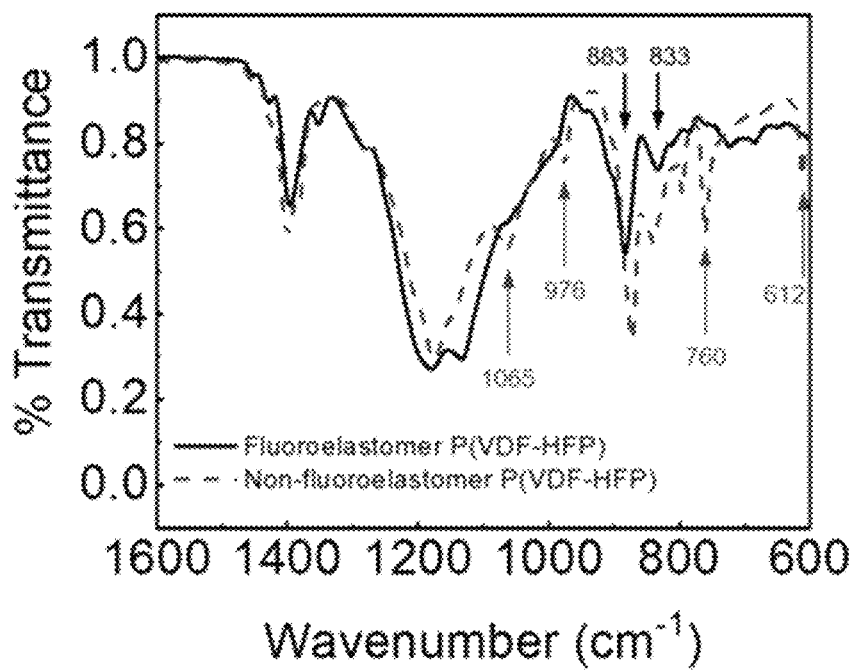
FIG. 29 shows a graph illustrating FTIR results of fluoroelastomer (P(VDF-HFP)) and non-elastomer P(VDF-HFP).

FIG. 29 shows a graph illustrating FTIR results of fluoroelastomer (P(VDF-HFP)) and non-elastomer P(VDF-HFP). The FTIR spectrum of the fluoroelastomer P(VDF-HFP) used according to example embodiments with self-healing properties exhibits amorphous phase peaks 2904, 2906 at 833 and 883 cm$^{-1}$, respectively. In contrast, peaks 2911-14 corresponding to the crystalline phase for P(VDF-HFP) at 1065, 976, 760, and 612 cm$^{-1}$, respectively, are shown in the non-elastomer (P(VDF-HFP) sample which can be used for high permittivity dielectric materials according to example embodiments without self-healing properties, in addition to the amorphous peaks. The non-self-healing, non-elastomer P(VDF-HFP)-FS300 is more rigid than the fluoroelastomer P(VDF-HFP), still rigid even after mixing with FS300. Chains in the non-elastomer P(VDF-HFP) are not mobile enough to mend a cut interface even after pressing the interfaces together for 7 days.

In addition, when another surfactant Triton X100—devoid of halogen, specifically devoid of fluorine groups—was used, a marked difference in the FTIR was observed. The resultant materials were opaque and white. Self-healing properties were also not observed in such composites. Specifically, self-healing was observed forfluoroelastomer-FS300, in contrast to e.g. a non-self-healable material made of fluoroelastomer-Triton X-100 ($C_{14}H_{22}O(C_2H_4O)_n$). Triton is a hydrocarbon analogue of FS300 with no halogen, specifically no fluorine groups for the reversible bonds' formation. The material did not heal even after pressing the cut interfaces together for 7 days.

Our observations above were consistent with DFT calculations. By considering several possible adsorbing configurations of the fluoroelastomer with the FS300 or Triton the corresponding binding energy ($E_b$) values were compiled and compared.

The $E_b$ ranges from −3.35 to −6.70 meV for the fluoroelastomer/FS300 system while from −2.39 meV to −5.00 meV for fluoroelastomer/Triton system. Therefore, the FS300 tends to have a strong interaction with the fluoroelastomer ascribed to the fluorine groups in the chain of the FS300. The abundant fluorine in fluoroelastomer/FS300 system allows rich (—H . . . F—) pairing which is accompanied by strong polar-polar and van der Waal's interaction. Differential charge density calculation of the molecular hybrids also shows that there are clearly stronger charge fluctuations in the backbone of the FS300 than Triton, implying a stronger interaction with the fluoroelastomer. To vividly show the polar-polar interaction between the molecules in fluoroelastomer/FS300 and fluoroelastomer/Triton, we analyze the disturbance of the charge distribution in each molecule due to the combination by calculating the differential charge density. The differential charge density $\Delta\rho=\rho$ (Fluoroelastomer/X)—$\rho$(Fluoroelastomer)—$\rho$(X)], where $\rho$(Fluoroelastomer), $\rho$(X), and $\rho$(Fluoroelastomer/X) are the charge density of the fluoroelastomer, X, and fluoroelastomer/X system, respectively. There exists strong charge disturbance in regions close to the polar groups like —HF and —O, reflecting the polar-polar interaction between such polymers. In addition, there is clearly stronger charge fluctuation in the backbone of the FS300 than Triton, implying a stronger interaction of FS300 with the fluoroelastomer which is consistent with experiments and $E_b$ results. It is noted that this finding can be generalized to other halogen-based elastomer/surfactant systems because halogens are known to be strongly electronegative.

These reversible non-covalent bonds can be repeatedly broken and reformed, giving rise to its repeatable self-healing capability. This result explains the better miscibility and self-healing performance in fluoroelastomer/FS300 hybrid than fluoroelastomer/Triton system in the experimental observation.

Figure 27B:
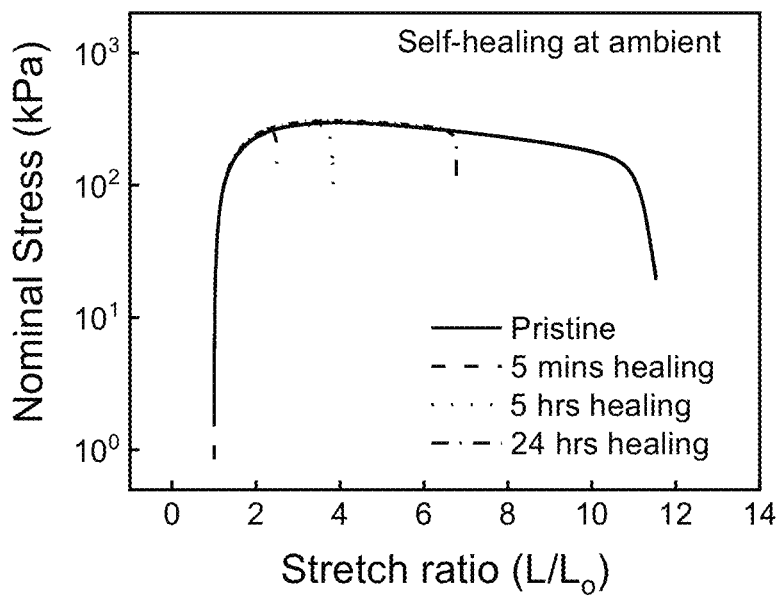
FIG. 27b shows a graph illustrating that after bifurcating into half in the middle, the two parts are repositioned back with gentle compressive force (~0.08 N). The dielectric material showed rapid self-healing after just 5 min of healing at ambient conditions as 91% of the ultimate strength of the pristine material was reached.
Figure 27C:
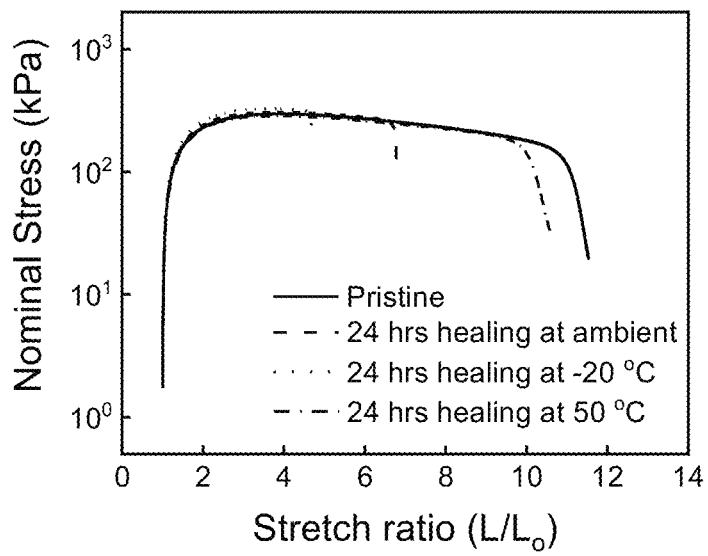
FIG. 27c shows a graph illustrating that the material according to an example embodiment healed almost completely (toughness recovers by 91%) in 1 day when heated to 50° C.

Mechanical Healing Properties of the Dielectric, Dielectric-EL, and Devices According to Example Embodiments The self-healing properties of dielectric specimens according to example embodiments was studied on tensile bars. With reference to FIG. 27b, after bifurcating into half in the middle, the two parts are repositioned back with gentle compressive force (~0.08 N). The dielectric material according to example embodiments showed rapid self-healing after just 5 min of healing at ambient conditions (curve 2720) as 91% of the ultimate strength of the pristine material was reached. Also shown are the curve for 5 hours healing and the curve for 24 hours healing. The material healed almost completely (toughness recovers by 91%) in 1 day when heated to 50° C., as shown in FIG. 27c. Remarkably, the material can also heal at −20° C., due to the low $T_g$ of the material at −25° C. Also shown in FIG. 27c again is the curve for 24 hours healing at ambient. Self-healing of the material according to example embodiments improves with the increase in healing time and temperature. Additionally, when the surface area for healing is increased in thicker samples, alignment of the self-heal region can be much easier and the number of bonds for self-healing is increased, more rapid healing at room temperature can be achieved. This is also synergistic with higher luminance for thicker dielectrics (compare FIG. 12).

When both the dielectric-EL and electrode layers according to example embodiments were mechanically cut, the healing process began as the freshly cut interfaces were pressed together, with adhesion observed almost immediately. After 15 mins, their ultimate strengths nearly recovered when compared to the pristine samples. The assembled device showed 23.6% of self-healing in toughness after being bifurcated into half and healed for 15 mins. They repeatedly self-healed even after 5 cuts.

Figure 30A:
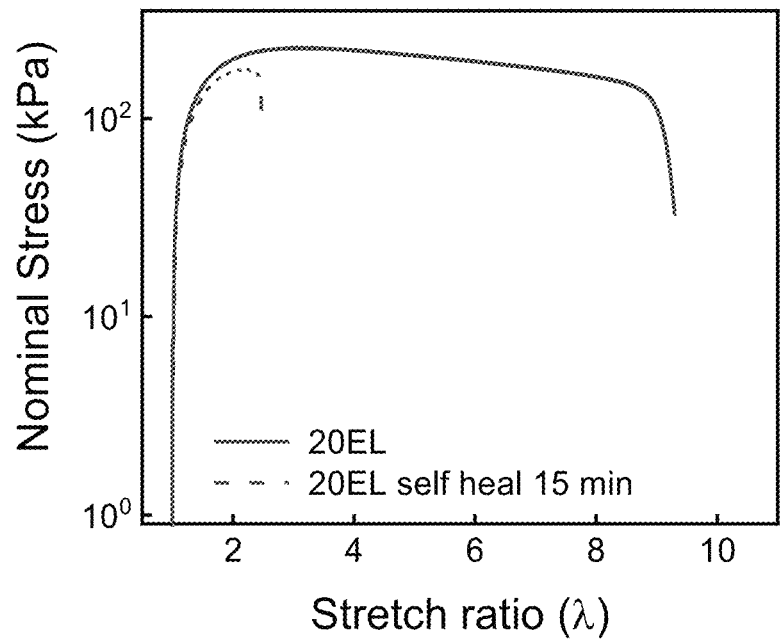
FIG. 30a is a graph illustrating the stress-strain curves showing the pristine and healed samples of dielectric-EL (20EL) according to an example embodiment.
Figure 30B:
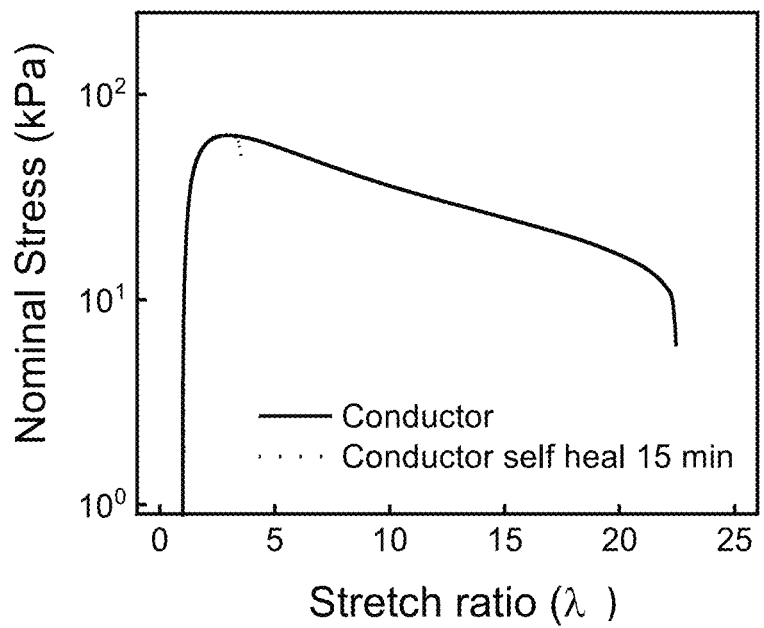
FIG. 30b is a graph illustrating the stress-strain curves showing the pristine and healed samples of an electrode according to an example embodiment.
Figure 30C:
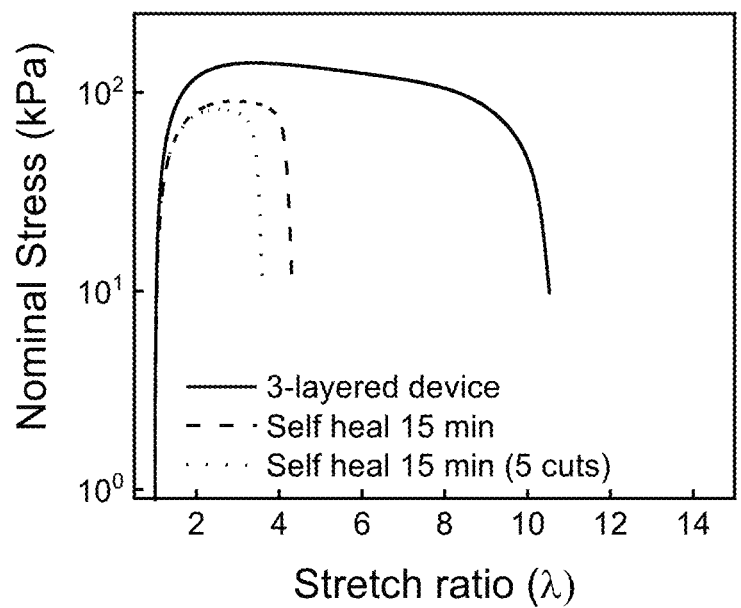
FIG. 30c is a graph illustrating the stress-strain curves showing the pristine and healed samples of 3-layered device. After 5 cuts, the device according to example embodiments can still heal its mechanical properties.

FIG. 30a is a graph illustrating the stress-strain curves showing the pristine and healed samples of dielectric-EL (20EL) according to an example embodiment. FIG. 30b is a graph illustrating the stress-strain curves showing the pristine and healed samples of an electrode according to an example embodiment. FIG. 30c is a graph illustrating the stress-strain curves showing the pristine and healed samples of 3-layered device. After 5 cuts, the device according to example embodiments can still heal its mechanical properties.

Luminance Healing Properties of Devices According to Example Embodiments

Figure 31:
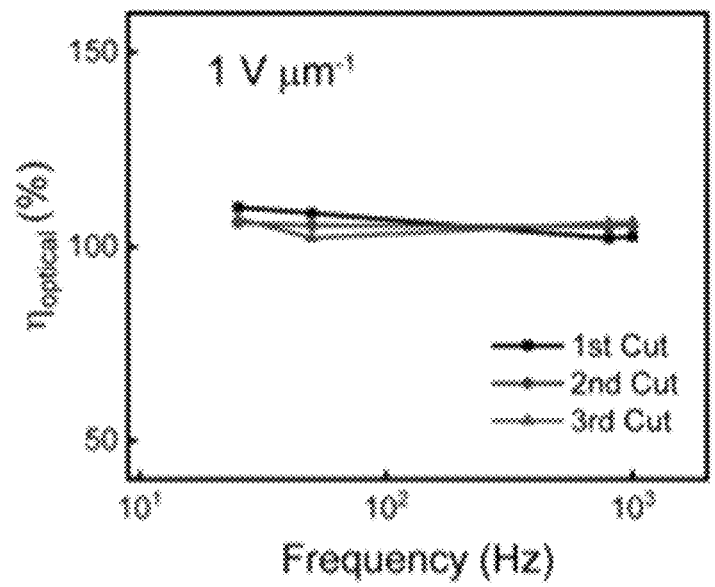
FIG. 31 shows a graph illustrating that, defining the luminance self-healing efficiency as $\eta_{optical}$, which is the percentage of luminance restored relative to the original luminance, the average $\eta_{optical}$ was in a range of 89 to 128%, after the first, second and third cuts when operated at 1 V µm$^{-1}$, according to example embodiments.
Figure 32:
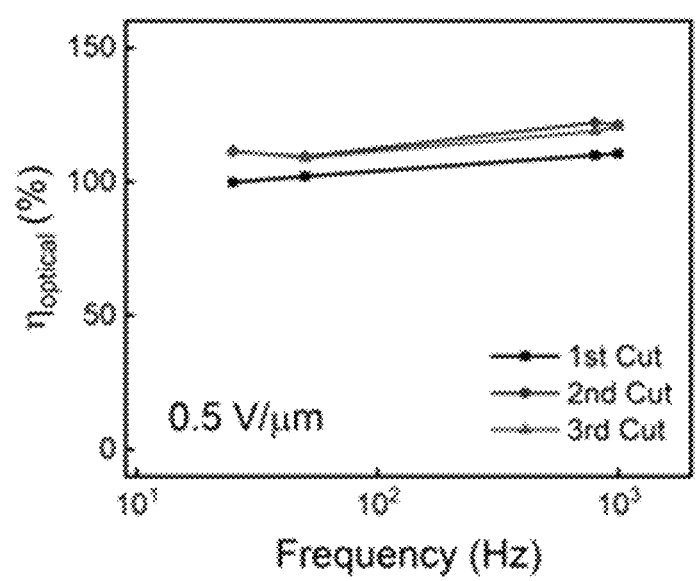
FIG. 32 shows a graph illustrating $\eta_{optical}$ of a device according to an example embodiment when operated at 0.5 V µm$^{-1}$ after first, second and third cuts.

Devices according to example embodiments exhibited a recovery of optical performance in addition to mechanical healing. Cutting a pristine device through all three device layers and gently pressing the damaged surfaces together, after 5 minutes, the damaged interfaces began to adhere. devices according to example embodiments retain their luminance and the damaged interface region emitted light, albeit a vaguely visible scar was observed. Defining the luminance self-healing efficiency as $\eta_{optical}$, which is the percentage of luminance restored relative to the original luminance, the average $\eta_{optical}$ was in a range of 89 to 128% as shown in the graph in FIG. 31, after the first, second and third cuts when operated at 1 V µm$^{-1}$. FIG. 32 shows a graph illustrating $\eta_{optical}$ of a device according to an example embodiment when operated at 0.5 V µm$^{-1}$ after first, second and third cuts. The small observed changes in luminance can be attributed to the inevitable but slight change in the dielectric thickness and optical scattering effects during the manual damage-and-heal processes.

In contrast, Silicone-based LECs did not show self-healing in electrical and mechanical properties. After pressing the damaged surfaces together, the control sample suffered a catastrophic dielectric breakdown when operated at its required operating conditions. The silicone LECs failed upon damage because the dielectric layer did not have electro-mechanical self-healing properties. Moreover, these silicone LECs require high E, making them more prone to permanent damage from the dielectric breakdown. Specifically, for a stretchable EL (control sample: non-self-healing) being cut and put back together for testing, the electrode material was made up of a silver nanowire solution coated on a poly(vinyl alcohol) (PVA), and the dielectric material was Ecoflex mixed with EL {1}, Ref 8. After damaging and pressing the fractured surface together, the control sample broke down catastrophically with sparks given out when operating under its normal operating conditions (2500 V, $f_{ac}$=500 Hz).

In addition, the device according to example embodiments can be puncture-resilient. The reasons for the puncture resistance of the device according to example embodiments are: i) the $V_{ac}$ of the device according to example embodiments is fairly low to achieve the same brightness as the silicone control. When the needle short circuits the two electrodes, current flows through the needle but the heat generated is not large enough to degrade the dielectric according to example embodiments. In a silicone LEC, the $V_{ac}$ required is very high (3 kV), which causes high currents to flow through the needle, thereby generating heat and degrading the silicone dielectric. ii) dielectric according to example embodiments can heal from mechanical damage due to its intrinsic self-healing property. In contrast, the silicone LEC has a punctured region still clearly observable under the optical microscope. Even when self-healable electrodes were used for silicone LECs, the punctured area underwent breakdown and charred. A stretchable EL (control sample: non-self-healing) with a pair of self-healing electrode was punctured. The dielectric material was PDMS mixed with EL {9}. After puncturing, the device illuminated for a fraction of a second, then the device dimmed off. After removing the needle and illuminating the device again, the sample was burnt with sparks. The ionic conductor has relatively high resistance compared to metals. A metal needle puncture would cause a localized short circuit. Due to the high E, when punctured, the current flowing through the needle is large. This control device did not have a self-healing dielectric layer, thus the weakened dielectric had air gaps which could undergo dielectric breakdown under the high electric field that causing sparking. The heat generated carbonized the polymer, leading to conductive pathways which caused the device to fail permanently.

Soft Robot Applications With Device According to an Example Embodiment

Figure 33B:
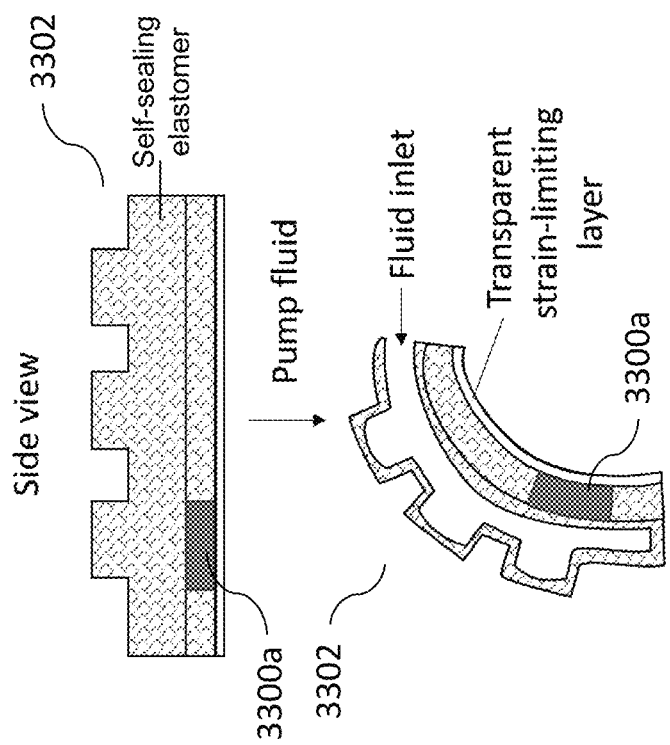
FIG. 33b shows a schematic side view (top) and schematic cross-sectional view (bottom) of an arm of the soft robotic gripper of FIG. 33a, illustrating pneumatic grip-activation.
Figure 33A:
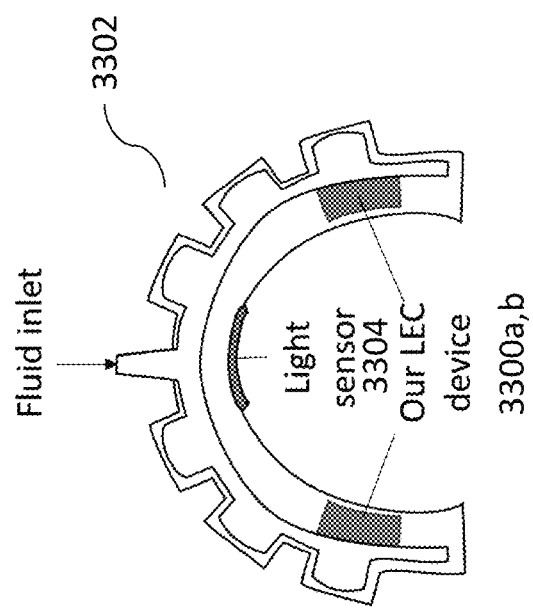
FIG. 33a shows a schematic cross-sectional view of a soft robotic gripper according to an example embodiment.

With reference to FIGS. 33a and 33b, devices 3300a,b according to example embodiments was embedded into a prototypical soft robotic gripper 3302 capable of receiving optical feedback using a previously described self-sealing soft robotic gripper$^{37}$. The embedded devices 3300a,b according to the example embodiments act as the flexible light sources. Together with an optical sensing photodetector 3304 integrated to the gripper 3302 base, it was shown that gripper 3302 can be used to sense the proximity of objects in dark environments. As the gripper 3302 approached a target object, the light intensity reflected from object increased. This indicated the proximity and signalled the gripper 3302 as a pneumatic actuator to grasp the target object.

The robustness of the devices according to example embodiments to needle punctures enabled the soft robotic gripper 3302 to grasp sharp objects such as a cactus with constant illumination while grasping. Although the cactus spines did not pierce the gripper 3302, in another experiment the soft robatic gripper 3002 was pneumatically actuated to conform to an inflated balloon and a needle was intentionally pierced through the gripper 3302 and the device 3300a, b according to an example embodiment until it punctured the balloon. The robotic gripper 3302 self-healed mechanically and optically instantly.

Figure 34:
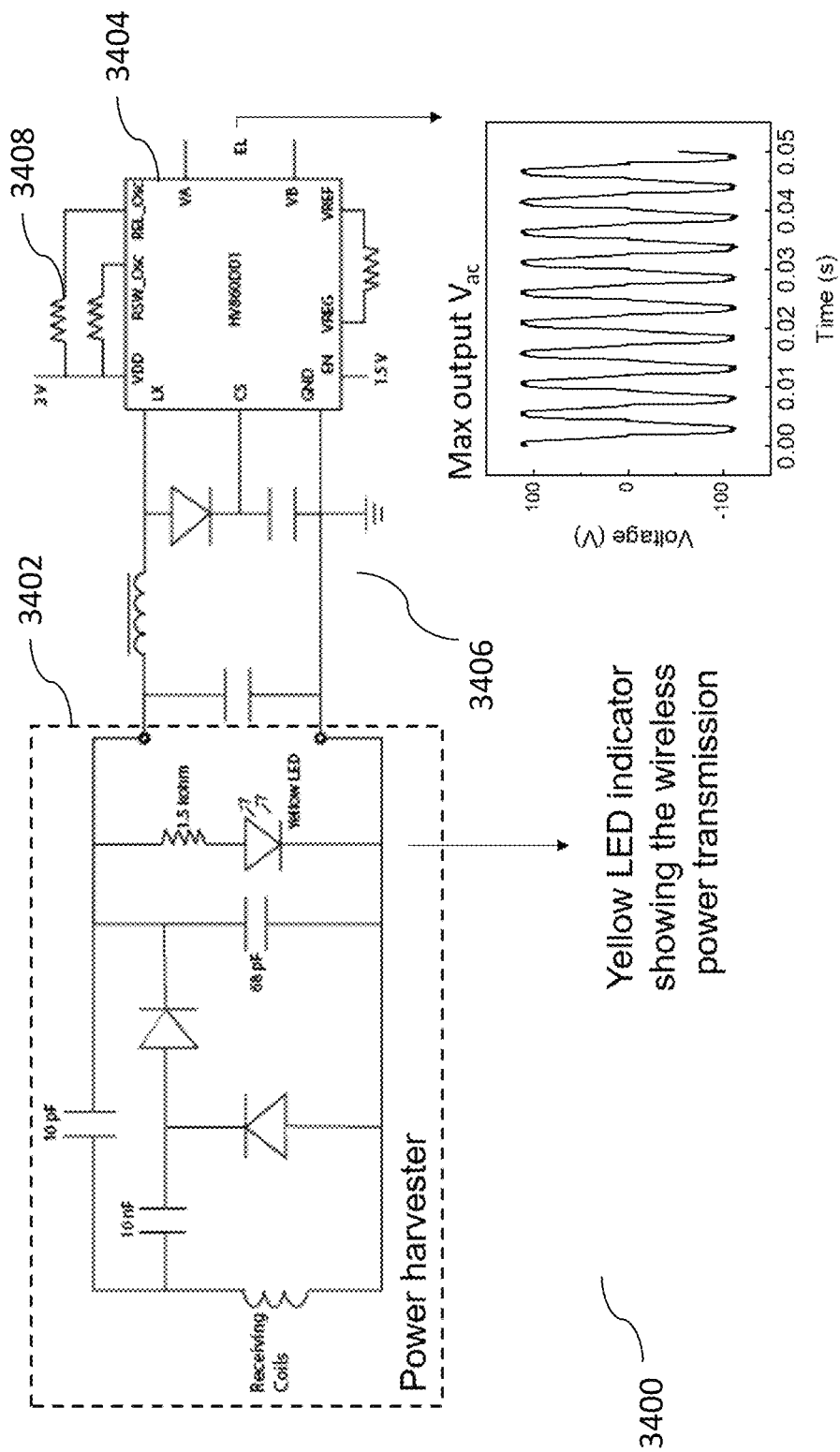
FIG. 34 shows a circuit diagram 3400 of the wireless power harvester 3402 and the control circuit for the EL Lamp Driver 3304 for the device according to an example embodiment.

Capability of Wireless Powering of Devices According to Example Embodiments To demonstrate the advantages of the low absolute operating voltages of devices according to example embodiments, it was further shown that the device according to an example embodiment can be wirelessly powered. The device according to an example embodiment and the flexible circuits were encapsulated into a soft "jellyfish". With a radiofrequency coil (RF coil) transmitter, one can illuminate the "jellyfish" on air and through water ($V_{ac}$ ranges from 50 to 90 V with a frequency of 200 Hz). In contrast, the control of a control silicone "jellyfish" cannot be illuminated. Such wirelessly powered optoelectronic devices according to example embodiments could be useful for emerging untethered soft robots. FIG. 34 shows a circuit diagram 3400 of the wireless power harvester 3402 and the control circuit for the EL Lamp Driver 3404 for the device according to an example embodiment. An EL Lamp Driver HV860 3404 was used to drive the device and the control silicone device. The power harvester circuit 3402 is connected to the HV860 3304 input terminal, where a boost converter 3406 steps up the input signal to the required driving voltage (around 160 V peak-to-peak) of the device according to example embodiments. The driving frequency is tuned by a resistor 3408 connected between the VDD pin and REL Osc pin of the HV860 3304. An enable pin (EN) is tied to 1.5 V for turning on the control circuit. In the device according to an example embodiment, VDD comes from wireless power, whereas EN comes from a battery which acts as a switch. The control circuit for the EL Lamp Driver 3304 is fabricated on a flexible PCB with a dimension of 30×30 mm².

Figure 35B:
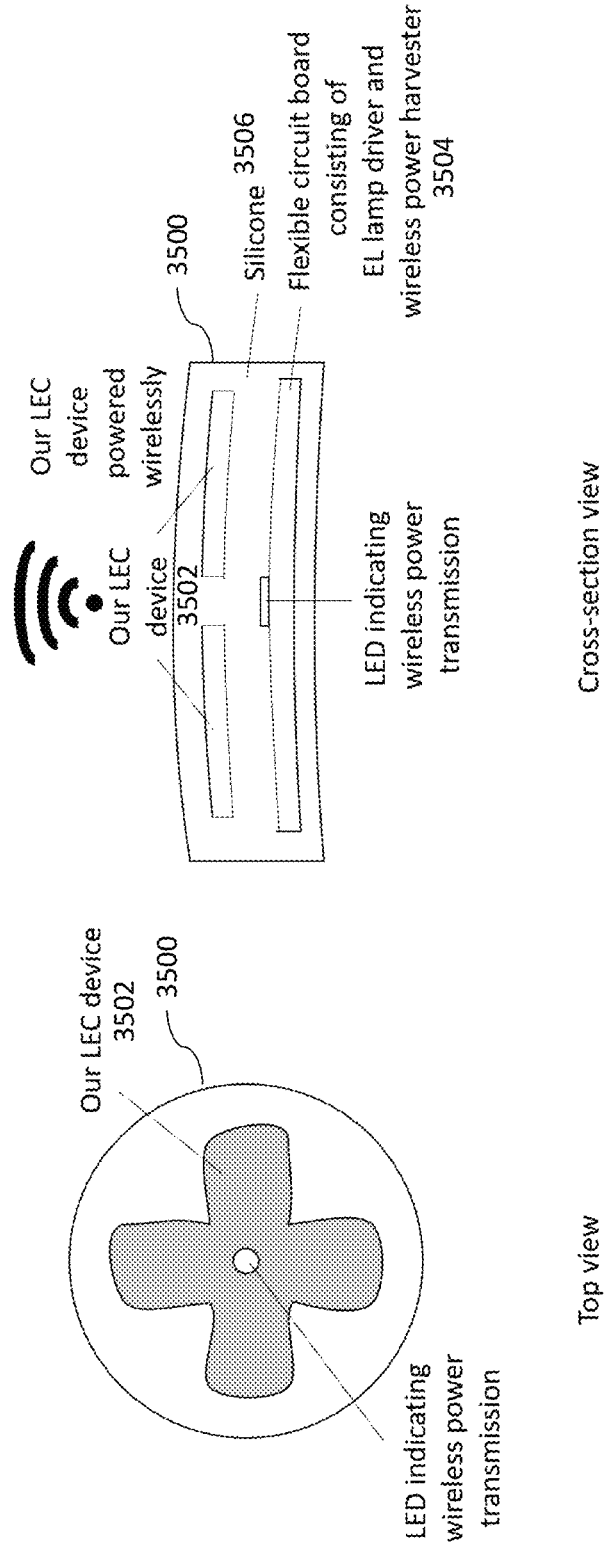
Figure 35A:
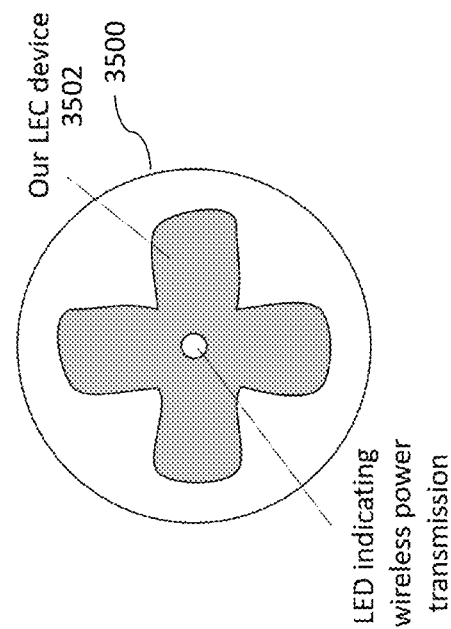
FIG. 35a shows a schematic top view of a device an example embodiment, capable of being wirelessly powered.

With reference to FIGS. 35*a* and 35*b*, a soft "jellyfish" 3500 incorporating an LEC device 3502 according to an example embodiment was able to be wirelessly powered using the lexible circuit board 3504 consisting of the EL lamp driver and wireless power harvester as described above with reference to FIG. 34, embedded in silicone 3506.

In one embodiment there is provided a dielectric material comprising a halogen-based elastomer mixed with a halogen based surfactant and exhibiting electro-mechanical self-healing properties.

The dielectric material may exhibit a dielectric constant of about 20 or more for frequencies below 100 Hz.

The dielectric material may be transparent in visible light spectrum. The dielectric material may exhibit a transparency of more than 20% across the visible light spectrum. The dielectric material may exhibit a transparency of more than 50% at wavelengths greater than about 500 nm. The dielectric material may exhibit a transparency of about 80% at 800 nm.

The dielectric material may be transparent in Infrared light spectrum.

The dielectric material may be transparent in Ultra Violet light spectrum.

The dielectric material may exhibit a glass transition temperature below room temperature. The glass transition temperature may be about minus 25 degree Celsius.

The dielectric material may be stretchable up to about 800% relative to a quiescent state. The dielectric material may be stretchable to more than 2000% relative to the quiescent state.

The dielectric material may further comprise micro- or nano-particles dispersed in the mixture of the halogen-based elastomer with the halogen based surfactant.

The dielectric material may further comprise at least one additional polymer based material in the mixture of the halogen-based elastomer with the halogen based surfactant.

The dielectric may exhibit opto-electrical properties.

The micro- or nanoparticles may exhibit electro-luminance properties.

The additional polymer may comprise a light-emitting fluorescent polymer such as spiro-copolymers & poly(phenylenevinylene) (PPV) —based polymers.

The additional polymer may comprise a solar cell polymer such as PPV derivatives, poly(thiophene) derivatives, and polyfluorene derivatives.

The dielectric material may exhibit opto-mechanical self-healing properties.

In one embodiment there is provided a dielectric material comprising a halogen-based polymer mixed with a halogen based surfactant and exhibiting an increased dielectric constant compared to the halogen-based polymer.

The halogen-based polymer may comprise a halogen-based elastomer or a halogen based non-elastomer.

In one embodiment there is provided a device comprising the dielectric material according to an example embodiment.

The device may further comprise one or more electrodes made from a material exhibiting electro-mechanical self-healing properties.

The dielectric material may be sandwiched between two of the electrodes.

The dielectric material may be positioned laterally between two of the electrodes.

The device may comprise a light guiding device, an electro-luminance device, a solar energy harvesting device, or an electronic device modulated by an electric field such as a field-effect transistor.

In one embodiment there is provided a use of the dielectric material according to an example embodiment in the fabrication of a device.

In one embodiment there is provided a method of imparting electro-mechanical self-healing properties and/or an increased dielectric constant to a halogen-based elastomer, the method comprising mixing the halogen-based elastomer with a halogen based surfactant.

In one embodiment there is provided a method of imparting an increased dielectric constant to a halogen-based polymer, the method comprising mixing the halogen-based polymer with a halogen based surfactant.

The halogen-based polymer may comprise a halogen-based elastomer or a halogen based non-elastomer.

In summary, embodiments of the present invention provide a self-healing dielectric layer, with applications including, but not limited to, fabrication of self-healing EL devices —referred to as devices according to example embodiments. The devices were demonstrated to have the lowest threshold voltage and operational frequency among all the reported stretchable EL devices reported to date. It was further demonstrated that the whole device according to example embodiments is stretchable up to 800%. It is envisaged that devices according to example embodiments can provide a robust, reconfigurable option for emerging soft, stretchable displays for use in robotics, wearable electronics, electronic skins, and future display systems.

Materials For Use in Example Embodiments

Fluorosurfactant Zonyl FS-300, and fluoroelastomer poly (vinylidene fluoride-co-hexafluoropropene) (PVDF-HFP) were used in example embodiments. The fluoroelastomer P(VDF-HFP) was used as received and Zonyl FS-300 was dried prior to use. It is noted that different halogen-surfactants and/or different halogen-elastomers can be used in different embodiments. Zonyl FS-300 can be replaced by other fluorosurfactants such as 3M Fluorosurfactant (FC-4430, FC-4432, FC-4434), and Capstone Fluorosurfactants (FS 22, FS 83, ST 200, and LPA) for the same dielectric constant enhancement and self-healing effects.

Fabrication of the Dielectric Material According to an Example Embodiment

The dielectric according to an example embodiment was prepared by mixing fluoroelastomer P(VDF-HFP) with Zonyl FS-300 in acetone and stirred. In one non-limiting example, 8 g of fluoroelastomer P(VDF-HFP) were mixed with 374 µL Zonyl FS-300 were mixed in 30 mL acetone and stirred. The solution was poured into a glass petri dish, and the acetone was let to evaporate to form a 1 mm-thick film. It is noted that other halogen-based embodiments can be fabricated using the same/a similar process as described for the specific fluoro-based example, as long as suitable solvents are chosen for both the elastomer and surfactant.

Fabrication of Electrode for Use in Example Embodiments

The electrodes were prepared by mixing fluoroelastomer P(VDF-HFP) with 1-ethyl-3-methylimidazolium trifluoromethanesulfonate (EMIM Otf) in acetone. In one non-limiting example, 8 g of fluoroelastomer P(VDF-HFP) were mixed with >2 ml of 1-ethyl-3-methylimidazolium trifluoromethanesulfonate (EMIM Otf) in 30 mL of acetone. The solution was stirred at room temperature then poured into a glass petri dish. The acetone evaporated to form a 1 mm-thick film. It is noted that any other ionic liquids may be used in different embodiments.

The fluoroelastomer P(VDF-HFP)-Zonyl FS300-acetone solution (i.e. dielectric material according to an example embodiment) and fluoroelastomer P(VDF-HFP)-EMIM Otf-acetone solution (i.e. electrode material according an example embodiment) was 3D printed using a dispenser system.

Fabrication of a Dielectric-EL Layer According to Example Embodiments

The dielectric-EL layer according to an example embodiments was prepared by mixing the fluoroelastomer P(VDF-HFP)-Zonyl FS300-acetone with 20 wt % (or other desired % in different embodiments) ZnS:Cu microparticles (Lonco Company Ltd) for blue emission or ZnS:Cu based phosphor powder (Shanghai Keyan Phosphor Technology Co.,Ltd. (KPT)) for orange emission using SpeedMixer (FlackTek Inc.), followed by doctor-blade coating to form 1 mm-thick sample. A device according to an example embodiment was fabricated by sandwiching the dielectric-EL in between two electrode layers. Aluminum tape and silver paste or liquid metal was used to electrically connect the electrode with the external power source. It is noted that any other semiconducting micro- and nanoparticles can be used in different embodiments, such as, but not limited to, ZnS, ZnSe, CdSe, CdS, ZnO, CdO, Cu2S, CuInSe2, CdZnO, CdTe, etc. and may comprise dopants e.g. copper ions, manganese ions, zinc ions, indium ions, chloride ions, aluminum ions.

Materials Characterization of Devices According to Example Embodiments

Ionic conductivity of the electrodes was measured by an LCR meter (Zurich Instruments) over the frequency range from 1 Hz to 5 MHz at 300 mV at room temperature. The dielectric constants were measured using Alpha A High-Performance Frequency Analyzer (Novocontrol Technologies) with a ZG2 extension test interface. Tensile tests were conducted using samples of size 1 cm (gauge length)×1 cm (width), mounted on a linear stage New Mark systems NLE-200 programmed through a motion controller (NSC-A1). Forces for stretching were measured using Mark 10 force gauge. All samples were stretched at a rate of 1 mm/s. Healing experiments were performed at room temperature by pressing the damaged interfaces back into contact. Capacitance of the 3-layered device according to example embodiments was measured with a LCR meter (Zurich Instruments) at room temperature, over the frequency range from 10 Hz to 2 kHz.

Interfacial bonding of materials was studied using the T-peel test. The test was conducted using samples of size 1 mm (thick)×1 cm (width)×4 cm (length) each. Two-layered specimens were prepared by gently placing one sample on top of the other sample, with adherence region of 1 cm (width)×3 cm (length). 5 mm of the unadhered region of each layer was clamped on the tensile tester, and the 2-layered specimens were pulled at a rate of 1 mm/s, tested on an Instron 5569. The tests were conducted at room temperature immediately after the two surfaces attached to each other.

Characterization of Performance of Devices According to Example Embodiments

Voltage signals to test the electroluminescence of the device according to example embodiments were generated using NI-cDAQ 9138 programmed through a custom script. The signals were amplified by a high voltage amplifier (Trek 610C). An alternating voltage is applied for the devices. Luminance of the devices was measured by a digital light meter HHLM1337 (OMEGA Engineering).

Power measurement was carried out using a modified setup{1}. Briefly, the resistance of the resistors was measured using a multimeter (72-7780, Tenma Corporation) and the voltage across the resistors was measured via connection to a voltage input module (NI 9205) into LabVIEW (National Instruments Corporation). $R_a$, $R_b$ and $R_c$ were measured to be 21.79Ω, 21.60 kΩ and 2.229 MΩ respectively. A 200 V, 50 Hz sinusoidal voltage was applied to a sample of approximately 1 cm$^2$ area and 100 μm thickness. $V_{ba}$, $V_a$ and phase shift were read from the graphs plotted from data to be 1.878 V, 3.326 V and 0.2357 rad respectively.

DFT Calculations

In the VASP, the effect of the images of the molecules was avoided by inserting a vacuum region with a thickness greater than 10 A. The first Brillouin zone was sampled with Γ point and the exchange-correlation functional was adopted with generalized gradient approximation (GGA) and Perdew-Burke-Ernzerhof (PBE). A kinetic energy cutoff of 400 eV was selected for the plane wave basis set. The structures were fully relaxed until the forces were less than 0.005 eV A$^{-1}$. As the dipole moment describes the separation of the negative and positive charge centers in a molecule, it scales with and varies with the length of the molecules. For dipole moment calculation for HELIOS dielectric, to check the tendency of the charge delocalization in the fluoroelastomer and FS300, we choose their atomic models above with nearly the same length along the chain.

COMSOL Simulation

A commercial Finite Element Method Solver (COMSOL 5.2a) was used to study the influence of different permittivity of dielectric materials on electric field distribution. We used the two-dimensional cross-sectional geometries, in which the circles represent the EL phosphor powder and are distributed with various densities in different polymers.

Wirelessly Powering

The power harvester was fabricated as following: the rectifier was assembled on a rigid PCB (R4-TG130 substrate, 1 oz Ag, Gold phoenix Printed Circuit Board Co., Ltd) by microsoldering (NAE-2A, JBC) the following components: (1) 10-pF capacitor (Johanson Technology, 250R05L100GV4T), (2) 10-nF capacitor (Murata Electronics, GRM0335C1HR20WA01D), (3) 68-pF capacitor (Murata Electronics, GRM0335C1E680JA01), (4) Schottky diode (Skyworks, SMS7621-060). The PCBs were integrated together with a yellow LED chip (Lumex, SML-LX0603YW-TR) in series with a resistor (Yageo, RC0201JR-071K5L). The power harvester circuit is connected to the HV860 input terminal.

Embodiments of the present invention can have one or more of the features and associated advantages shown in table 1 below.

TABLE 1

| Feature | Benefit/Advantage |
| --- | --- |
| Self-healing of entire device | Intrinsic self-healing upon pressure application |
| | Immediate healing in performance upon failure |
| | Self-heal after dielectric breakdown |
| | Improve lifespan of display screens |
| Soft, high flexibility, and high stretchability of entire device | Deformable to desired shapes |
| | High flexibility to conform on any surfaces |
| | Stretchable display screens for novel display applications |
| Low operational voltage and frequency | Much lower operational voltage and frequency compared to current stretchable displays |
| | Easy to be incorporated in various devices |
| Self-sticking between electrode and dielectric material | Minimal adhesives and complexity involved |
| | Physical construction of the layered devices is greatly simplified: Cheap and robust systems can be realized |
| | Highly scalable fabrication technique |
| Printable, editable materials | Patterning of light is greatly simplified by 3D printing or "cut-and-paste" or punching of materials |
| High transparency of dielectric material | High brightness with more light transmitted |
| | Light up from all angles of the display |
| | Useful for all other optoelectronic devices including solar cells and optical fibers. |

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, even if the feature or combination of features is not explicitly specified in the claims or in the detailed description of the present embodiments.

Unless the context clearly requires otherwise, throughout the summary section or the detailed description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

[1] B. C. K. Tee, A. Chortos, A. Berndt, A. K. Nguyen, A. Tom, A. McGuire, Z. C. Lin, K. Tien, W. G. Bae, H. Wang, P. Mei, H. H. Chou, B. Cui, K. Deisseroth, T. N. Ng, Z. Bao, Science. 2015, 350, 313.

[2] H.-H. Chou, A. Nguyen, A. Chortos, J. W. F. To, C. Lu, J. Mei, T. Kurosawa, W.-G. Bae, J. B.-H. Tok, Z. Bao, Nat. Commun. 2015, 6, 8011.

[3] C. Larson, B. Peele, S. Li, S. Robinson, M. Totaro, L. Beccai, B. Mazzolai, R. Shepherd, Science 2016, 351, 1071.

[4] T. Sekitani, H. Nakajima, H. Maeda, T. Fukushima, T. Aida, K. Hata, T. Someya, Nat. Mater. 2009, 8, 494.

[5] R.-H. Kim, D.-H. Kim, J. Xiao, B. H. Kim, S.-I. Park, B. Panilaitis, R. Ghaffari, J. Yao, M. Li, Z. Liu, V. Malyarchuk, D. G. Kim, A.-P. Le, R. G. Nuzzo, D. L. Kaplan, F. G. Omenetto, Y. Huang, Z. Kang, J. A. Rogers, Nat. Mater. 2010, 9, 929.

[6] J. Wang, C. Yan, G. Cai, M. Cui, A. Lee-Sie Eh, P. See Lee, Adv. Mater. 2016, 28, 4490.

[7] J. Wang, C. Yan, K. J. Chee, P. S. Lee, Adv. Mater. 2015, 27, 2876.

[8] C. H. Yang, B. Chen, J. Zhou, Y. M. Chen, Z. Suo, Adv. Mater. 2016, 28, 4480.

[9] S. Li, B. N. Peele, C. M. Larson, H. Zhao, R. F. Shepherd, Adv. Mater. 2016, 28, 9770.

[10] B. You, Y. Kim, B.-K. Ju, J.-W. Kim, ACS Appl. Mater. Interfaces 2017, 9, 5486.

[11] Z. Wang, Y. Chen, P. Li, X. Hao, J. Liu, R. Huang, Y. Li, ACS Nano 2011, 5, 7149.

[12] S. M. Jeong, S. Song, H. Kim, S.-H. Baek, J. S. Kwak, RSC Adv. 2017, 7, 8816.

[13] Z. Zhang, X. Shi, H. Lou, Y. Xu, J. Zhang, Y. Li, X. Cheng, H. Peng, J. Mater. Chem. C 2017, 5, 4139.

[14] P. D. Rack, A. Naman, P. H. Holloway, S.-S. Sun, R. T. Tuenge, MRS Bull. 1996, 21, 49.

[15] H. L. Filiatrault, G. C. Porteous, R. S. Carmichael, G. J. E. Davidson, T. B. Carmichael, Adv. Mater. 2012, 24, 2673.

[16] Z. Yu, X. Niu, Z. Liu, Q. Pei, Adv. Mater. 2011, 23, 3989.

[17] E. H. Kim, S. H. Cho, J. H. Lee, B. Jeong, R. H. Kim, S. Yu, T. W. Lee, W. Shim, C. Park, Nat. Commun. 2017, 8, 1.

[18] T. Sekitani, Y. Noguchi, K. Hata, T. Fukushima, T. Aida, T. Someya, Science. 2008, 321, 1468.

[19] P. Etienne, R. Stephen, D. S. C., S. M. E., D. M. D., Adv. Mater. 2013, 25, 1589.

[20] D. Yin, J. Feng, R. Ma, Y.-F. Liu, Y.-L. Zhang, X.-L. Zhang, Y.-G. Bi, Q.-D. Chen, H. B. Sun, Nat. Commun. 2016, 7, 11573.

[21] F. Chen, A. H. Kitai, in Handb. Vis. Disp. Technol., Springer Berlin Heidelberg, Berlin, Heidelberg, 2012, pp. 1193-1205.

[22] P. D. Rack, P. H. Holloway, Mater. Sci. Eng. R Reports 1998, 21, 171.

[23] C. J. Alder, A. F. Cattell, K. F. Dexter, M. Dixon, J. Kirton, M. S. Skolnick, IEEE Trans. Electron Devices 1981, 28, 680.

[24] N. Matsuhisa, M. Kaltenbrunner, T. Yokota, H. Jinno, K. Kuribara, T. Sekitani, T. Someya, Nat. Commun. 2015, 6, 7461.

[25] Y. Cao, T. G. Morrissey, E. Acome, S. I. Allec, B. M. Wong, C. Keplinger, C. Wang, Adv. Mater. 2017, 29, 1.

[26] Y. J. Tan, J. Wu, H. Li, B. C. K. Tee, ACS Appl. Mater. Interfaces 2018, DOI 10.1021/acsami.7b19511.

[27] M. Bredol, H. Schulze Dieckhoff, Materials (Basel). 2010, 3, 1353.

[28] F. Stauffer, K. Tybrandt, Adv. Mater. 2016, 28, 7200.

[29] X. Chen, M. A. Dam, K. Ono, A. Mal, H. Shen, S. R. Nutt, K. Sheran, F. Wudl, 12 Science 2002, 295, 1698.

[30] B. C. K. Tee, C. Wang, R. Allen, Z. Bao, Nat Nano 2012, 7, 825.

1. Tee, B. C. K. et al. A skin-inspired organic digital mechanoreceptor. *Science* (80-.). 350, 313-316 (2015).
2. Yokota, T. et al. Ultraflexible organic photonic skin. *Sci. Adv.* 2, e1501856-e1501856 (2016).
3. Hammock, M. L., Chortos, A., Tee, B. C.-K., Tok, J. B.-H. & Bao, Z. 25th Anniversary Article: The Evolution of Electronic Skin (E-Skin): A Brief History, Design Considerations, and Recent Progress. *Adv. Mater.* 25, 5997-6038 (2013).
4. Sekitani, T. & Someya, T. Stretchable, Large-area Organic Electronics. *Adv. Mater.* 22, 2228-2246 (2010).
5. Chou, H.-H. et al. A chameleon-inspired stretchable electronic skin with interactive colour changing controlled by tactile sensing. *Nat. Commun.* 6, 8011 (2015).
6. Larson, C. et al. Highly stretchable electroluminescent skin for optical signaling and tactile sensing. *Science* 351, 1071-4 (2016).
7. Lu, N. & Kim, D.-H. Flexible and Stretchable Electronics Paving the Way for Soft Robotics. *Soft Robot.* 1, 53-62 (2014).
8. Kim, R.-H. et al. Waterproof AlInGaP optoelectronics on stretchable substrates with applications in biomedicine and robotics. *Nat. Mater.* 9, 929-937 (2010).
9. Shepherd, R. F. et al. Multigait soft robot. *Proc. Natl. Acad. Sci. U.S.A.* 108, 20400-3 (2011).
10. Sekitani, T. et al. Stretchable active-matrix organic light-emitting diode display using printable elastic conductors. *Nat. Mater.* 8, 494-499 (2009).
11. Wang, J., Yan, C., Chee, K. J. & Lee, P. S. Highly Stretchable and Self-Deformable Alternating Current Electroluminescent Devices. *Adv. Mater.* 27, 2876-2882 (2015).
12. Kim, E. H. et al. Organic light emitting board for dynamic interactive display. *Nat. Commun.* 8, 1-8 (2017).
13. Cao, Y. et al. Self-healing electronic skins for aquatic environments. *Nat. Electron.* 2, 75-82 (2019).
14. Sekitani, T. et al. A Rubberlike Stretchable Active Matrix Using Elastic Conductors. *Science* (80-.). 321, 1468-1472 (2008).
15. Palleau, E., Reece, S., Desai, S. C., Smith, M. E. & Dickey, M. D. Self-Healing Stretchable Wires for Reconfigurable Circuit Wiring and 3D Microfluidics. *Adv. Mater.* 25, 1589-1592 (2013).
16. Yin, D. et al. Efficient and mechanically robust stretchable organic light-emitting devices by a laser-programmable buckling process. *Nat. Commun.* 7, 11573 (2016).
17. Wang, J. et al. Extremely Stretchable Electroluminescent Devices with Ionic Conductors. *Adv. Mater.* 28, 4490-4496 (2016).
18. KAM, P. C. A., KAM, A. C. & THOMPSON, J. F. Noise pollution in the anaesthetic and intensive care environment. *Anaesthesia* 49, 982-986 (1994).
19. Tan, Y. J., Wu, J., Li, H. & Tee, B. C. K. Self-Healing Electronic Materials for a Smart and Sustainable Future. *ACS Appl. Mater. Interfaces* 10, 15331-15345 (2018).
20. Wallin, T. J., Pikul, J. & Shepherd, R. F. 3D printing of soft robotic systems. *Nat. Rev. Mater.* 3, 84-100 (2018).
21. Ribeiro, C. et al. Electroactive poly(vinylidene fluoride)-based structures for advanced applications. *Nat. Protoc.* 13, 681-704 (2018).
22. Cao, Y. et al. A Transparent, Self-Healing, Highly Stretchable Ionic Conductor. *Adv. Mater.* 29, 1605099 (2017).
23. Daly, S., Kunkel, T., Sun, X., Farrell, S. & Crum, P. 41.1: *Distinguished Paper*: Viewer Preferences for Shadow, Diffuse, Specular, and Emissive Luminance Limits of High Dynamic Range Displays. *SID Symp. Dig. Tech. Pap.* 44, 563-566 (2013).
24. Yang, C. H., Chen, B., Zhou, J., Chen, Y. M. & Suo, Z. Electroluminescence of Giant Stretchability. *Adv. Mater.* 28, 4480-4484 (2016).
25. Zhou, Y. et al. Bright Stretchable Electroluminescent Devices based on Silver Nanowire Electrodes and High-k Thermoplastic Elastomers. *ACS Appl. Mater. Interfaces* 10, 44760-44767 (2018).
26. Tsangaris, G. M., Psarras, G. C. & Kouloumbi, N. Electric modulus and interfacial polarization in composite polymeric systems. *J. Mater. Sci.* 33, 2027-2037 (1998).
27. Davis, J., Hsieh, Y.-H. & Lee, H.-C. Humans perceive flicker artifacts at 500 Hz. *Sci. Rep.* 5, 7861 (2015).
28. Bredol, M. & Schulze Dieckhoff, H. Materials for Powder-Based AC-Electroluminescence. *Materials (Basel).* 3, 1353-1374 (2010).
29. Stauffer, F. & Tybrandt, K. Bright Stretchable Alternating Current Electroluminescent Displays Based on High Permittivity Composites. *Adv. Mater.* 28, 7200-7203 (2016).
30. Cordier, P., Tournilhac, F., Soulié-Ziakovic, C. & Leibler, L. Self-healing and thermoreversible rubber from supramolecular assembly. *Nature* 451, 977-980 (2008).
31. Cao, Y. et al. A Transparent, Self-Healing, Highly Stretchable Ionic Conductor. *Adv. Mater.* 29, 1605099 (2017).
32. Li, S., Peele, B. N., Larson, C. M., Zhao, H. & Shepherd, R. F. A Stretchable Multicolor Display and Touch Interface Using Photopatterning and Transfer Printing. *Adv. Mater.* 28, 9770-9775 (2016).
33. Tee, B. C. K., Wang, C., Allen, R. & Bao, Z. An electrically and mechanically self-healing composite with pressure- and flexion-sensitive properties for electronic skin applications. *Nat Nano* 7, 825-832 (2012).
34. Oh, J. Y., Kim, S., Baik, H.-K. & Jeong, U. Conducting Polymer Dough for Deformable Electronics. *Adv. Mater.* 28, 4455-4461 (2016).
35. van Gemert, G. M. L., Peeters, J. W., Söntjens, S. H. M., Janssen, H. M. & Bosman, A. W. Self-Healing Supramolecular Polymers In Action. *Macromol. Chem. Phys.* 213, 234-242 (2012).
36. M. Shanthi, P., J. Hanumantha, P., Albuquerque, T., Gattu, B. & Kumta, P. N. Novel Composite Polymer Electrolytes of PVdF-HFP Derived by Electrospinning with Enhanced Li-Ion Conductivities for Rechargeable Lithium-Sulfur Batteries. *ACS Appl. Energy Mater.* 1, 483-494 (2018).
37. Shepherd, R. F., Stokes, A. A., Nunes, R. M. D. & Whitesides, G. M. Soft Machines That are Resistant to Puncture and That Self Seal. *Adv. Mater.* 25, 6709-6713 (2013).
38. Ameduri, B., Boutevin, B. & Kostov, G. K. Fluoroelastomers: synthesis, properties and applications. *Prog. Polym. Sci.* 26, 105-187 (2001).
39. Markvicka, E. J., Bartlett, M. D., Huang, X. & Majidi, C. An autonomously electrically self-healing liquid metal—elastomer composite for robust soft-matter robotics and electronics. *Nat. Mater.* 17, 618-624 (2018).
40. Kresse, G. & Furthmüller, J. Efficient iterative schemes for ab initio total-energy calculations using a plane-wave basis set. *Phys. Rev. B* 54, 11169 (1996).
{1} Larson, C. et al. Highly stretchable electroluminescent skin for optical signaling and tactile sensing. *Science* 351, 1071-4 (2016).
{2} Goswami, A. & Goswami, A. P. Dielectric and optical properties of ZnS films. *Thin Solid Films* 16, 175-185 (1973).
{3} Vij, D. R. & Institute of Physics (Great Britain). *Handbook of electroluminescent materials.* (Institute of Physics Pub, 2004).
{4} Bredol, M. & Schulze Dieckhoff, H. Materials for Powder-Based AC-Electroluminescence. *Materials (Basel).* 3, 1353-1374 (2010).
{5} Zhang, Q. et al. Exploring a naturally tailored small molecule for stretchable, self-healing, and adhesive supramolecular polymers. *Sci. Adv.* 4, eaat8192 (2018).
{6} Li, C.-H. et al. A highly stretchable autonomous self-healing elastomer. *Nat. Chem.* 8, 618-624 (2016).
{7} Cao, Y. et al. A Transparent, Self-Healing, Highly Stretchable Ionic Conductor. *Adv. Mater.* 29, 1605099 (2017).
Ref 8 Wang, J. et al. Extremely Stretchable Electroluminescent Devices with Ionic Conductors. *Adv. Mater.* 28, 4490-4496 (2016).
Ref 9 Wang, J., Yan, C., Chee, K. J. & Lee, P. S. Highly Stretchable and Self-Deformable Alternating Current Electroluminescent Devices. *Adv. Mater.* 27, 2876-2882 (2015).
Ref 10 Yang, C. H., Chen, B., Zhou, J., Chen, Y. M. & Suo, Z. Electroluminescence of Giant Stretchability. *Adv. Mater.* 28, 4480-4484 (2016).
Ref 11 You, B., Kim, Y., Ju, B.-K. & Kim, J.-W. Highly Stretchable and Waterproof Electroluminescence Device Based on Superstable Stretchable Transparent Electrode. *ACS Appl. Mater. Interfaces* 9, 5486-5494 (2017).
Ref 12 Jeong, S. M., Song, S., Kim, H., Baek, S.-H. & Kwak, J. S. Stretchable, alternating-current-driven white electroluminescent device based on bilayer-structured quantum-dot-embedded polydimethylsiloxane elastomer. *RSC Adv.* 7, 8816-8822 (2017).
Ref 13 Zhang, Z. et al. A stretchable and sensitive light-emitting fabric. *J. Mater. Chem. C* 5, 4139-4144 (2017).
Ref 14 Stauffer, F. & Tybrandt, K. Bright Stretchable Alternating Current Electroluminescent Displays Based on High Permittivity Composites. *Adv. Mater.* 28, 7200-7203 (2016).
Ref 15 Shi, X. et al. A self-healing and stretchable light-emitting device. *J. Mater. Chem. C* (2018). doi:10.1039/C8TC02828A
Ref 16 Zhou, Y. et al. Bright Stretchable Electroluminescent Devices based on Silver Nanowire Electrodes and High-k Thermoplastic Elastomers. *ACS Appl. Mater. Interfaces* 10, 44760-44767 (2018).

The invention claimed is:

1. A dielectric material comprising a halogen-based elastomer mixed with a halogen based surfactant and exhibiting electro-mechanical self-healing properties and/or an increased dielectric constant compared to the halogen-based elastomer.

2. The dielectric material of claim 1, wherein the dielectric constant is in a range from about 20 or more for frequencies below 100 Hz.

3. The dielectric material of claim 1, wherein the dielectric material exhibits a transparency of more than 20% across the visible light spectrum.

4. The dielectric material of claim 1, wherein the dielectric material exhibits a transparency greater than zero in Infrared light spectrum.

5. The dielectric material of claim 1, wherein the dielectric material exhibits a transparency greater than zero in Ultra Violet light spectrum.

6. The dielectric material of claim 1, wherein the dielectric material exhibits a glass transition temperature below room temperature.

7. The dielectric material of claim 1, wherein dielectric material is stretchable to more than about 1000% relative to a quiescent state.

8. The dielectric material of claim 1, wherein the dielectric material furthers comprise micro- or nano-particles dispersed in the mixture of the halogen-based elastomer with the halogen based surfactant, optionally wherein the micro- or nanoparticles exhibit electro-luminance properties.

9. The dielectric material of claim 1, further comprising at least one additional polymer based material in the mixture of the halogen-based elastomer with the halogen based surfactant.

10. The dielectric material of claim 9, wherein the additional polymer comprises a light-emitting fluorescent polymer selected from spiro-copolymers or poly(phenylenevinylene) based polymers.

11. The dielectric material of claim 9, wherein the additional polymer comprises a solar cell polymer selected from poly(phenylenevinylene)derivatives, or poly(thiophene) derivatives, or polyfluorene derivatives.

12. The dielectric material of claim 1, wherein the dielectric material exhibits opto-electrical properties.

13. The dielectric material of claim 1, wherein the dielectric material exhibits opto-mechanical self-healing properties.

14. A dielectric material comprising a halogen-based polymer mixed with a halogen based surfactant and exhibiting an increased dielectric constant compared to the halogen-based polymer.

15. A device comprising the dielectric material of claim 1.

16. The device of claim 15, further comprising one or more electrodes, optionally wherein the one or more electrodes are made from a material exhibiting electro-mechanical self-healing properties.

17. Fabrication of a device from the dielectric material of claim 1.

18. A method of imparting electro-mechanical self-healing properties and/or an increased dielectric constant to a halogen-based elastomer, or imparting an increased dielectric constant to a halogen-based polymer, the method comprising mixing the halogen-based elastomer or the halogen-based polymer with a halogen based surfactant.

19. A device comprising the dielectric material of claim 14.

20. The device of claim 19, further comprising one or more electrodes, optionally wherein the one or more electrodes are made from a material exhibiting electro-mechanical self-healing properties.

* * * * *

UNITED STATES PATENT AND TRADEMARK OFFICE
CERTIFICATE OF CORRECTION

| | | |
|---|---|---|
| PATENT NO. | : 12,091,538 B2 | Page 1 of 1 |
| APPLICATION NO. | : 17/055360 | |
| DATED | : September 17, 2024 | |
| INVENTOR(S) | : Chee Keong Tee and Yu Jun Tan | |

It is certified that error appears in the above-identified patent and that said Letters Patent is hereby corrected as shown below:

On the Title Page

Item (54) and in the Specification, Column 1, Line 1, please delete "DIELECTRIC MATERIAL" and therefore insert -- A DIELECTRIC MATERIAL --.

Signed and Sealed this
Third Day of December, 2024

Katherine Kelly Vidal
*Director of the United States Patent and Trademark Office*